(12) United States Patent
Jorgenson et al.

(10) Patent No.: US 12,434,783 B2
(45) Date of Patent: Oct. 7, 2025

(54) FUEL TANK AND SEAT ASSEMBLY FOR A VEHICLE

(71) Applicant: Arctic Cat Inc., Thief River Falls, MN (US)

(72) Inventors: Kristopher Jon Jorgenson, Argyle, MN (US); Erick John Halvorson, Albany, MN (US); Darin Dwayne Jacobson, Newfolden, MN (US); Nathan Lee Blomker, Thief River Falls, MN (US); Steven Janzow, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 393 days.

(21) Appl. No.: 17/988,111

(22) Filed: Nov. 16, 2022

(65) Prior Publication Data
US 2023/0257046 A1    Aug. 17, 2023

Related U.S. Application Data

(60) Provisional application No. 63/404,682, filed on Sep. 8, 2022, provisional application No. 63/350,553, filed on Jun. 9, 2022, provisional application No. 63/310,983, filed on Feb. 16, 2022.

(51) Int. Cl.
*B62J 1/08* (2006.01)
*B62J 1/00* (2006.01)
*B62J 1/12* (2006.01)

(52) U.S. Cl.
CPC ................ *B62J 1/08* (2013.01); *B62J 1/005* (2013.01); *B62J 1/12* (2013.01)

(58) Field of Classification Search
CPC ................ B62J 1/08; B62J 1/005; B62J 1/12
See application file for complete search history.

(56) References Cited

U.S. PATENT DOCUMENTS

| | | | |
|---|---|---|---|
| 2,987,534 | A | 6/1961 | Hymin et al. |
| 5,599,002 | A | 2/1997 | Knutson |
| 5,924,514 | A | 7/1999 | Bullerdick |
| 6,266,250 | B1 | 7/2001 | Foye |
| 6,446,744 | B2 | 9/2002 | Wubbolts et al. |
| 6,604,594 | B2 | 8/2003 | Wubbolts et al. |
| 6,651,764 | B2 | 11/2003 | Fournier et al. |
| 6,749,036 | B1 | 6/2004 | Schrapp et al. |
| 6,758,497 | B2 | 7/2004 | Bergman |
| 6,796,607 | B2 | 9/2004 | Bertrand et al. |

(Continued)

FOREIGN PATENT DOCUMENTS

| | | |
|---|---|---|
| CA | 2456088 C | 3/2005 |
| CA | 2411964 C | 7/2005 |

(Continued)

*Primary Examiner* — Brian L Swenson
(74) *Attorney, Agent, or Firm* — Billion & Armitage

(57) ABSTRACT

A fuel tank and a seat assembly including the fuel tank is provided. The seat assembly includes a fuel tank, a seat frame securable to the fuel tank, and optionally a rear panel that supports a rearward portion of the seat frame. The seat assembly may define a chamber between the fuel tank and the rear panel. The seat frame is removably secured to one or both of the rear panel and the fuel tank. The fuel tank and rear panel may define a v-shape capable of distributing the rider load.

28 Claims, 50 Drawing Sheets

(56) References Cited

U.S. PATENT DOCUMENTS

| | | |
|---|---|---|
| 6,823,957 B2 | 11/2004 | Girouard et al. |
| 6,880,658 B2 | 4/2005 | Fournier et al. |
| 6,981,564 B2 | 1/2006 | Bédard et al. |
| 7,025,161 B2 | 4/2006 | Bertrand et al. |
| 7,124,847 B2 | 10/2006 | Girouard et al. |
| 7,124,848 B2 | 10/2006 | Girouard et al. |
| 7,147,074 B1 | 12/2006 | Berg et al. |
| 7,188,693 B2 | 3/2007 | Girouard et al. |
| 7,213,669 B2 | 5/2007 | Fecteau et al. |
| 7,377,348 B2 | 5/2008 | Girouard et al. |
| 7,401,674 B1 | 7/2008 | Berg et al. |
| 7,401,816 B2 | 7/2008 | Abe et al. |
| 7,416,249 B2 | 8/2008 | Atherley |
| 7,451,846 B2 | 11/2008 | Wubbolts et al. |
| 7,543,672 B2 | 6/2009 | Codere et al. |
| 7,556,114 B2 | 7/2009 | Hanagan |
| 7,802,646 B2 | 9/2010 | Matsudo |
| 7,806,215 B2 | 10/2010 | Codere et al. |
| 7,980,629 B2 | 7/2011 | Bedard |
| 8,919,477 B2 | 12/2014 | Conn et al. |
| 8,944,204 B2 | 2/2015 | Ripley et al. |
| 9,346,508 B1 | 5/2016 | Lemieux |
| 9,352,801 B2 | 5/2016 | Makitalo et al. |
| 9,446,810 B2 | 9/2016 | Ripley |
| 9,481,370 B2 | 11/2016 | Bernier et al. |
| 9,682,746 B2 | 6/2017 | Yasuda et al. |
| 9,694,872 B2 | 7/2017 | Laroche et al. |
| 9,738,301 B2 | 8/2017 | Vezina et al. |
| 9,751,592 B2 | 9/2017 | Labbe et al. |
| 10,029,567 B2 | 7/2018 | Lefebvre et al. |
| 10,035,554 B2 | 7/2018 | Mertens et al. |
| 10,144,486 B2 | 12/2018 | Yasuda et al. |
| 10,195,999 B1 | 2/2019 | Glickman et al. |
| 10,300,990 B2 | 5/2019 | Vezina |
| 10,392,079 B2 | 8/2019 | Vezina et al. |
| 10,450,968 B2 | 10/2019 | Bernier et al. |
| 10,543,792 B2 | 1/2020 | Yoshioka et al. |
| 10,556,635 B2 | 2/2020 | Murayama et al. |
| 10,597,105 B2 | 3/2020 | Lefebvre et al. |
| 10,766,572 B2 | 9/2020 | Pard et al. |
| 10,800,458 B2 | 10/2020 | Makowski et al. |
| 10,822,054 B2 | 11/2020 | Lemieux |
| 10,843,758 B2 | 11/2020 | Hebert et al. |
| 10,850,787 B2 | 12/2020 | Ayala González et al. |
| 10,875,595 B2 | 12/2020 | Laberge et al. |
| 11,110,994 B2 | 9/2021 | Hedlund et al. |
| 11,230,351 B2 | 1/2022 | Vezina |
| 11,267,407 B2 | 3/2022 | Hedlund et al. |
| 2001/0047900 A1 | 12/2001 | Fecteau et al. |
| 2003/0127265 A1 | 7/2003 | Watson et al. |
| 2005/0241867 A1 | 11/2005 | Abe et al. |
| 2006/0162977 A1 | 7/2006 | Etou |
| 2015/0068827 A1* | 3/2015 | Makitalo ............... B60K 15/073 180/190 |
| 2016/0068227 A1 | 3/2016 | Yasuda et al. |
| 2018/0334211 A1 | 11/2018 | Mertens et al. |
| 2019/0233055 A1 | 8/2019 | Vezina |
| 2021/0039558 A1 | 2/2021 | Rucker et al. |
| 2021/0086840 A1 | 3/2021 | Glickman et al. |
| 2021/0114525 A1 | 4/2021 | Mazzarella |
| 2021/0188182 A1 | 6/2021 | Edwards et al. |
| 2021/0188185 A1 | 6/2021 | Hedlund et al. |
| 2021/0188376 A1 | 6/2021 | Laugen et al. |
| 2021/0188382 A1 | 6/2021 | Hedlund |
| 2021/0237652 A1 | 8/2021 | Mazzarella |
| 2021/0362807 A1 | 11/2021 | Hedlund et al. |
| 2022/0009419 A1 | 1/2022 | Kim et al. |
| 2022/0144182 A1 | 5/2022 | Hedlund et al. |
| 2022/0340233 A1 | 10/2022 | Edwards et al. |
| 2022/0410770 A1* | 12/2022 | Labbe .................. B60N 2/3097 |

FOREIGN PATENT DOCUMENTS

| | | |
|---|---|---|
| CA | 2371477 C | 7/2006 |
| CA | 2363856 C | 1/2008 |
| CA | 2639857 A1 | 6/2009 |
| CA | 2877554 A1 | 1/2014 |
| CA | 2925800 A1 | 10/2017 |
| CA | 2925822 A1 | 10/2017 |
| CA | 3117886 A1 | 5/2020 |
| CA | 2863952 C | 6/2020 |
| CA | 3030691 C | 10/2020 |
| CA | 3103308 A1 | 6/2021 |
| CN | 105422273 A | 3/2016 |
| JP | S55125312 A | 9/1980 |
| JP | H10217921 A | 8/1998 |
| JP | 2005193788 A | 7/2005 |
| JP | 4840406 B2 | 12/2011 |
| WO | 8607423 A1 | 12/1986 |
| WO | 2009114414 A1 | 9/2009 |

\* cited by examiner

FUEL TANK AND SEAT ASSEMBLY FOR A VEHICLE

CROSS REFERENCE TO RELATED APPLICATIONS

This application claims the benefit of and priority to U.S. Provisional Application No. 63/310,983, filed Feb. 16, 2022, U.S. Provisional Application No. 63/350,553, filed Jun. 9, 2022, and to U.S. Provisional Application No. 63/404,682, filed Sep. 8, 2022. A claim of priority is made to the aforementioned applications. The disclosures of the above applications are incorporated herein by reference in their entirety.

BACKGROUND

Snow vehicles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. One or more skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars. The snowmobile also includes a footrest/running board (s) for the driver while riding. The driver typically straddles the seat with one leg on each side of the seat.

SUMMARY

According to one or more aspects of the present disclosure, a fuel tank is provided that may be attached to a chassis of a recreational vehicle, such as a snowmobile. The fuel tank may include one or more retaining features. The retaining features may comprise a first pocket and a second pocket in an upper surface of the fuel tank. A seat having a seat frame may be directly attached to the fuel tank, wherein the seat frame is spaced apart from the chassis. The seat frame is attached to the fuel tank by a plurality of mounting devices including first and second mounting devices that are engageable with the retaining features on the fuel tank. The mounting devices may each include a projection extending from a lower surface of the seat frame that is received within the first or second pocket.

According to one or more aspects of the present disclosure, a snowmobile includes a tunnel having a front edge, a rear edge, and a tunnel surface extending therebetween and a fuel tank. The fuel tank has a base positioned on the tunnel surface, a forward portion, a rearward portion, and an upper surface extending from the forward portion downward to the rearward portion. The upper surface includes a first trapezoidal tier with first outboard sides extending from the rearward portion and converging toward the forward portion and a second trapezoidal tier extending upward from the first trapezoidal tier and with second outboard sides extending from the rearward portion and converging toward the forward portion. The second outboard sides of the second trapezoidal tier are positioned inboard of the first outboard sides of the first trapezoidal tier. The upper surface also includes a first seat mounting feature positioned along one of the second outboard sides nearer the rearward portion of the fuel tank and a second seat mounting feature positioned along another of the second outboard sides nearer the rearward portion of the fuel tank. The first and second seat mounting features are positioned outboard and opposite each other in relation to a centerline of the upper surface. The upper surface additionally includes a third seat mounting feature positioned along the centerline of the upper surface nearer the forward portion.

According to one or more aspects of the present disclosure, a snowmobile seat assembly includes a fuel tank configured to be positioned on a tunnel of a snowmobile. The fuel tank has an upper surface defining a plurality of seat mounting features and a rearward portion defining a rearward facing chamber. The snowmobile seat assembly additionally includes a seat that is removably secured to the plurality of seat mounting features and a rear panel that slidingly and removably engages the rearward portion of the fuel tank to enclose the rearward facing chamber therebetween.

According to one or more aspects of the present disclosure, a snowmobile includes a chassis having a frame and a tunnel, running boards attached to the chassis, a fuel tank attached to the chassis. The fuel tank has a base positioned on a surface of the tunnel, a forward portion, a rearward portion, and an upper surface extending from the forward portion downward to the rearward portion. The snowmobile further includes a seat attached to the upper portion of the fuel tank. Sides of the fuel tank have opposed concave curved surfaces. A first width between the curved surfaces at the base of the forward portion is greater than a second width between the curved surfaces at the base of the rearward portion. A third width between the curved surfaces at the upper surface of the forward portion is less than a fourth width between the curved surfaces at the upper surface of the rearward portion.

According to one or more aspects of the present disclosure, a snowmobile seat assembly includes a fuel tank configured to be positioned on a tunnel of a snowmobile, the fuel tank including an upper surface defining a plurality of seat mounting features, and a rearward portion defining a rearward facing chamber. The snowmobile seat assembly further includes a seat frame that is removably secured to the plurality of seat mounting features, the seat frame including a first portion defining a descending slope relative to the tunnel and a second portion defining an ascending slope relative to the tunnel, and a rear panel that slidingly and removably engages the rearward portion of the fuel tank to enclose the rearward facing chamber therebetween.

According to one or more aspects of the present disclosure, a snowmobile includes a fuel tank attached to a tunnel of the snowmobile, the fuel tank including an upper surface, a plastic rear panel attached to the tunnel of the snowmobile and to the fuel tank, the fuel tank configured to slidably receive the plastic rear panel to form a rearward facing chamber, wherein a portion of the plastic rear panel is disposed beneath a portion of fuel tank a seat frame having a first portion and a second portion, the second portion configured to removably secure to the plastic rear panel.

According to one or more aspects of the present disclosure, snowmobile seat assembly includes a fuel tank configured to be positioned on a tunnel of a snowmobile, the fuel tank including an upper surface defining a plurality of seat mounting features and a rearward portion defining a rearward facing chamber. The snowmobile seat assembly further includes a seat frame removably secured to the plurality of seat mounting features and a rear panel that engages the rearward portion of the fuel tank to enclose the rearward facing chamber therebetween, wherein the rear panel and the fuel tank are configured to support a rider load.

BRIEF DESCRIPTION OF THE DRAWINGS

This written disclosure describes illustrative embodiments that are non-limiting and non-exhaustive. Reference is made to illustrative embodiments that are depicted in the figures, in which.

DETAILED DESCRIPTION

Figure 1:
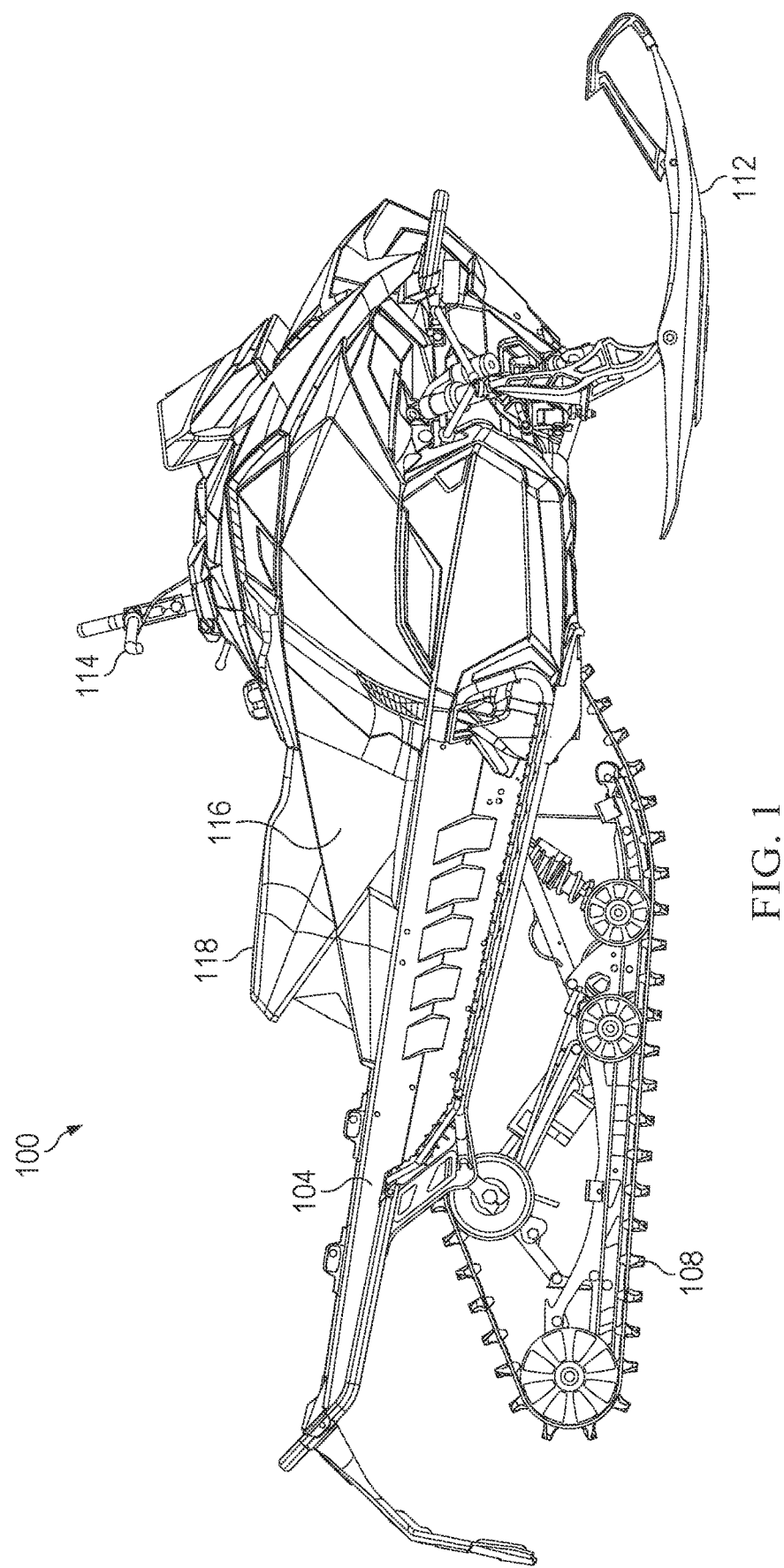
FIG. 1 illustrates a side view of a snowmobile, according to some embodiments.
Figure 2:
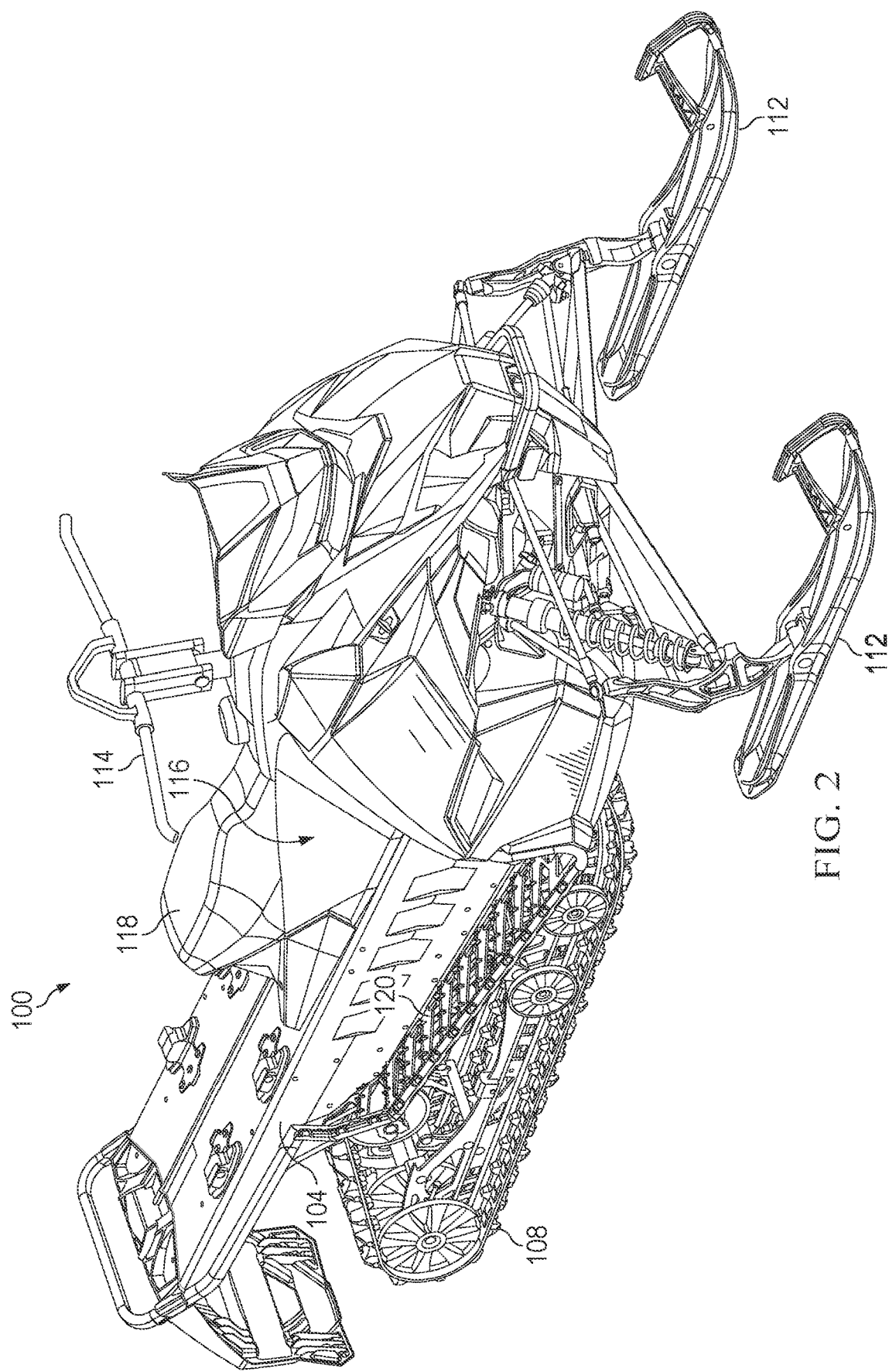
FIG. 2 illustrates a perspective of a snowmobile, according to some embodiments.
Figure 3:
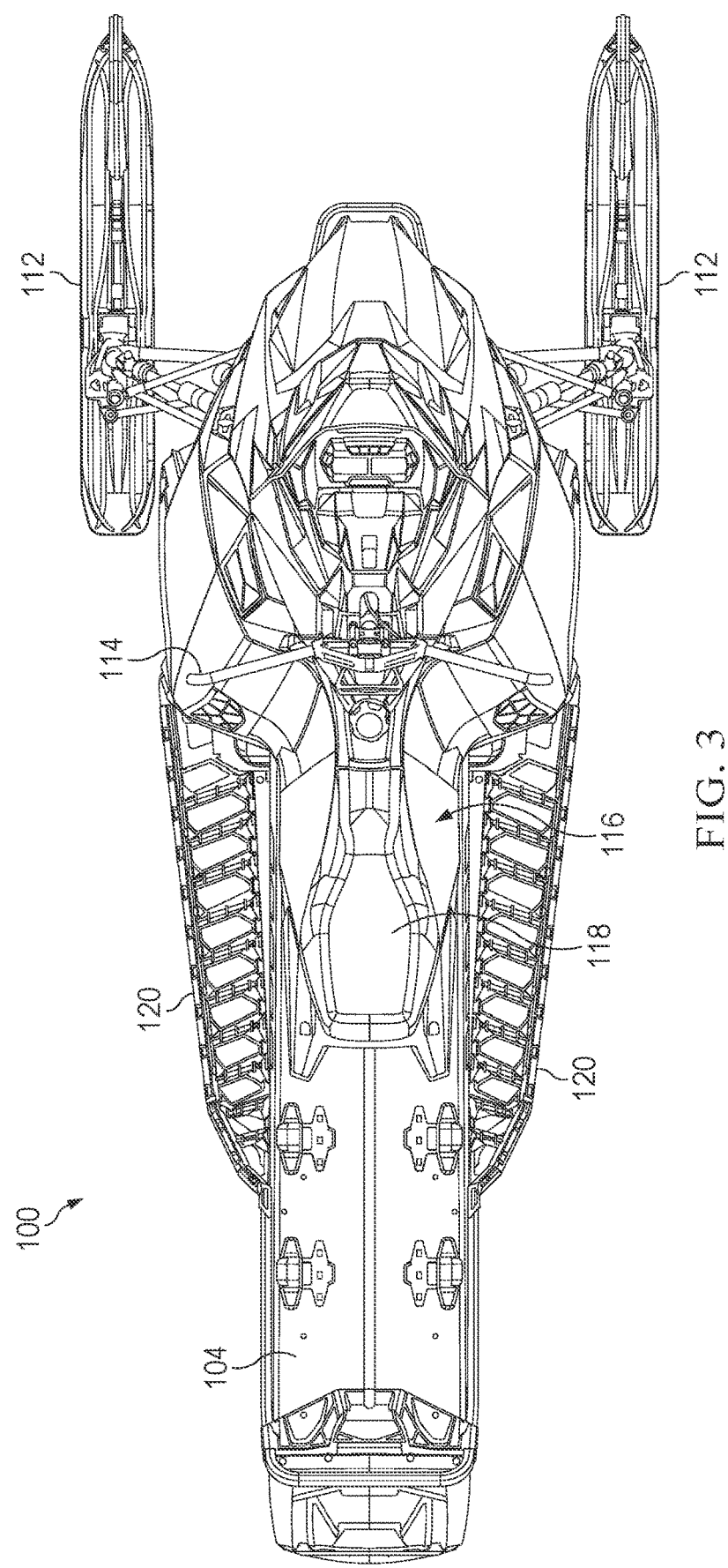
FIG. 3 illustrates a top view of a snowmobile, according to some embodiments.
Figure 4:
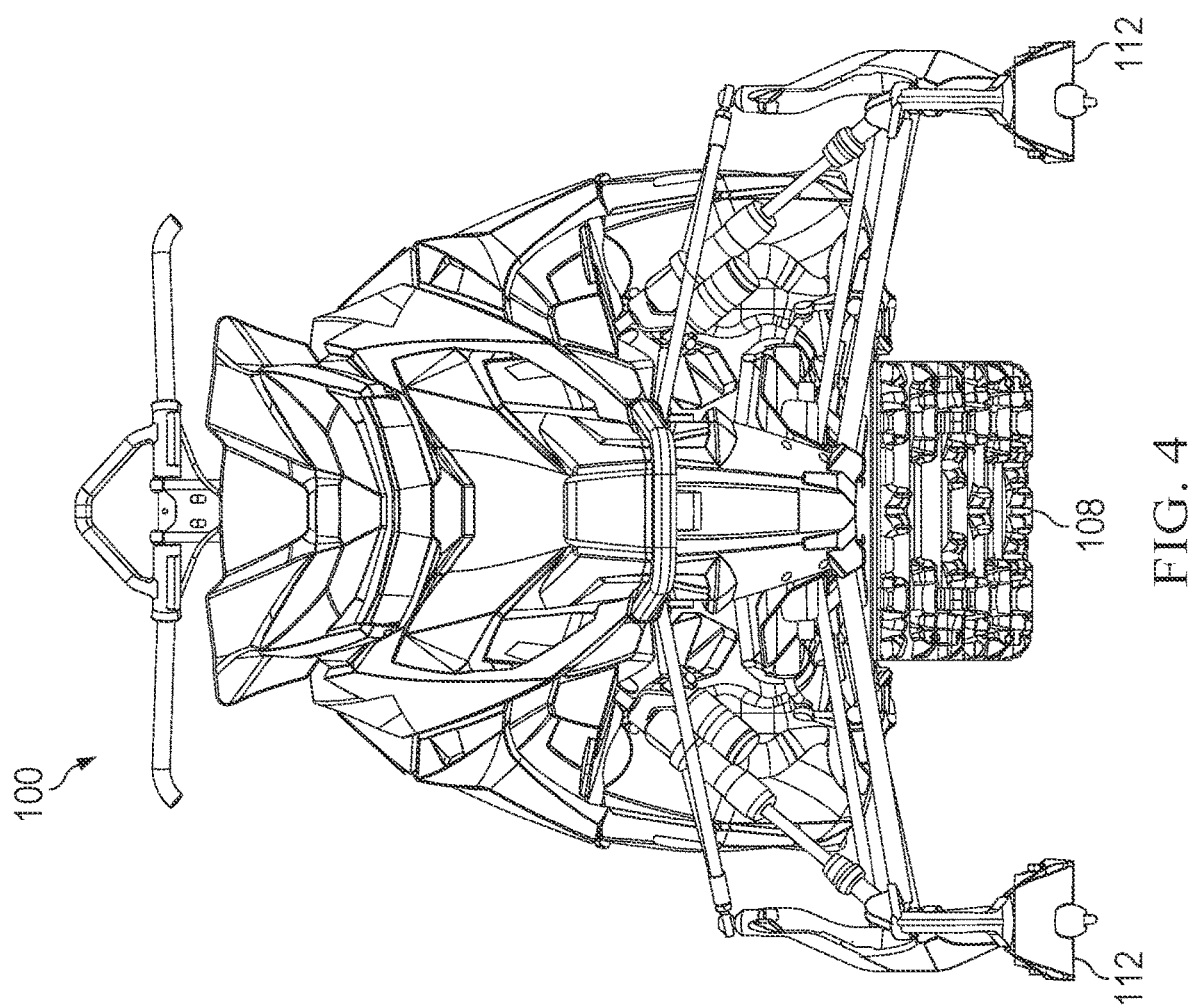
FIG. 4 illustrates a front view of a snowmobile, according to some embodiment.
Figure 5:
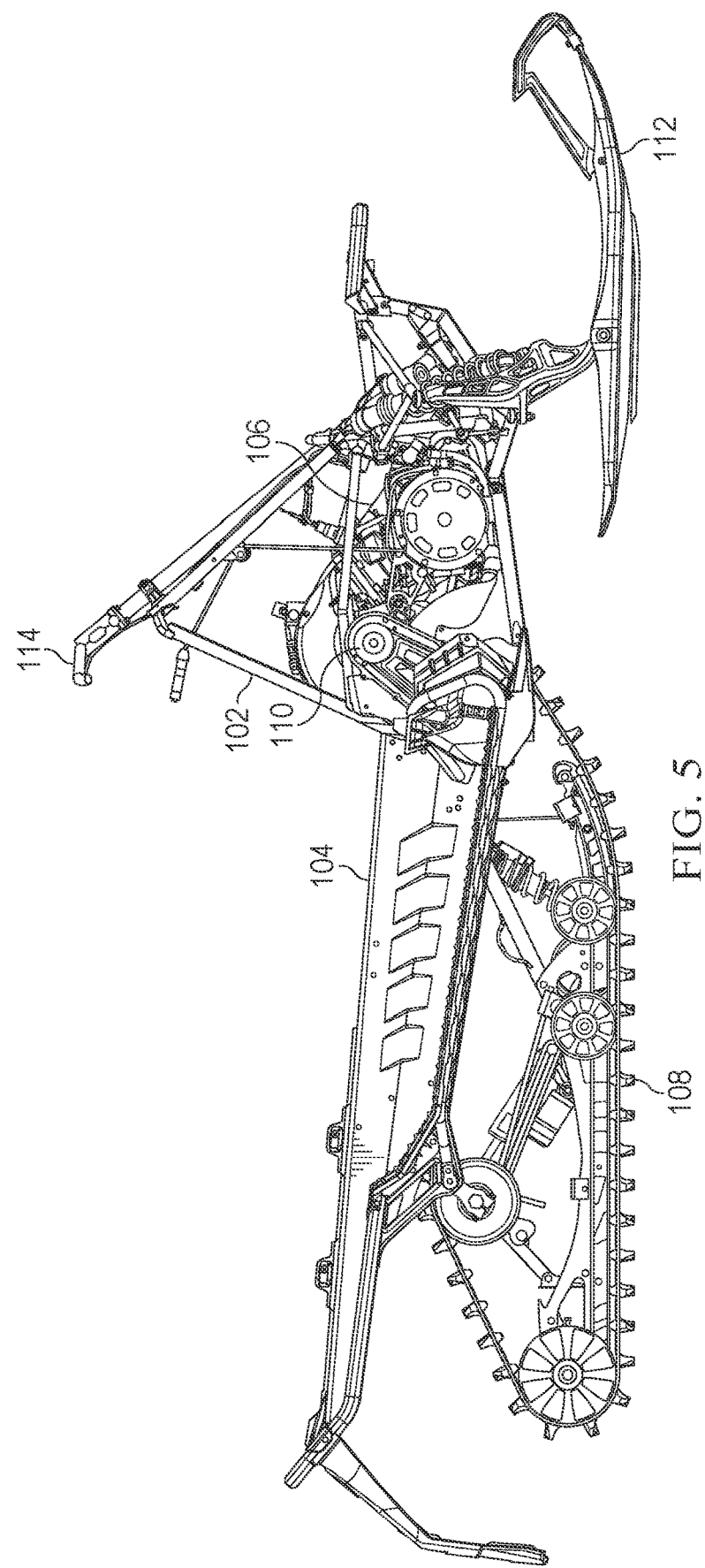
FIG. 5 illustrates a right side view of a snowmobile with portions of the engine cover, fuel tank, and seat removed, according to some embodiments.

Embodiments of the present disclosure describes a fuel tank that is configured to support a removable seat, and an assembly including a fuel tank, a removeable seat, and a removeable rear panel that may form a compartment between the seat and the fuel tank. The compartment may be configured to house a starter battery or other items. In another aspect, embodiments are directed to a seat adapter, and a seat assembly including a seat adapter.

The off-road vehicle, such as snowmobile 100, is generally shown in FIGS. 1-5 and may include a chassis 102, a tunnel 104, a powerplant 106, e.g., an electric motor or an internal combustion engine, attached to the chassis 102, a drive track 108 disposed within the tunnel 104, and a drivetrain 110 configured to provide motive power from the powerplant 106 to the drive track 108. The snowmobile further includes skis 112 operably connected to handlebars 114 that are used to turn the snowmobile 100 and running boards 120 that provide a footrest for the driver's feet. However, the present disclosure is not limited to a snowmobile. The embodiments of the present disclosure may include other snow vehicles, such as a snow bike, and other off-road vehicles, such as ATVs, motorbikes, etc.

The snowmobile 100 further includes an energy storage feature 116, e.g., a battery pack or a fuel tank depending on powerplant type, which is attached to the chassis 102 and the tunnel 104 of the snowmobile. The snowmobile 100 also includes a seat 118 configured to accommodate a snowmobile driver that is mounted to the energy storage feature 116.

The non-limited example of a snowmobile 100 presented herein is directed to an internal combustion engine powered snowmobile and so will refer to the power train as "the engine 106" and the energy storage feature as "the fuel tank 116". Other examples of electric powered snowmobiles having an electric motor and battery pack that are embodiments of the inventive features may also be envisioned. The fuel tank 116 may include a polymeric material that comprises of one or more layers of high-density polyethylene and/or high-density polyethylene copolymers. The polymeric material may comprise one or more additives including, but not limited to, pigments and reinforcements. The fuel tank 116 may be formed via a molding technique, such as a thermoplastic molding technique, a fiber molding technique, blow molding techniques, etc. The inner and outer surfaces of the fuel tank 116 may be shaped through the molding technique(s).

Figure 46:
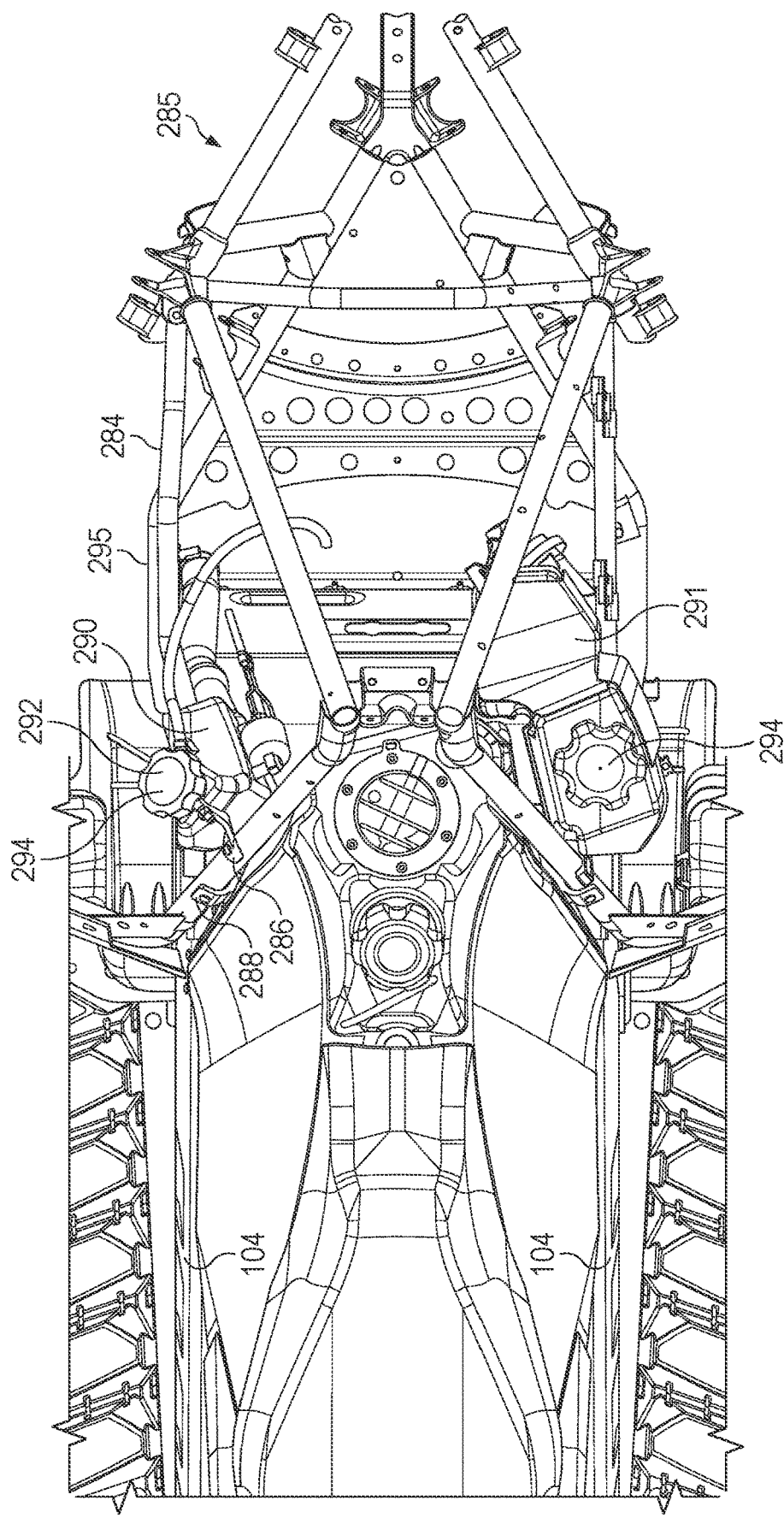
FIG. 46 illustrates a top view of the forward frame assembly, according to some embodiments.
Figure 47A:
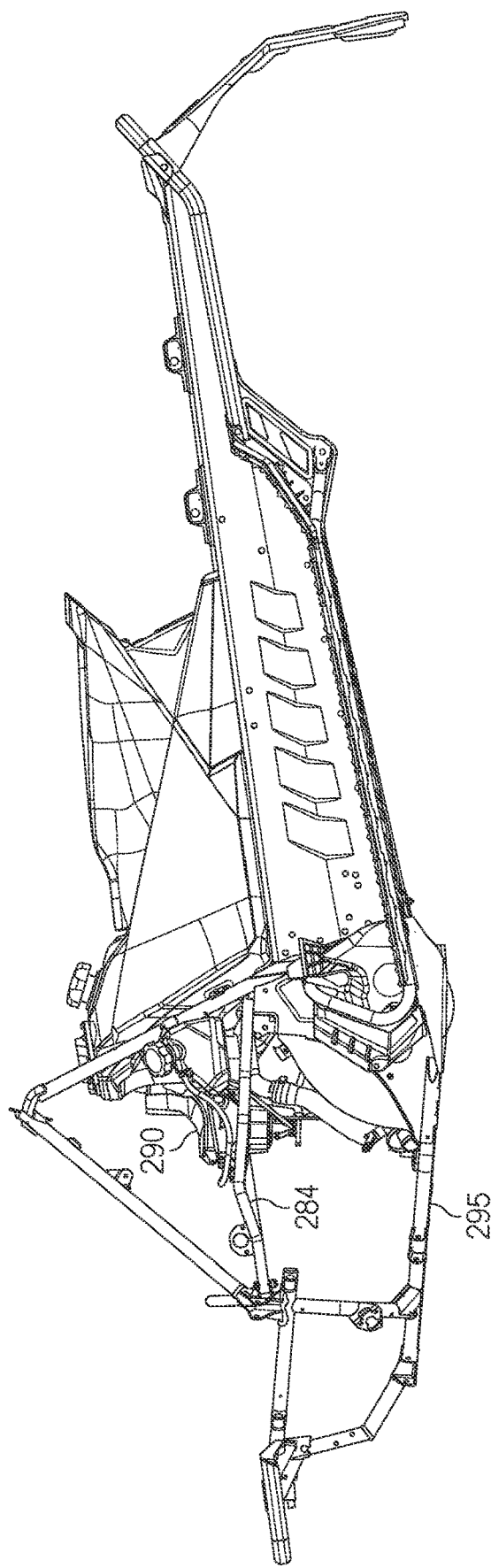
FIG. 47A illustrates a left side view of the fuel tank positioned on the tunnel and secured to the forward frame assembly, according to some embodiments.
Figure 47B:
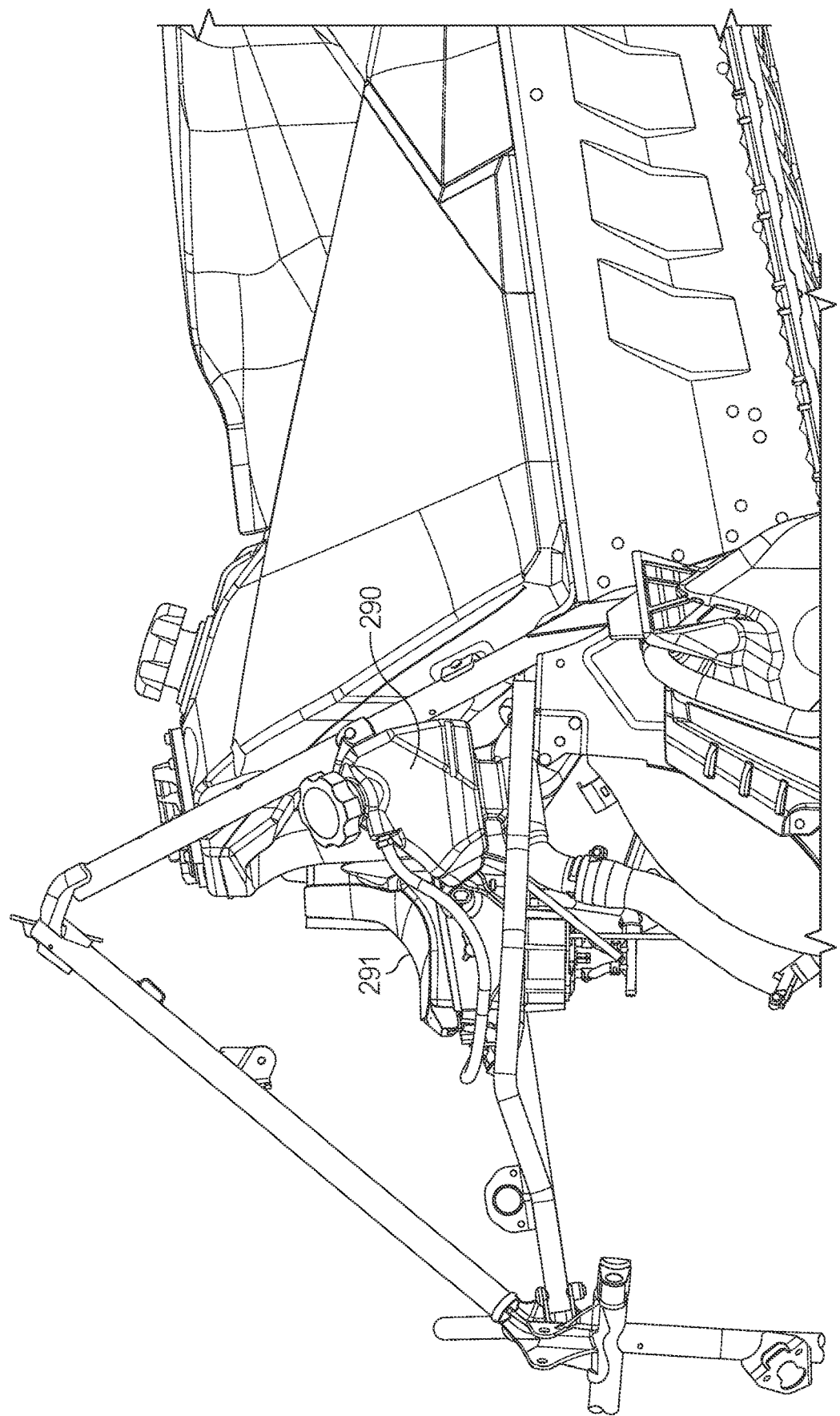
FIG. 47B illustrates a left side view of the fuel tank positioned on the tunnel and secured to the forward frame assembly, according to some embodiments.
Figure 47C:
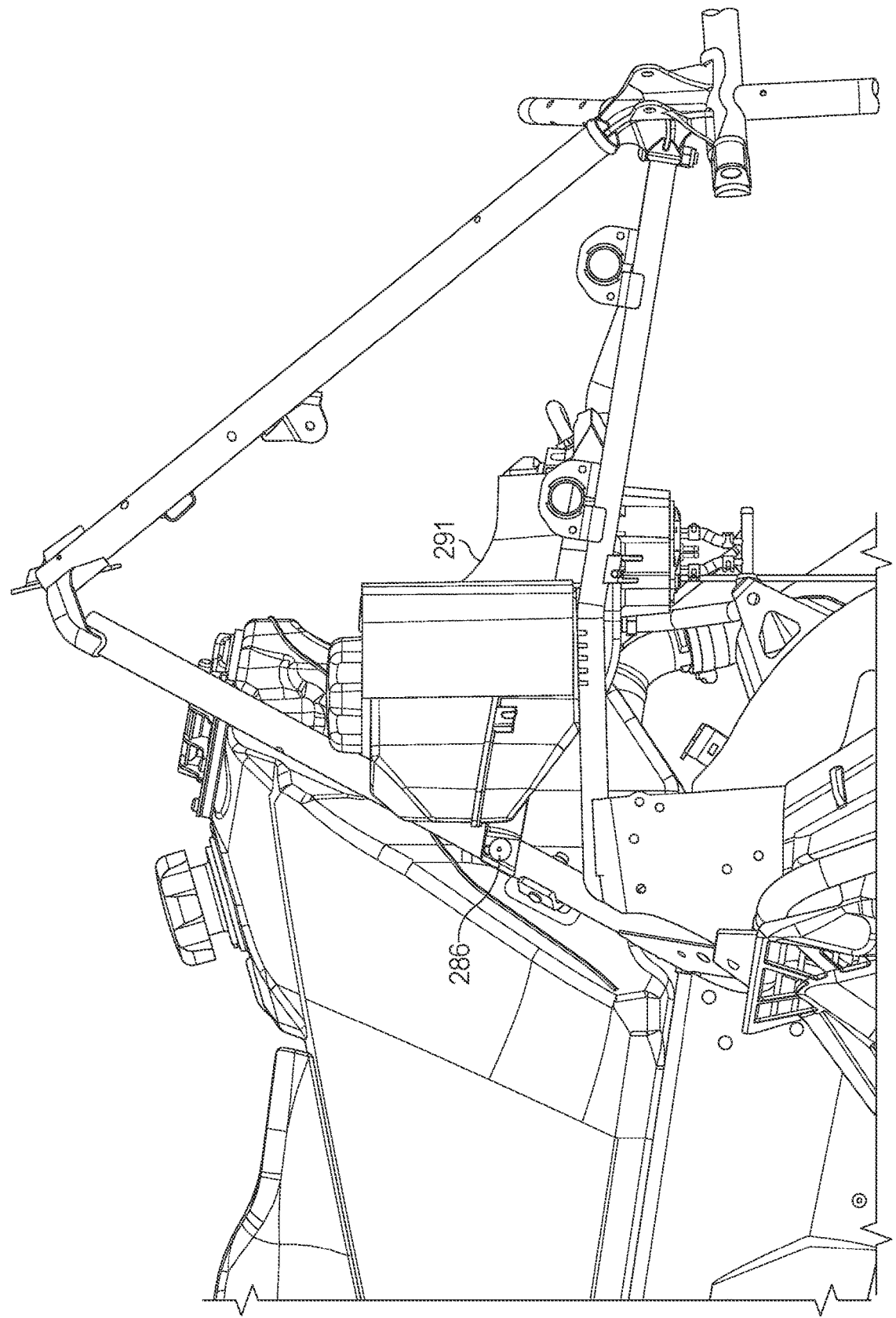
FIG. 47C illustrates a right side view of the fuel tank positioned on the tunnel and secured to the forward frame assembly, according to some embodiments.

The fuel tank 116 may be removably secured to forwardly extending frame members of the chassis 102 with one or more fasteners extending through fastening features or tabs 288 that extend outward from a forward-facing portion of the fuel tank. In a non-limiting example, the chassis 102 may comprise the forward frame assembly disclosed in U.S. Provisional Patent Application Ser. No. 63/344,165 filed on May 20, 2022 and entitled "Snowmobile Frame," the contents of which are incorporated herein by reference in their entirety. The frame members are positioned along the forward-facing portion of the fuel tank 116 and are secured to the forward end of the tunnel 104 when the fuel tank is secured thereto, and a curved surface 238 extends rearward from the frame members. Accordingly, the fuel tank 116, including the curved surface 238, extends rearward from the chassis 102 (and upward from the base of the fuel tank 116) uninterrupted by the frame members of the chassis 102. At least a portion of the curved surface 238 is not covered by frame members, body panels or other components, and is an exterior facing surface (or A-Surface) of the seat assembly. In an illustrative example, "A-surface" refers to the outer surface of the fuel tank 116 that is facing away from the fuel tank 116. The A-surface may be the most visible (i.e. facing) after the seat assembly including the fuel tank 116 is assembled and arranged on the vehicle; while other surfaces (e.g. a B-surface) of the fuel tank 116 are less visible than the A-surface. The forward-facing portion may also include one or more recesses for at least partially receiving a fluid reservoir therein or thereunder. As shown in FIGS. 46-47C, fluid reservoirs 290 and 291 are secured to the forwardly extending frame members of the chassis 102 with fastening feature 286 positioned above the fuel tank fastening feature 288. One or both of the fluid reservoirs 290, 291 include portions positioned rearward of the forwardmost portion of the fuel tank 116. One or both of the openings 292 and caps 294 to the openings of the fluid reservoirs 290, 291 are positioned rearward of the forwardmost portion of the fuel tank 116, and/or at least partially outboard of the upper surface of the tunnel 104, and/or outboard of at least a portion of the side members 284 and/or lower frame members 295 of the forward frame assembly 285. Optionally, one or both of the caps 294 are positioned rearward of at least a portion of the fuel pump opening positioned at the forward end of the fuel tank 116. Optionally, at least a portion of the fuel tank 116 is positioned above one or both of the liquid reservoirs 290, 291. In a non-limiting example, the liquid reservoir 290 is a coolant fluid reservoir, and the liquid reservoir 291 is an oil reservoir.

Figure 6:
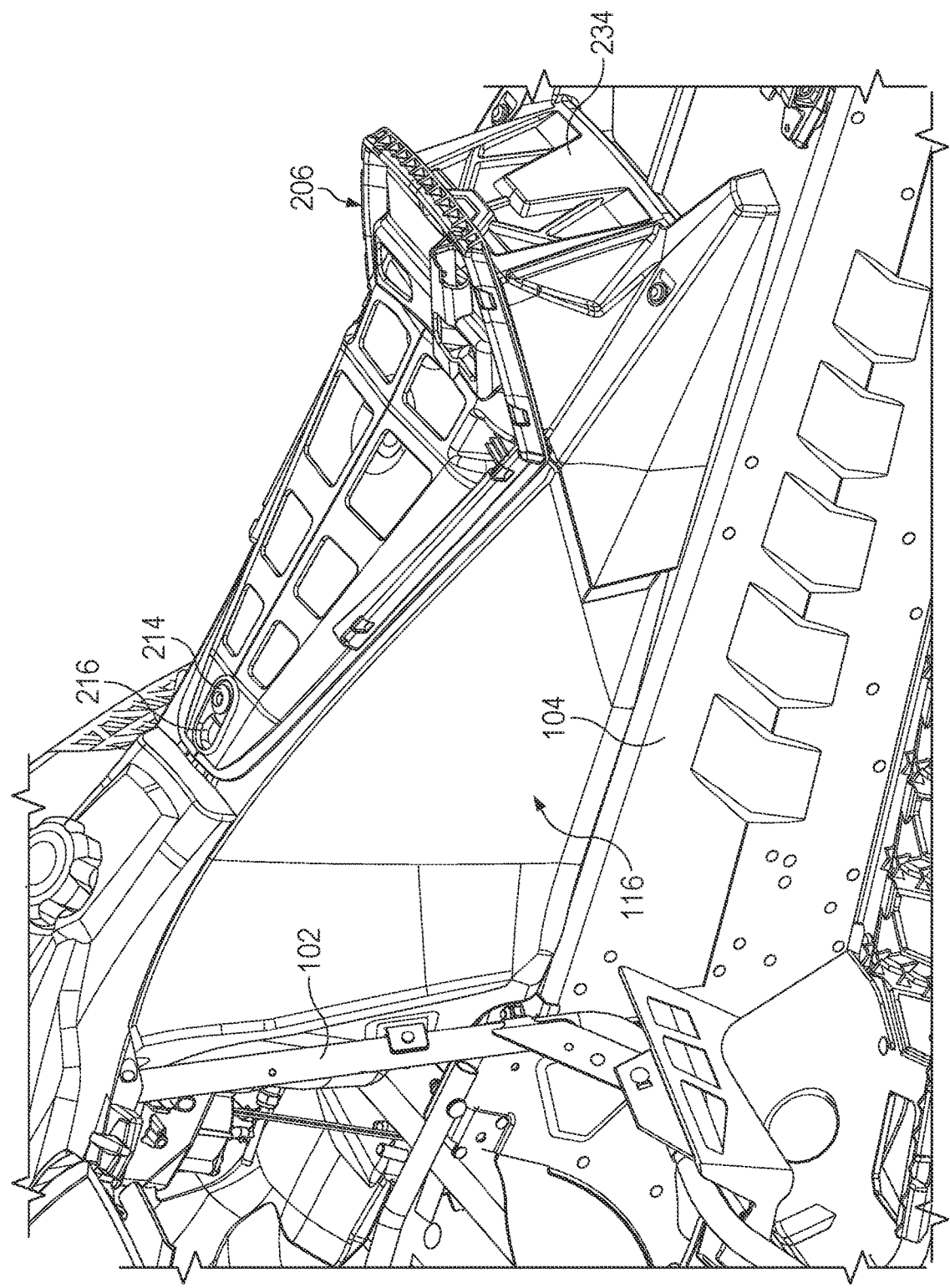
FIG. 6 illustrates a left side perspective view of the snowmobile including the fuel tank, seat frame, and rear panel, according to some embodiments.
Figure 7:
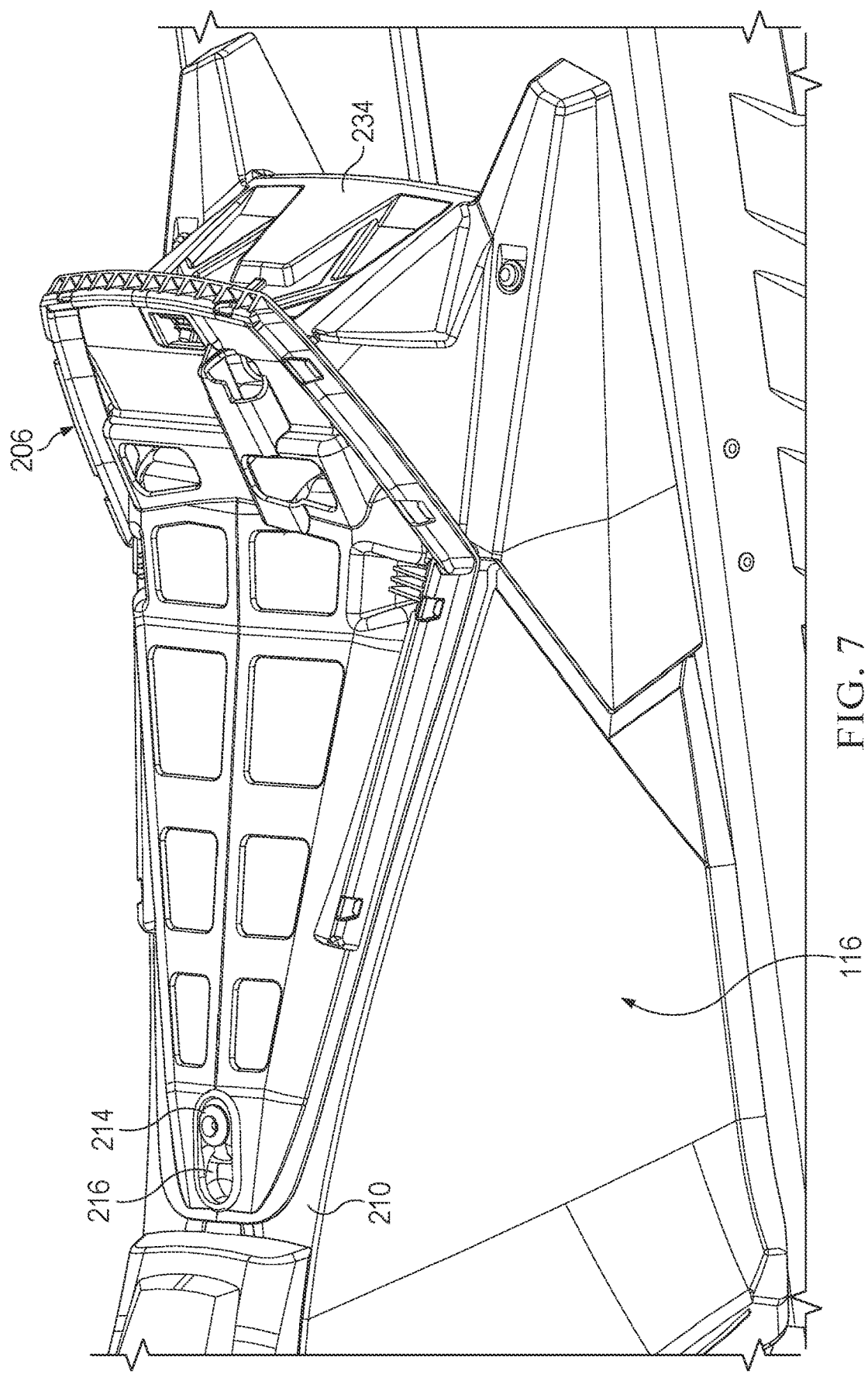
FIG. 7 illustrates a top side perspective view of the fuel tank, the seat frame, and the rear panel, according to some embodiments.
Figure 8:
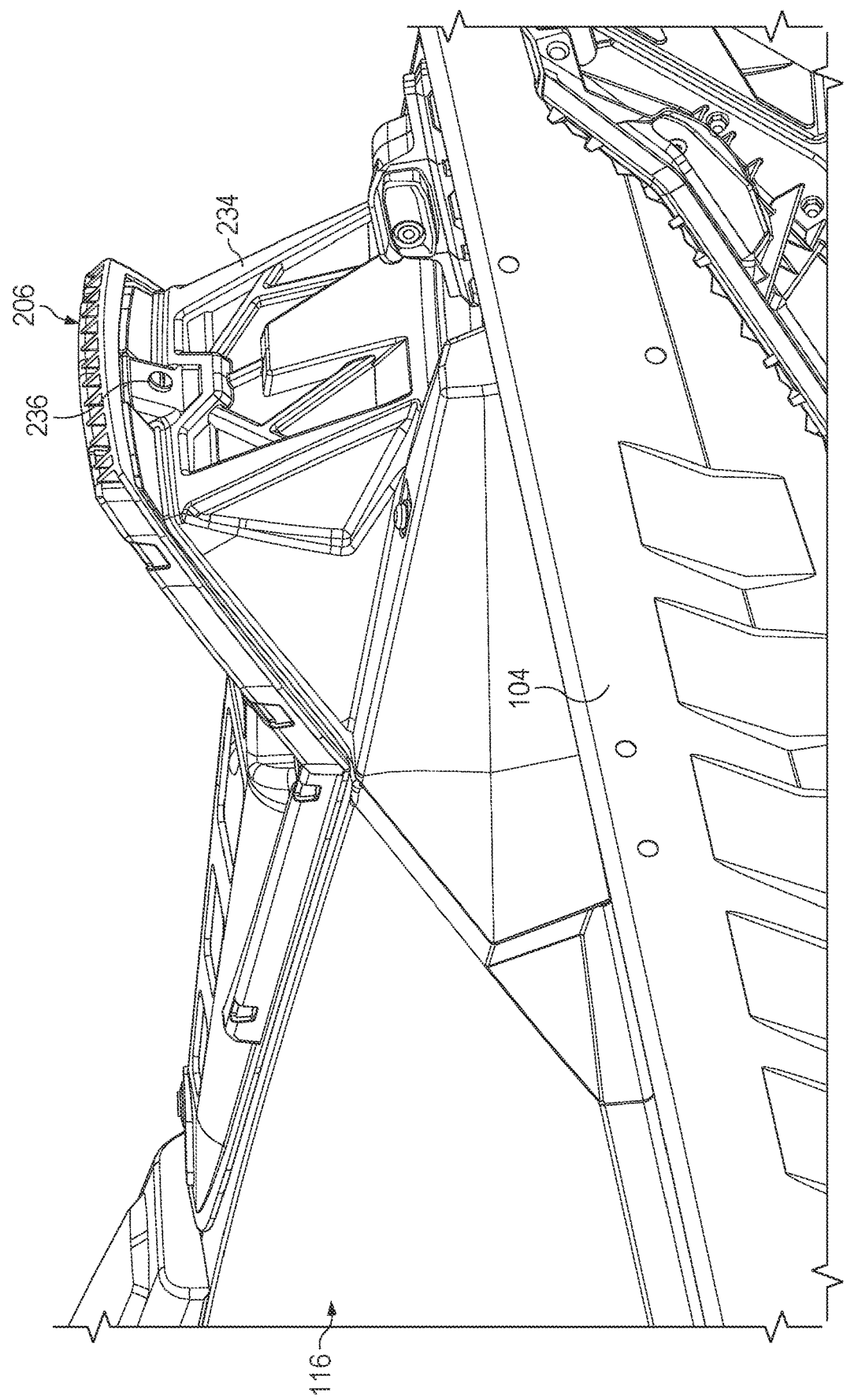
FIG. 8 illustrates a rear perspective view of the fuel tank, the seat frame, and the rear panel, according to some embodiments.
Figure 9:
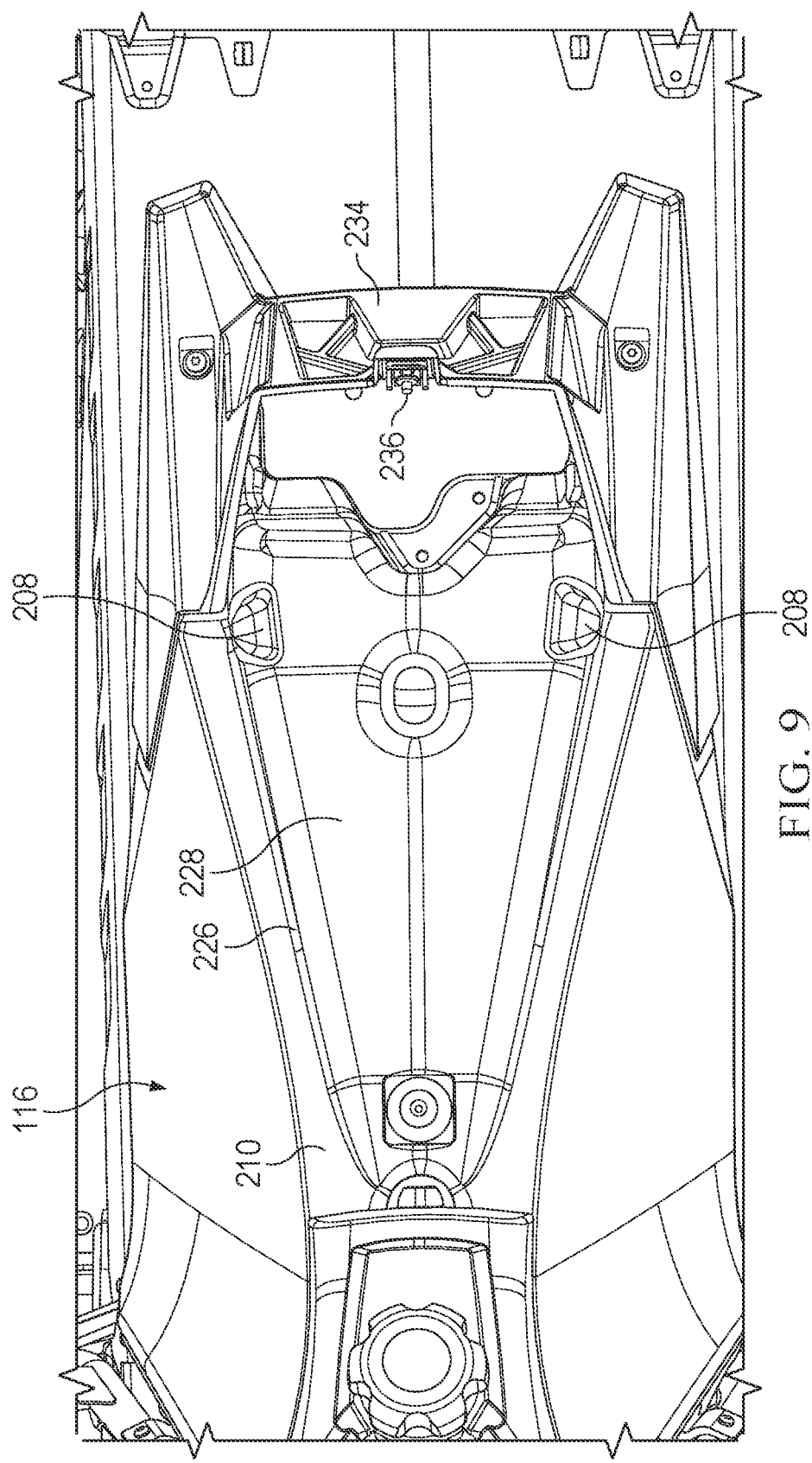
FIG. 9 illustrates a top view of the fuel tank and the rear panel, according to some embodiments.
Figure 10:
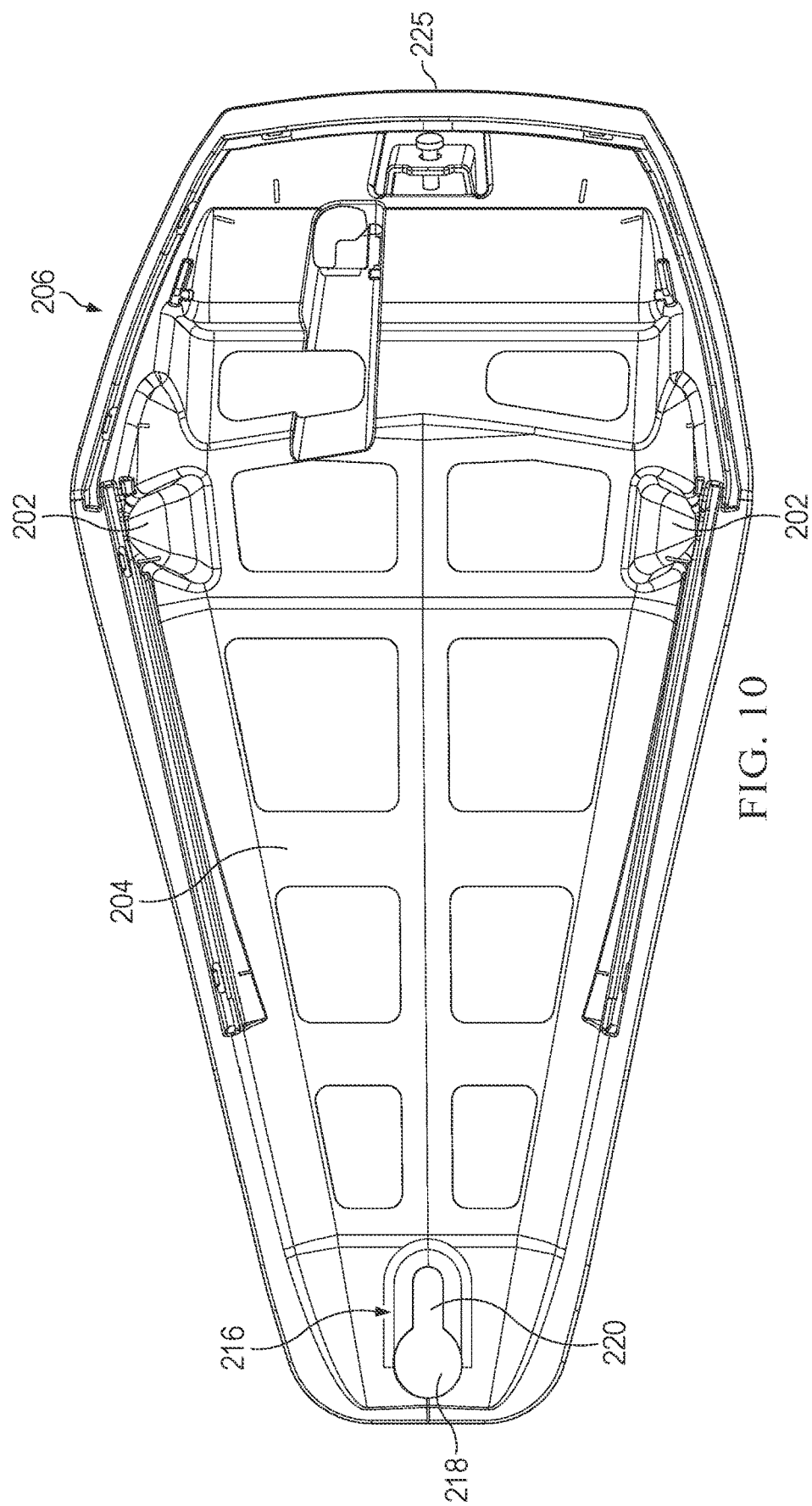
FIG. 10 illustrates a bottom view of the seat frame, according to some embodiments.

As shown in FIGS. 6-8, the seat 118 is mounted to the fuel tank 116 by a plurality of mounting devices that include engagement members that may be in the form of one or more trapezoidal projections 202 on the lower surface 204 of the seat 118, particularly the seat frame 206 as shown in FIG. 10. These projections 202 are received within one or more engagement members such as trapezoidal pockets 208 that are integrally formed on an upper surface 210 of the fuel tank 116 that are shown in FIGS. 9, 15-17, and 19. The projections 202 and pockets 208 have a generally trapezoidal shape in at least two axes, vertical and lateral. The projections 202 and pockets 208 are vertically tapered with their upper portions being wider than their lower portions. The projections 202 and pockets 208 are also laterally tapered with their mesial portions being wider than their distal portions. The projections 202 are located near outboard edges of the seat frame 206 and the pockets 208 are located near outboard edges of the fuel tank 116. It is to be understood that the shape or location of the engagement members illustrated is not limiting, and other shapes and configurations may be used. For example, the fuel tank 116 may be provided with projections and the frame 206 may be provided with pockets for receiving the projections.

As further illustrated in FIGS. 6-8, the seat frame 206 may include a first portion 201 and a second portion 205. The first portion 201 of the seat frame 206 may be configured to rest against the upper surface 210 of the fuel tank 116. In an illustrative example, the lower surface 204 of the seat frame 206 includes an outer flange that forms a perimeter about a concave portion at least partially defined by cross members extending across the outer flange. The projections 202 may extend inwardly from the outer flange and be at least partially positioned within the concave portion. When placed on the upper surface 210 of the fuel tank 116, the projections 202 are received in the pockets 208, a portion (a second tier 228) of the fuel tank 116 is received in the concave portion of the lower surface 204, and the outer flange of the lower surface 204 is positioned on the outer flange (a first tier 226) of the fuel tank 116. Accordingly, the fuel tank 116 supports the outer flange and the concave portion of the lower surface 204, and the projections 202 interlock the seat frame 206 with the fuel tank 116 to retain the seat frame 206 thereon. The second portion 205 of the seat frame 206 may be configured to extend away from the upper surface 210 of the fuel tank 116 and rest against a rear panel 234. In some embodiments, the second portion 205 of the seat frame 206 may extend from the rear portion of the fuel tank 116, over a chamber 230 defined by the fuel tank 116 and the rear panel 234, and rest against the rear panel 234. The first portion 201 of the seat frame 206 may include a continuous descending slope from the front to the rear, i.e., the first portion 201 descends toward the tunnel 104 as the distance from the front end of the snowmobile 100 increases. In contrast, the second portion 205 of the seat frame 206 may include a continuous ascending slope from front to rear, i.e., the second portion 205 ascends away from the tunnel 104 as the distance from the front end of the snowmobile 100 increases (see e.g., FIGS. 6-8). The first portion 201 and the second portion 205 may intersect adjacent the projections 202 near the center of the seat frame 206 and form a v-shape.

The fuel tank 116 and the rear panel 234 may share the rider load, or in other words, the rider's weight may be distributed between the fuel tank 116 and the rear panel 234. For instance, in one embodiment the forwardmost portion of the rear panel 234 may extend underneath the fuel tank 116 and may extend underneath the first portion 201 of the seat frame 205. Therefore, a rider load disposed on the first portion 201 of the seat frame 206 will be distributed between the fuel tank 116 and the rear panel 234. In other embodiments, the forwardmost portion of the rear panel 234 may not extend underneath the first portion 201 of the seat frame 206.

Figure 15:
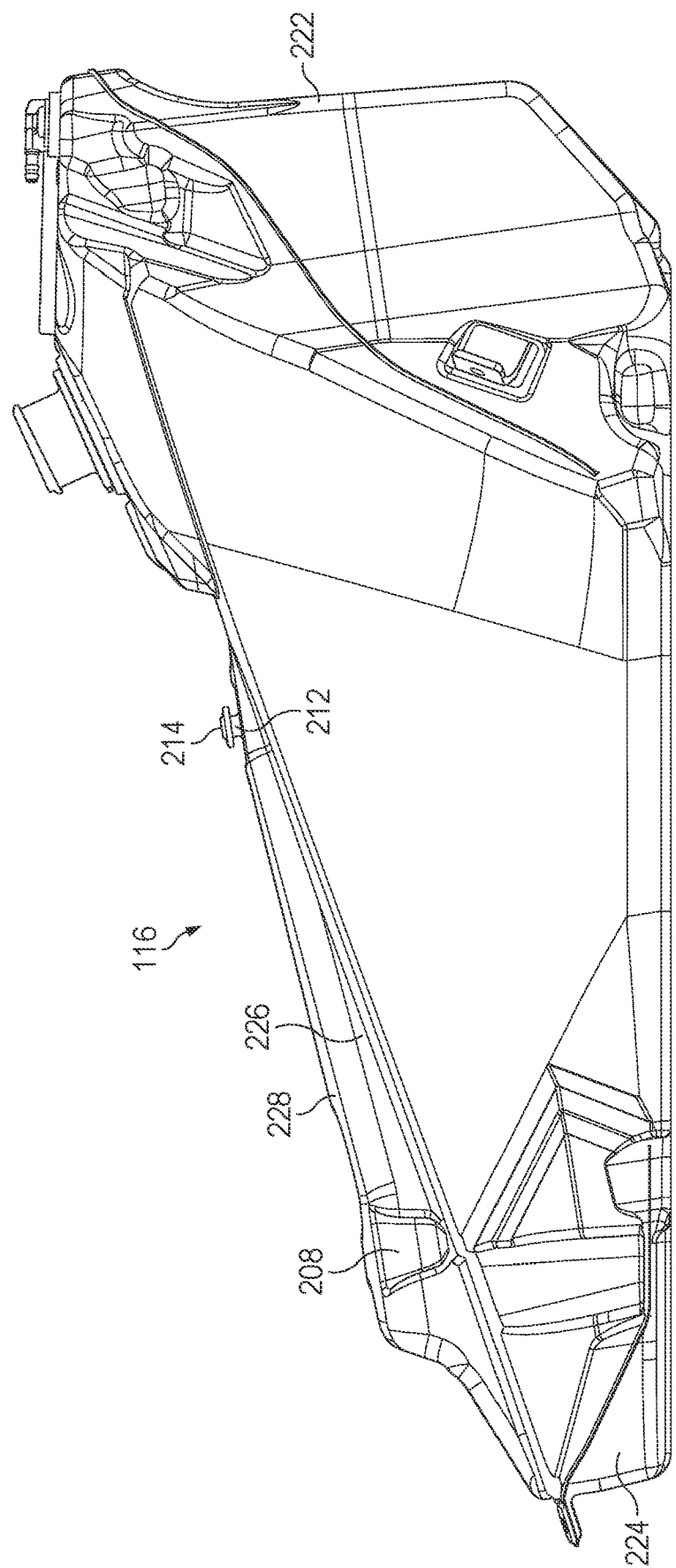
FIG. 15 illustrates a right side view of the fuel tank, according to some embodiments.
Figure 19:
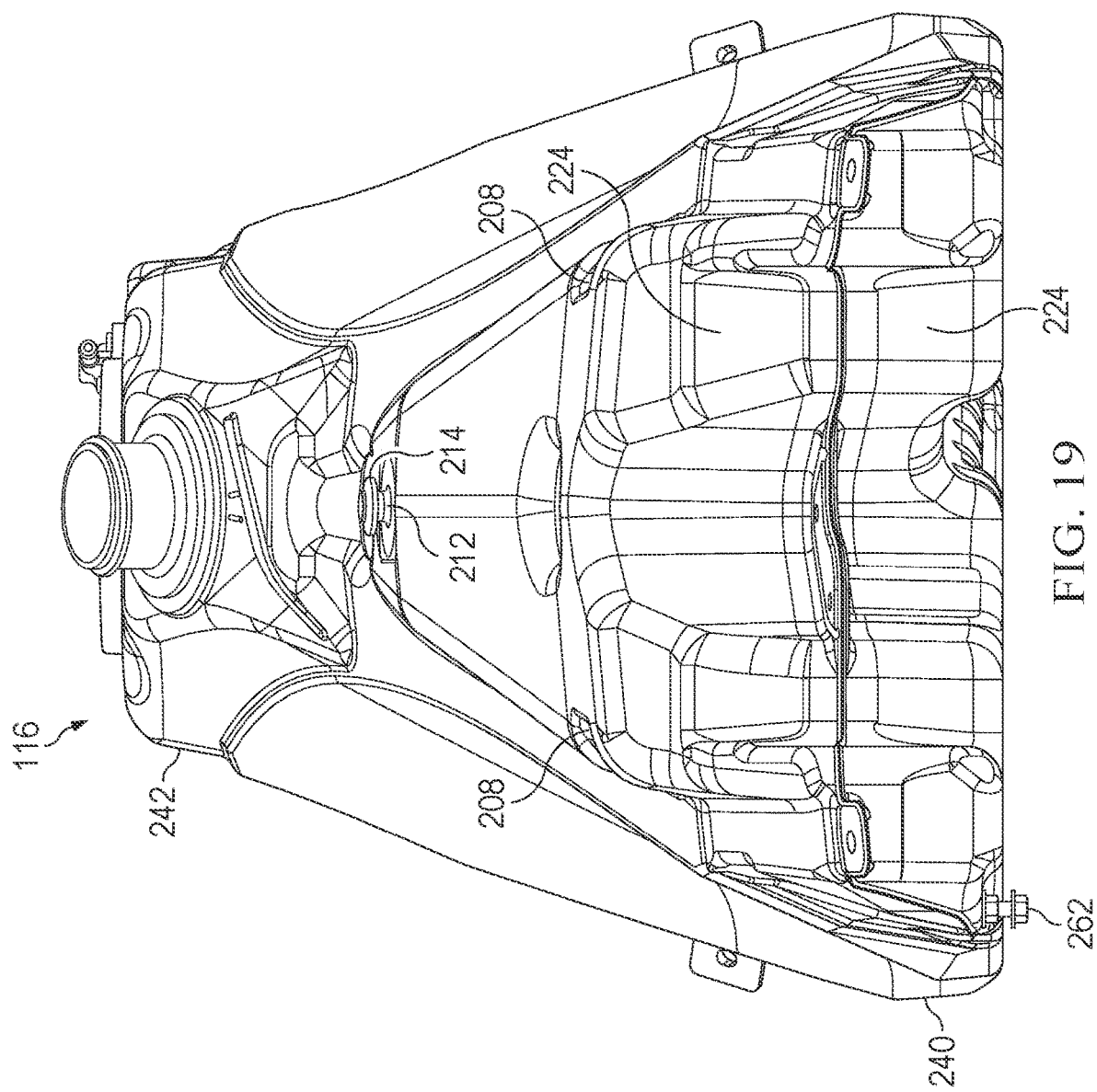
FIG. 19 illustrates a rear view of the fuel tank, according to some embodiments.

The plurality of mounting devices may also include a pillar 212, shown in FIGS. 15 and 19, mounted along a centerline of the fuel tank 116 and standing proud from the upper surface 210 of the fuel tank 116. The pillar 212 is capped by a disc 214 shown in FIGS. 6, 7, 15-17, and 19 having a larger diameter than the pillar 212. The pillar 212 and disc 214 are received within a keyhole-shaped opening 216 in the lower surface of the seat frame 206. As shown in FIG. 10, a forward potion of the keyhole-shaped opening 216 has a round portion 218 and a slot portion 220 interconnected thereto that extends rearwardly from the round portion 218. The pillar 212 and the disc 214 are received within the round portion 218 and the seat frame 206 is then moved forward to secure the seat frame 206 to the fuel tank 116 by sliding the pillar 212 into the slot portion 220 and disposing the seat frame 206 between the disc 214 and the upper surface 210 of the fuel tank 116 as illustrated in FIG. 7. As the seat frame 206 is moved forwardly and the pillar is moved from the round portion 218 of the opening 116 to the slot portion 220 of the opening 116, the projections 202 are aligned with and may be received within the pockets 208. The pillar 212 and disc 214 assembly and the pockets 208 are arranged on the upper surface 210 of the fuel tank 116 in a generally isosceles triangular configuration. As the disc 214 has a greater diameter than the slot portion 220, the forward end of the seat frame 206 is retained on the fuel tank 116 and thereby prevents removal of the projections 202 from the pockets 208.

In alternative embodiments, the lower surface 204 of the seat frame 206 may define a keyhole-shaped opening in which the slot portion 220 is forward of the round portion 220 (not shown). After the disc 214 and pillar 212 are received within the round portion of this alternative keyhole-shaped opening, the seat frame 206 is then moved rearwardly to secure the seat frame 206 to the fuel tank 116.

The projections 202 and pockets 208 allow longitudinal and lateral positional tolerance for these mounting devices that may accommodate dimensional variations caused by manufacturing processes used to form the fuel tank 116, e.g., blow molding.

Figure 11:
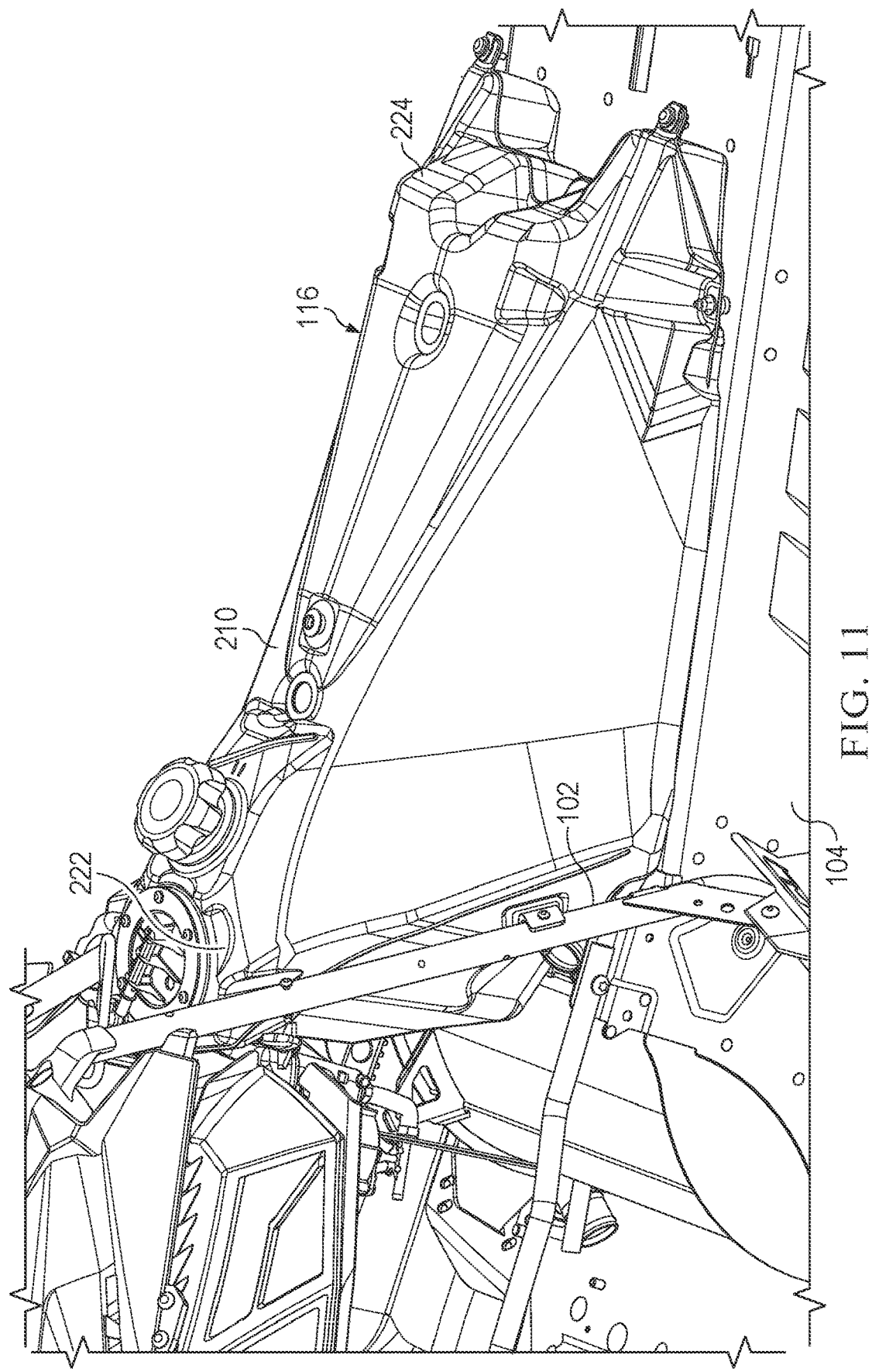
FIG. 11 illustrates a left side perspective view of the fuel tank attached to the frame, according to some embodiments.
Figure 12:
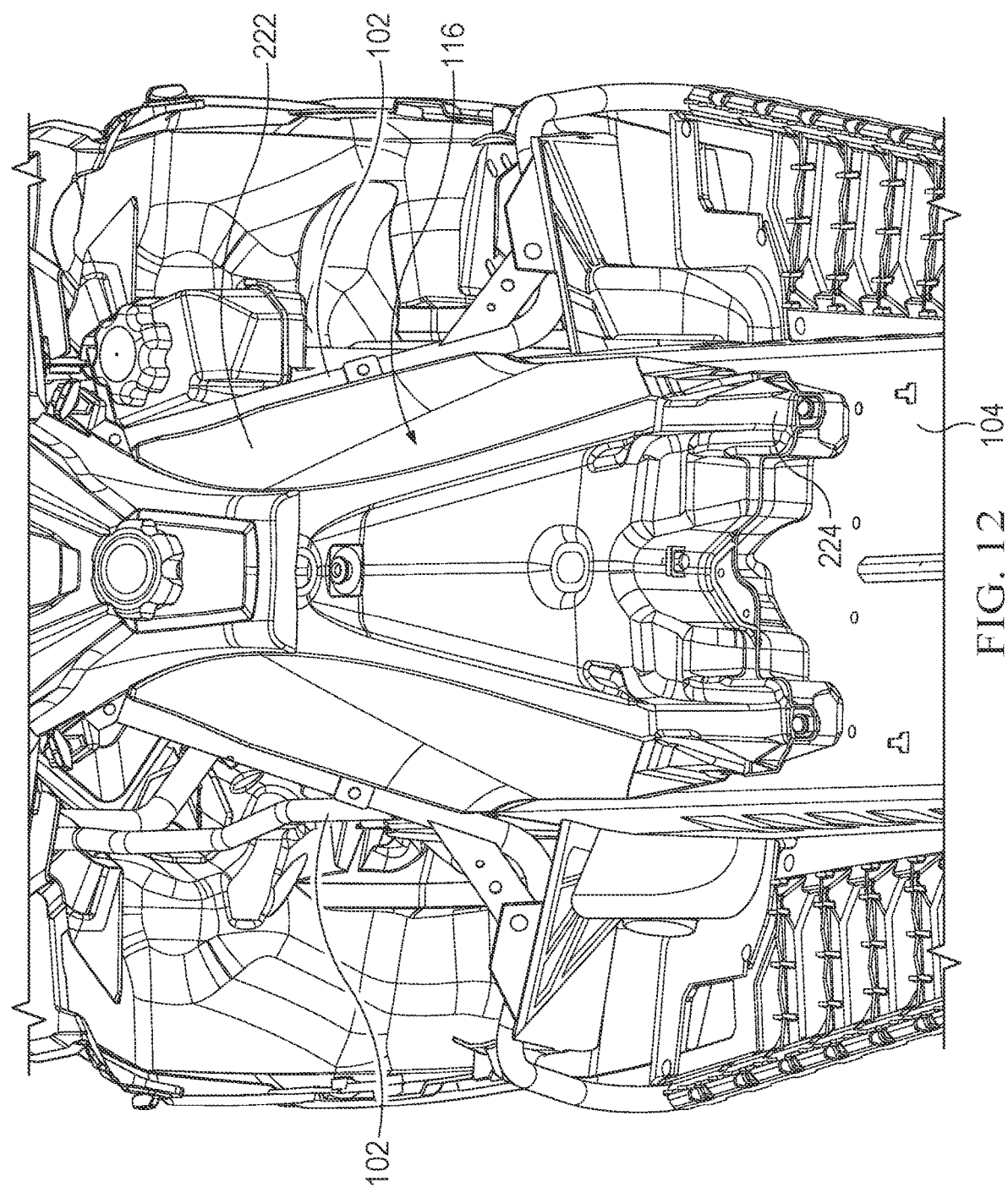
FIG. 12 illustrates a rear perspective view of the fuel tank attached to the frame, according to some embodiments.
Figure 13:
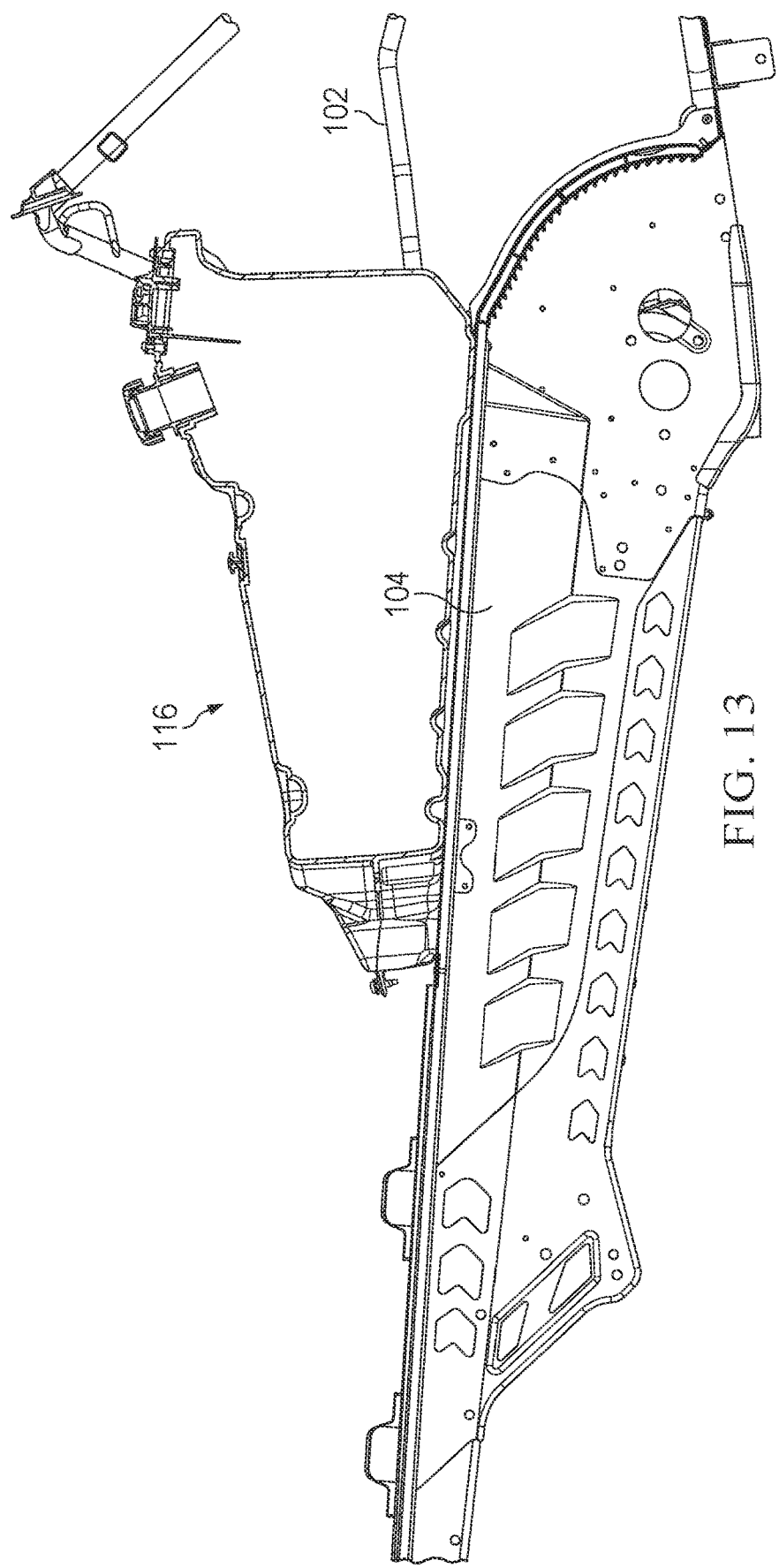
FIG. 13 illustrates a side cross-section view of the fuel tank, according to some embodiments.
Figure 14:
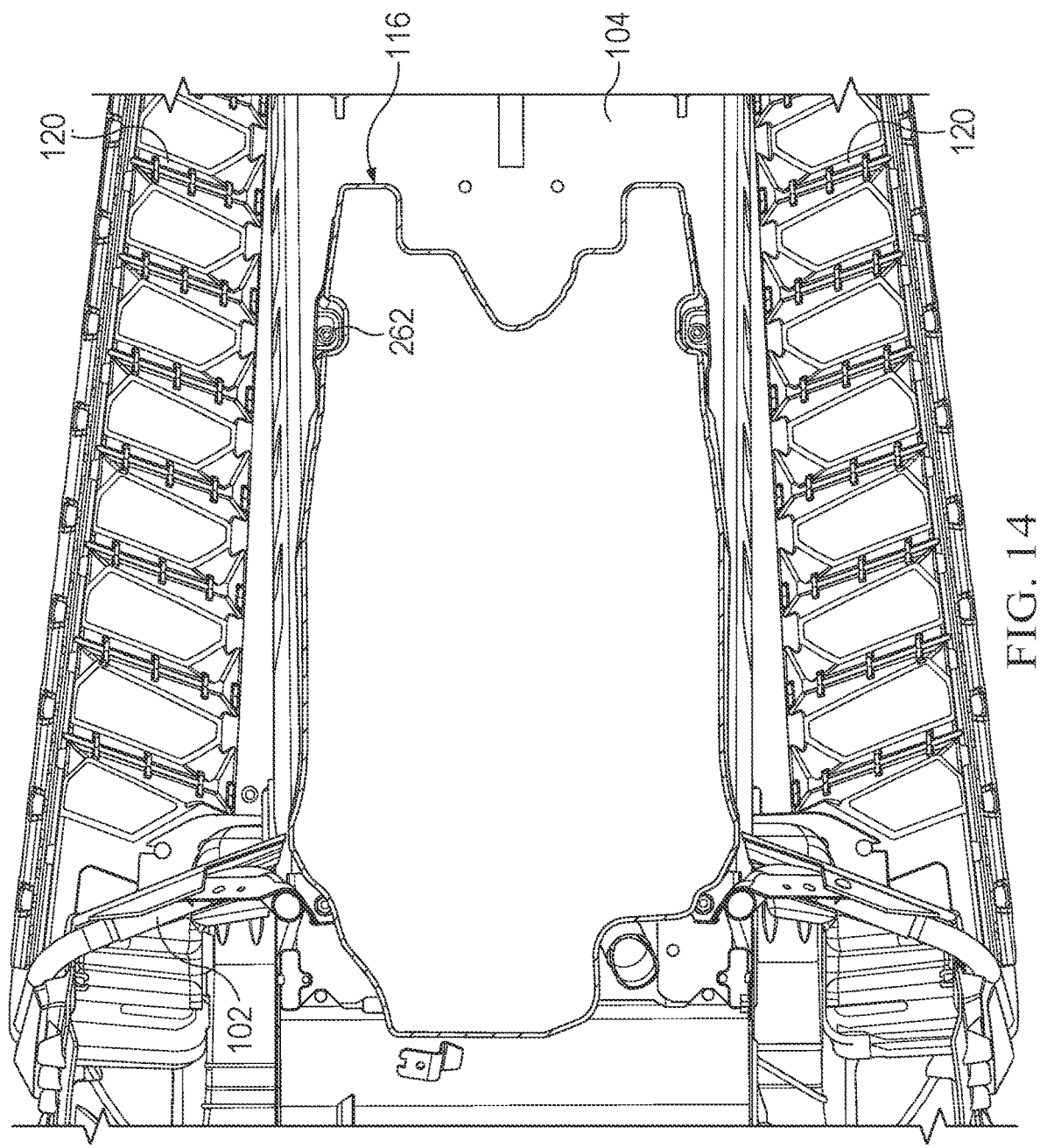
FIG. 14 illustrates a top cross-section view of the fuel tank, according to some embodiments.

The upper surface 210 extends from a forward portion 222 downward to a rearward portion 224 as shown in FIGS. 11 and 12. The upper surface 210 may include a first tier 226 with first outboard sides extending from the rearward portion 224 and converging toward the forward portion 222 and a second tier 228 extending upward from the first tier 226 as shown in FIGS. 9 and 15-17. The second tier 228 has second outboard sides extending from the rearward portion 224 and converging toward the forward portion 222 as also shown in FIG. 9. The second outboard sides of the second tier 228 are positioned inboard of the first outboard sides of the first tier 226. The pockets 208 are positioned along the outboard sides of the second tier 228 nearer the rearward portion 224 of the fuel tank 116 and are positioned outboard and opposite each other in relation to a centerline of the upper surface 210. The first tier 226 and the second tier 228 may have substantially triangular or trapezoidal shapes, with the converging end positioned toward the forward portion 222 of the fuel tank 116. The pillar 212 and the disc 214 are positioned along the centerline of the upper surface 210 and are located nearer the forward portion 222 of the fuel tank 116. Although the disc 214 is shown as being positioned at the forward portion 222 of the fuel tank 116 and the pockets 208 are shown as being positioned at the rearward portion 224 of the fuel tank 116, the present disclosure is not limited to such as configuration.

As shown in FIGS. 16, 17, 20, 22, and 23, the rearward portion 224 of the fuel tank 116 partially defines the chamber 230 and is generally shaped in the form of an open and rearward facing rectangular slot that is configured to enclose an electrical component, such as a starter battery 232, or other items. The rear panel 234 shown in FIGS. 6-9 and 22-28 slidingly and removably engages the rearward portion 224 of the fuel tank 116 to enclose the chamber 230. In some embodiments, the rear panel 234 may be made of plastic or other insulating materials. Thus, the inner surfaces of the chamber 230 may be non-metal and/or a non-conducting material. One or both of the fuel tank 116 and the rear panel 234 may be configured to support the electrical component, such as starter battery 232, in a manner that maintains a gap between the electrical component and the tunnel 104 to prevent contact therebetween. The bottom of the chamber 230 may be open to the tunnel 104 to allow any moisture introduced therein to drain way from the chamber 230.

Figure 22:
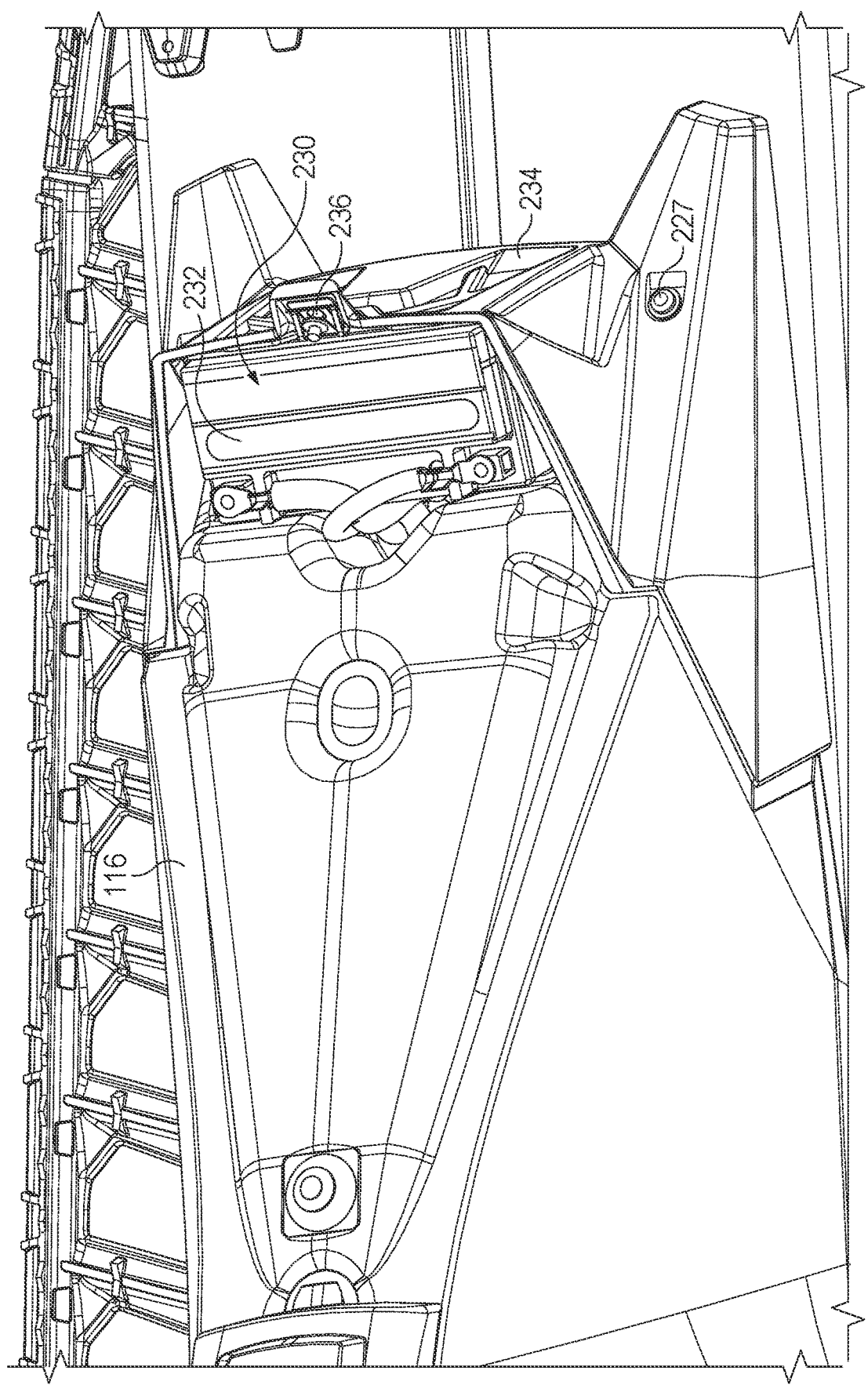
FIG. 22 illustrates a top view of a battery installed in a battery compartment formed between the fuel tank, the seat frame, and the rear panel, according to some embodiments.
Figure 26:
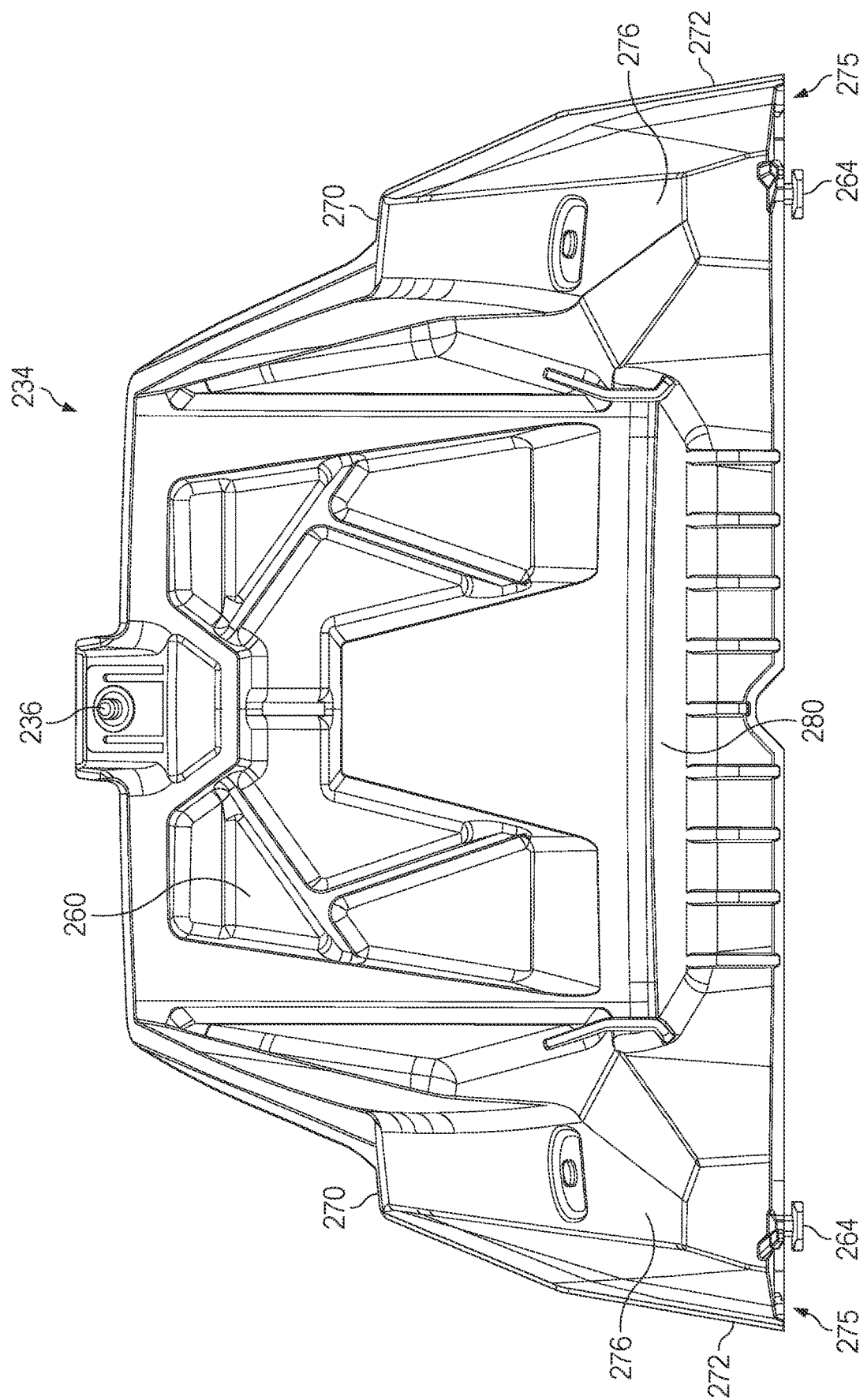
FIG. 26 illustrates a front view of the rear panel, according to some embodiments.
Figure 27:
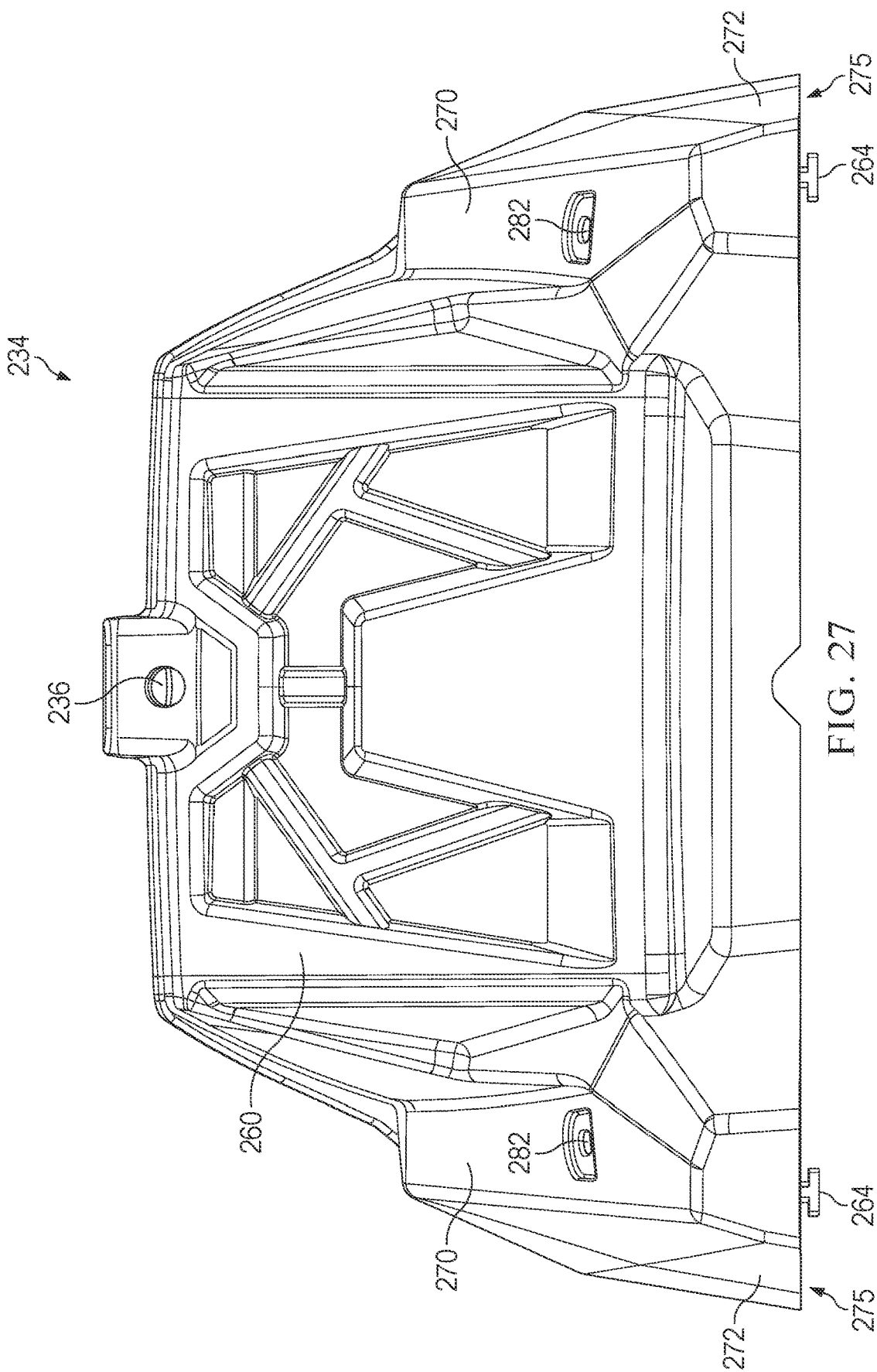
FIG. 27 illustrates a rear view of the rear panel, according to some embodiments.
Figure 28:
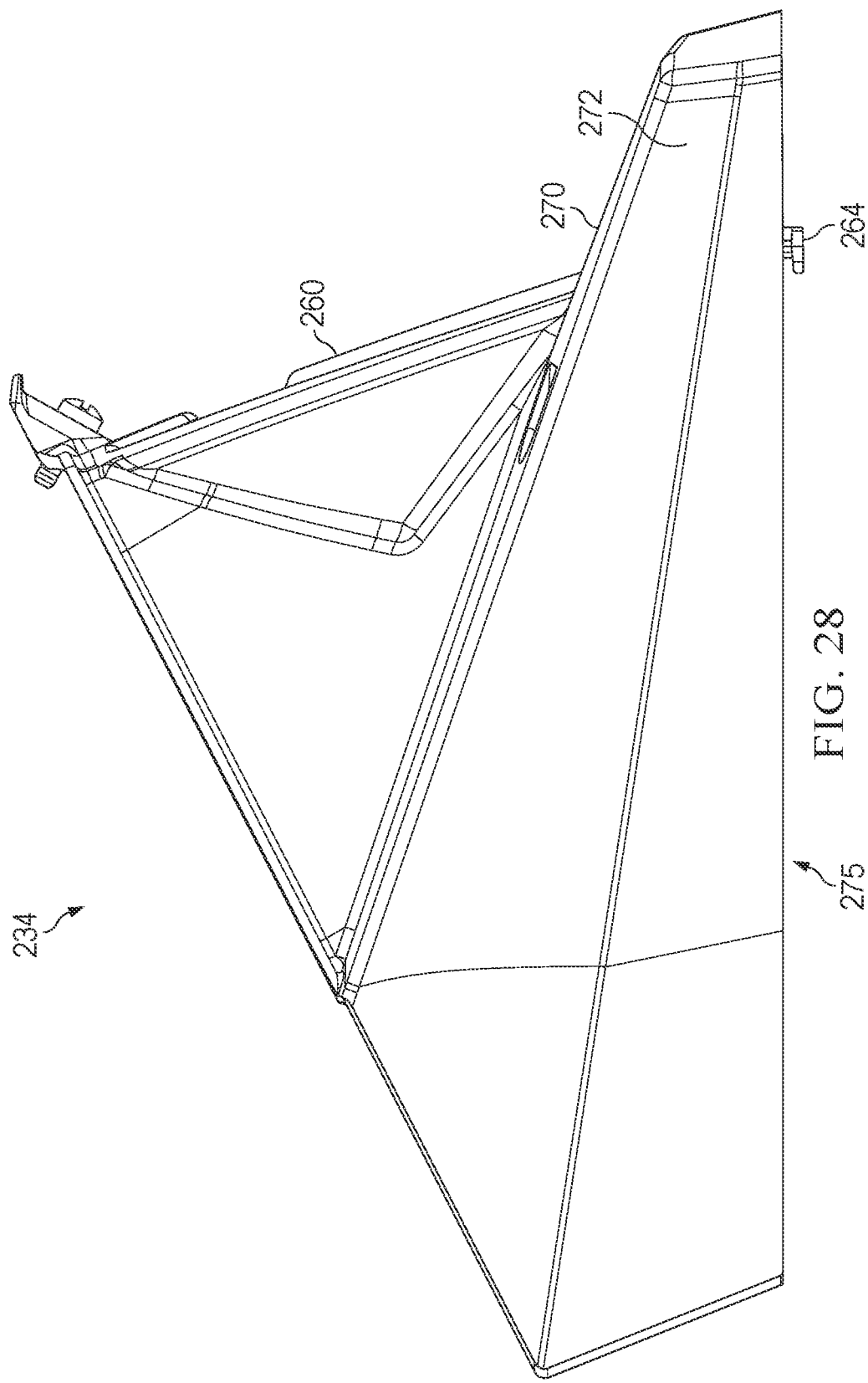
FIG. 28 illustrates a left side view of the rear panel, according to some embodiments.

As shown in FIGS. 26-28, the rear panel 234 includes a rear wall 260 extending between two outboard legs 275 that slidingly receive two projections of the rearward portion 224 extending rearward from the fuel tank 116 that partially define the rectangular slot. The outboard legs 275 include a lower wall 274 positionable on the upper surface of the tunnel 104, side walls 272 and an upper wall 270 that define a chamber 276 for receiving the rearward projections of the rearward portion 224 therein. An interior surface 268 of the upper wall 270 is slanted to rest on the sloped surface of the projections of the rearward portion 224 when installed on the fuel tank 116 so that the forwardmost portion of the upper wall 270 of the leg 275 is positioned adjacent the pocket 208 as shown in FIG. 22. The outboard sides of the projections of the rearward portion 224 may be recessed with respect to the curved surface 238 positioned forward of the portions 224 so that the side walls 272 of the legs 275 may overlap the recessed portions of the projections of the rearward portion 224 and maintain a smooth transition with the curved surface 238 of the fuel tank 116 positioned adjacent to the side walls 272 of the legs 275 when the rear panel 234 is secured to the fuel tank 116 as shown in FIG. 22. The legs 275 may be configured to slidably engage with the fasteners 262. In some embodiments, the fasteners 262 may include nuts, bolts, or other features to create a fastener channel 266 configured to slidably receive a forward engagement feature 278 of the leg 275 (see e.g., FIG. 24). In some embodiments, the fastener channel 266 may be tightened when the forward engagement feature 278 is received within the fastener channel 266 to provide a connection between the fuel tank 116 and the rear panel 234. The fasteners 262 may be configured to secure the fuel tank 116 to the tunnel 104. For instance, the head of the fastener 262 may be placed against the underside of the tunnel 104, the fastener 262 may extend through the tunnel 104, and a nut/bolt may be placed against the top surface of the tunnel 104.

In some embodiments, the rear panel 234 may be configured to provide a forward force to the starter battery 232, and thus, the starter battery 232 is pressed between the rear panel 234 and the fuel tank 116 to firmly secure the starter battery 232 in place. Such configuration may be beneficial, as it may reduce forward/rearward movement and lateral movement of the starter battery 232 within the chamber 230, minimizing wear on the wires and battery terminals. The rear panel 234 may be provided with one or more retaining features that facilitate assembly of the rear panel 234 to secure the electrical component, such as starter battery 232, in place. In an illustrative example, the rear panel 234 includes a forward engagement feature 278 and a rearward engagement feature 264. The chambers 276 of the rear panel 234 are aligned with the rear portion 224 and slid forward to a desired position where the projections of the rearward portion 224 are received in the chambers 276, and the forward engagement feature 278 engages the fastener 262 between the tunnel 104 and the bottom of the fuel tank 116, and the rearward engagement feature 264 is inserted through a t-shaped or keyhole slot (shown in the top panel of the tunnel 104 in FIG. 12 rearward of the fuel tank 116) in the upper panel of the tunnel 104 and engages the underside of the upper panel of the tunnel 104 to prevent the rear panel 234 from being removed therefrom. The forward engagement feature 278 and the rearward engagement feature 264 may define a limit for forward travel of the rear panel 234. However, the shape of the forward engagement feature 278 and the t-shaped slots for receiving the rearward engagement feature 264 allow the rear panel 234 to travel sufficiently forward to apply the support necessary to maintain for the starter battery 232 in the desired position. Fasteners 227 may be inserted through the rear panel 234 and the fuel tank 116 (see FIGS. 21-22) to secure the fuel tank 116 to the rear panel 234 in the desired position and to further limit travel of the rear panel 234. In some embodiments, the fasteners 227 may be configured to provide a press force on the starter battery 232, i.e., tightening of the fasteners 227 may press the rear panel 234 into the started battery 232, and hence, press the starter battery 232 into the fuel tank 116.

Figure 20:
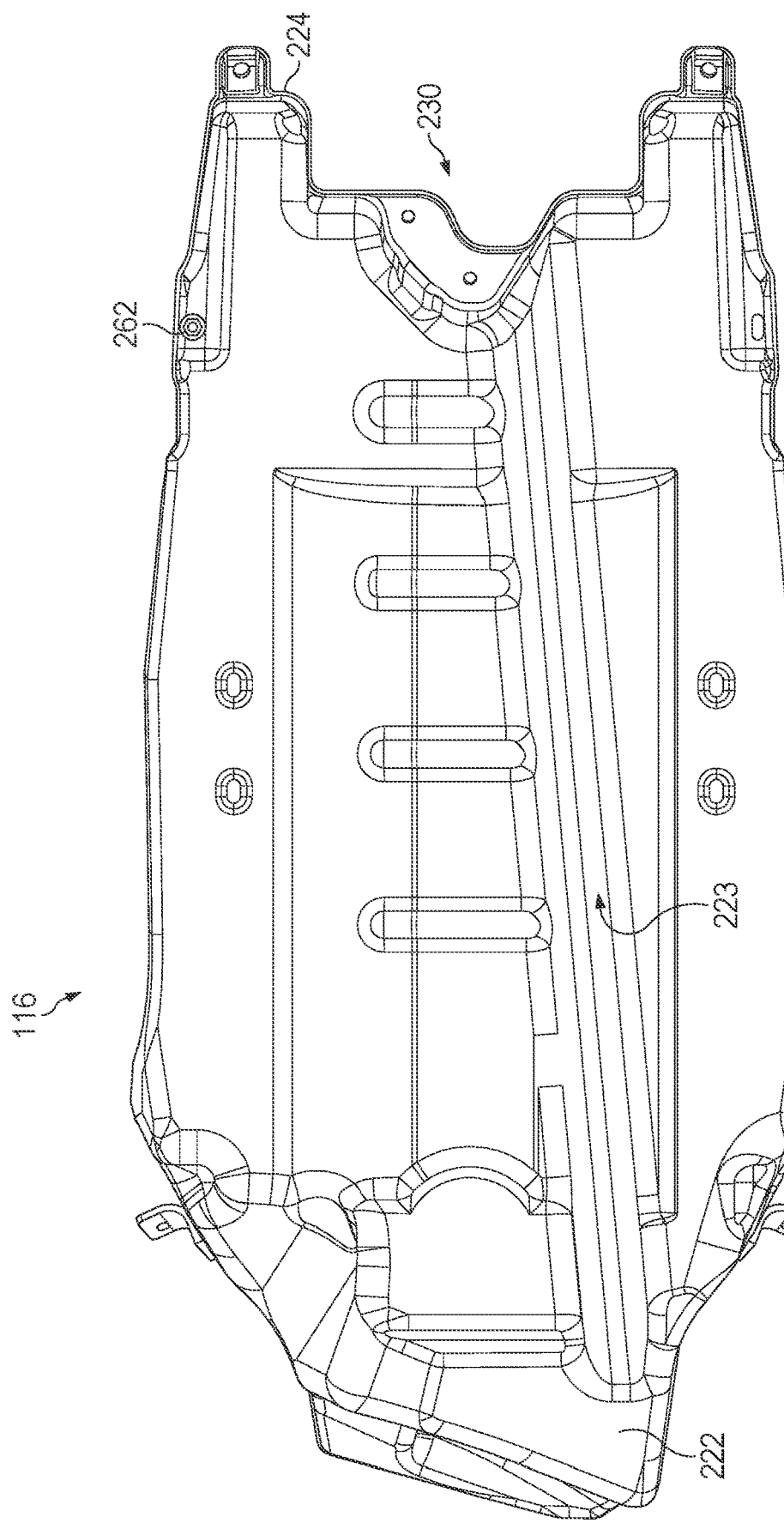
FIG. 20 illustrates a bottom view of the fuel tank, according to some embodiments.
Figure 21:
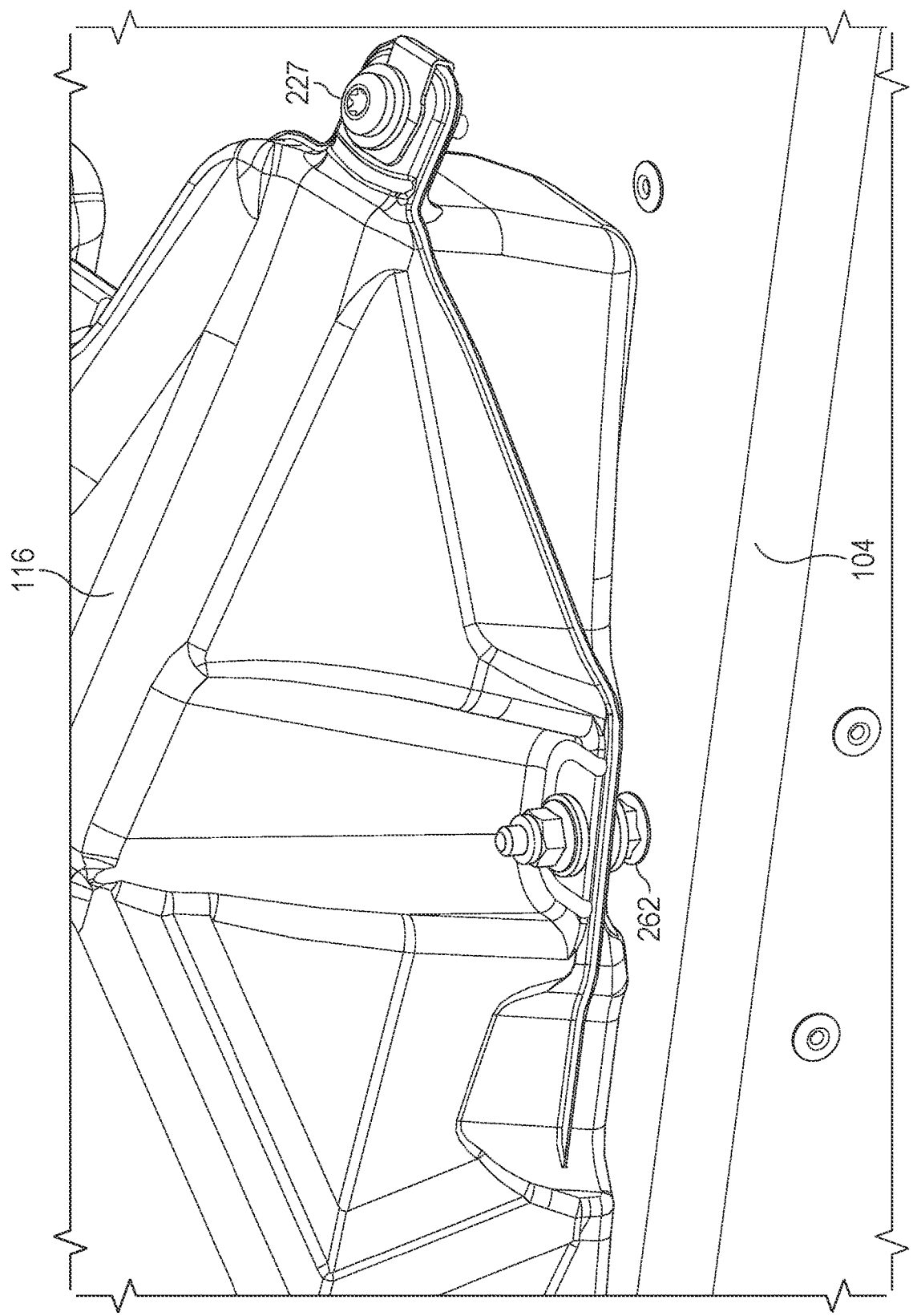
FIG. 21 illustrates close-up detail view of the fuel tank attachment to the tunnel, according to some embodiments.
Figure 23:
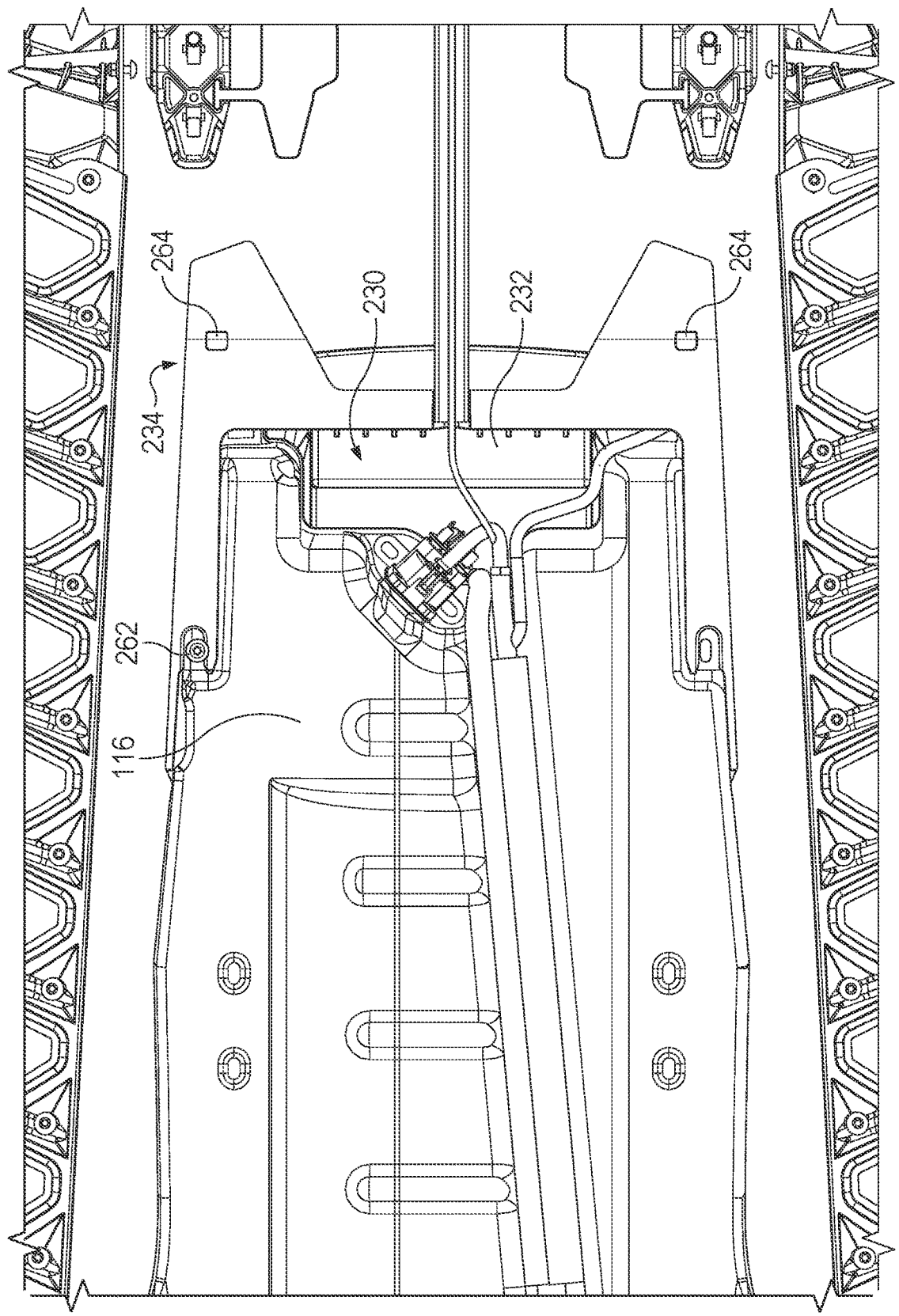
FIG. 23 illustrates a bottom view the battery installed in the battery compartment and battery cables routed through a passageway in the fuel tank, according to some embodiments.
Figure 24:
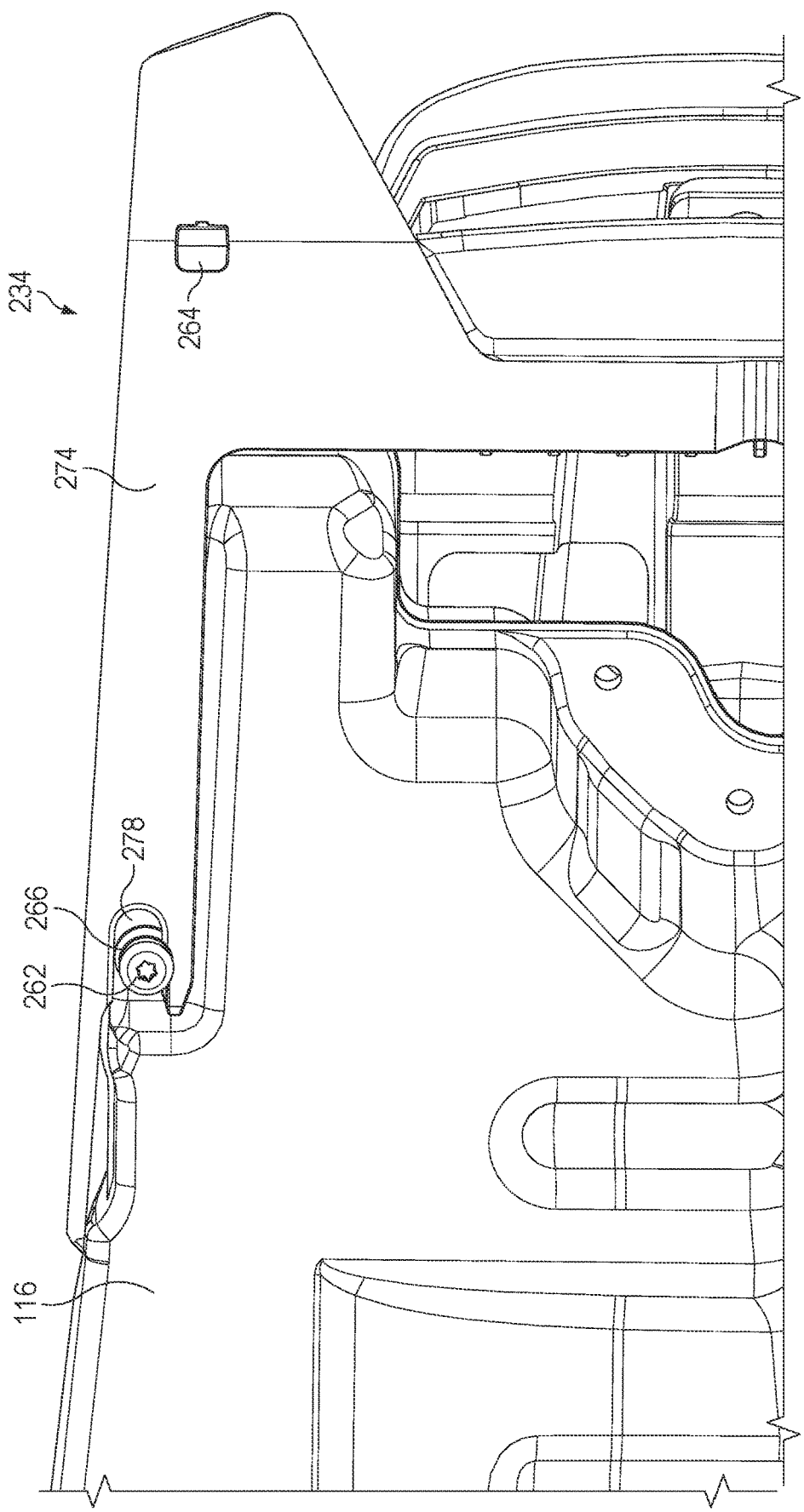
FIG. 24 illustrates close-up detail view of the rear panel attachment to the fuel tank, according to some embodiments.
Figure 25:
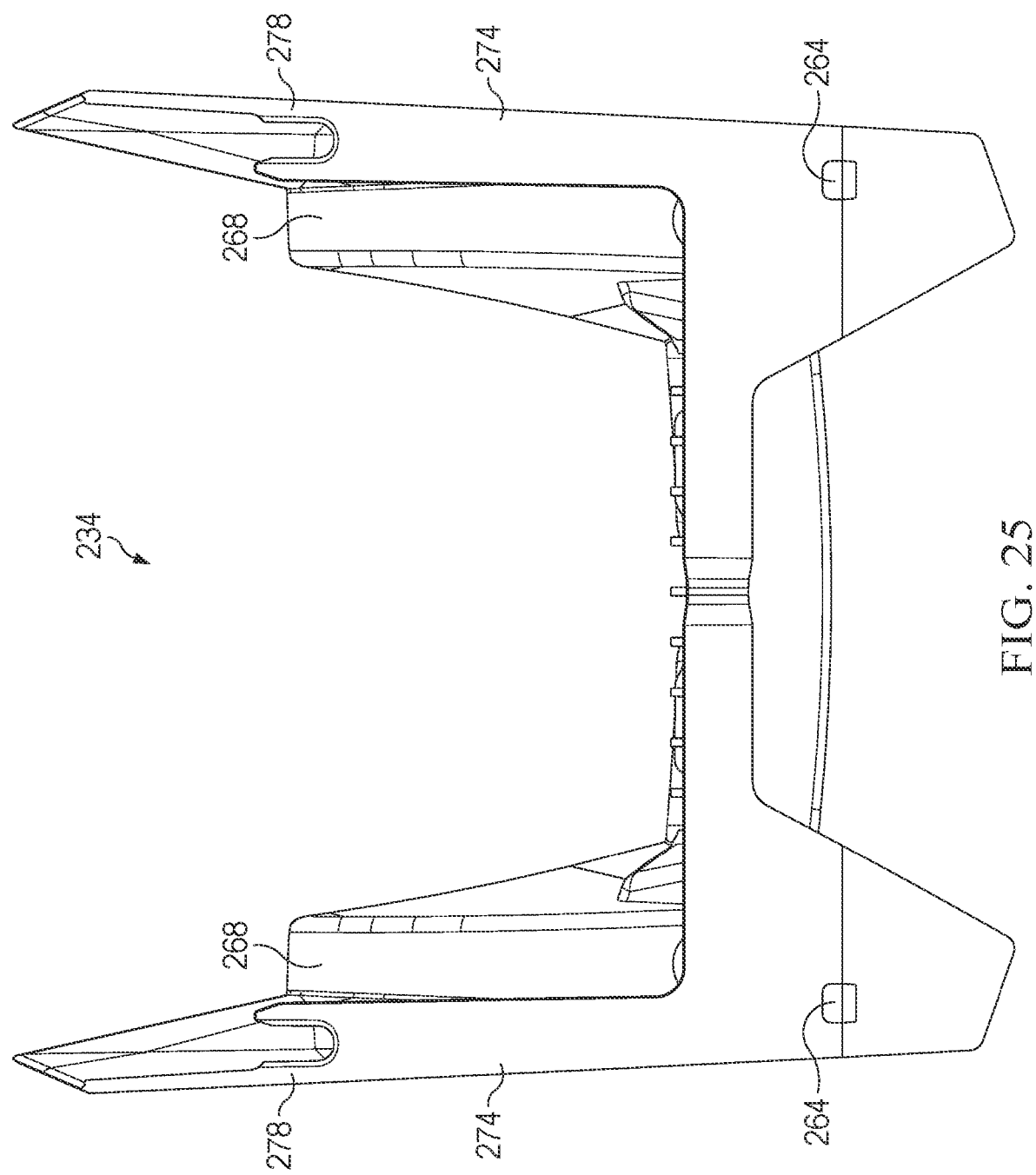
FIG. 25 illustrates a bottom view of the rear panel, according to some embodiments.

As shown in FIGS. 20 and 21, the lower outboard surface of the projections of the rear portion 224 is upwardly recessed to receive the lower wall 274 of the legs 275 thereunder as shown in FIGS. 23 and 24. The lower walls 274 define the forward engagement feature 278, which may be in the shape of an open-ended channel, at the forward end thereof that receive the fastener 262 to secure the fuel tank 116 thereto. A rearward portion of the legs 275 include one or more rearward engagement features 264 that may include a hook or foot that is insertable into the t-shaped aperture in the upper surface of the tunnel so that as the rear panel 234 slides forward to receive the projections of the rear portion 224 in the chamber 276 defined by the leg 275, the upper surface of the foot extends under the tunnel 104 and engages the underside of the tunnel 104 if an upward force is applied to the rear panel 234. The rear panel 234 may include upper wall apertures 282 to allow a fastener 227 to secure the rear panel 234 to the fuel tank 116 and/or allow an accessory (not shown) to secure to the rear panel 234.

A shelf 280 is provided that is positionable on the tunnel 104 and extends from and along a base of the rear wall 260 and forward thereof between the legs 275 and is shaped to support the electrical component, such as the starter battery 232, thereon to elevate the electrical component above the top surface of the tunnel 104. The surface of the shelf 280 extends upward as it extends toward the rear wall 260, so that the top surface of the starter battery 232 is inclined to face in the forward direction as shown in FIG. 22 with the starter battery 232 spaced apart from the upper surface of the tunnel 104 so that there is a gap maintained therebetween. The shelf 280 may include one or more ribs extending forward therefrom that may be positioned between the projections of the rearward portion 224 to provide additional support area for the starter battery 232. The rear wall 260 is angled forward to abut the rearward facing wall of the starter battery 232 to maintain support therealong. As shown in FIGS. 9 and 26, one or more rails may be provided that extend from the shelf 280 to side walls of the rear panel 234, and are aligned with the inner surface of the projections extending from the rearward portion 224 to define a substantially continuous surface that abuts and supports the outer sides of the starter battery 232 from the rearward facing wall of the fuel tank 116 to the rear wall 260 of the rear panel 234. The rearward facing wall of the fuel tank 116 includes a recess or channel as shown in FIG. 19 that extends downward and intersects a channel 223 on the underside of the fuel tank 116. The channel in the rearward facing wall receives the wiring harness extending to the starter battery 232 and routes the harness to the underside of the fuel tank 116 where a forwardly extending channel 223 as shown in FIG. 20 receives the harness and routes it to the forward portion of the vehicle.

The rear panel 234 may include a latching member 236 shown in FIGS. 8, 9, 26, and 27, for example a quarter-turn fastener, that is selectively engageable with the seat frame 206 to secure the seat frame 206 to the rear panel 234 and maintain the projections 202 and keyhole slot 216 on the seat frame 206 in engagement with the pockets 208, pillar 212, and disc 214 on the fuel tank 116. The latching member 236 extends into a tab or flange provided on a rearward portion 225 of the seat frame 206 and is further configured to inhibit the seat frame 206 from lifting upward, thus maintaining the projections 202 in the pockets 208 and the pillar 212 in the slot portion 220 of the keyhole-shaped opening 216 until the latching member 236 is disengaged from the seat frame 206. The latching member 236 may be further configured to prevent the seat frame 206 from moving laterally and/or longitudinally on the fuel tank 116. In some embodiments, the latching member 236 may be toolless, i.e., no tool or instrument is required to latch and unlatch the latching member 236. Such toolless latching member would enable the rider to remove and secure the seat frame 206 from the fuel tank 116 and the rear panel 234 with their bare hands. Toolless removal and attachment is desirable, as it allows the rider to access the chamber anywhere and anytime (e.g., on a riding trail without tools nearby).

Figure 16:
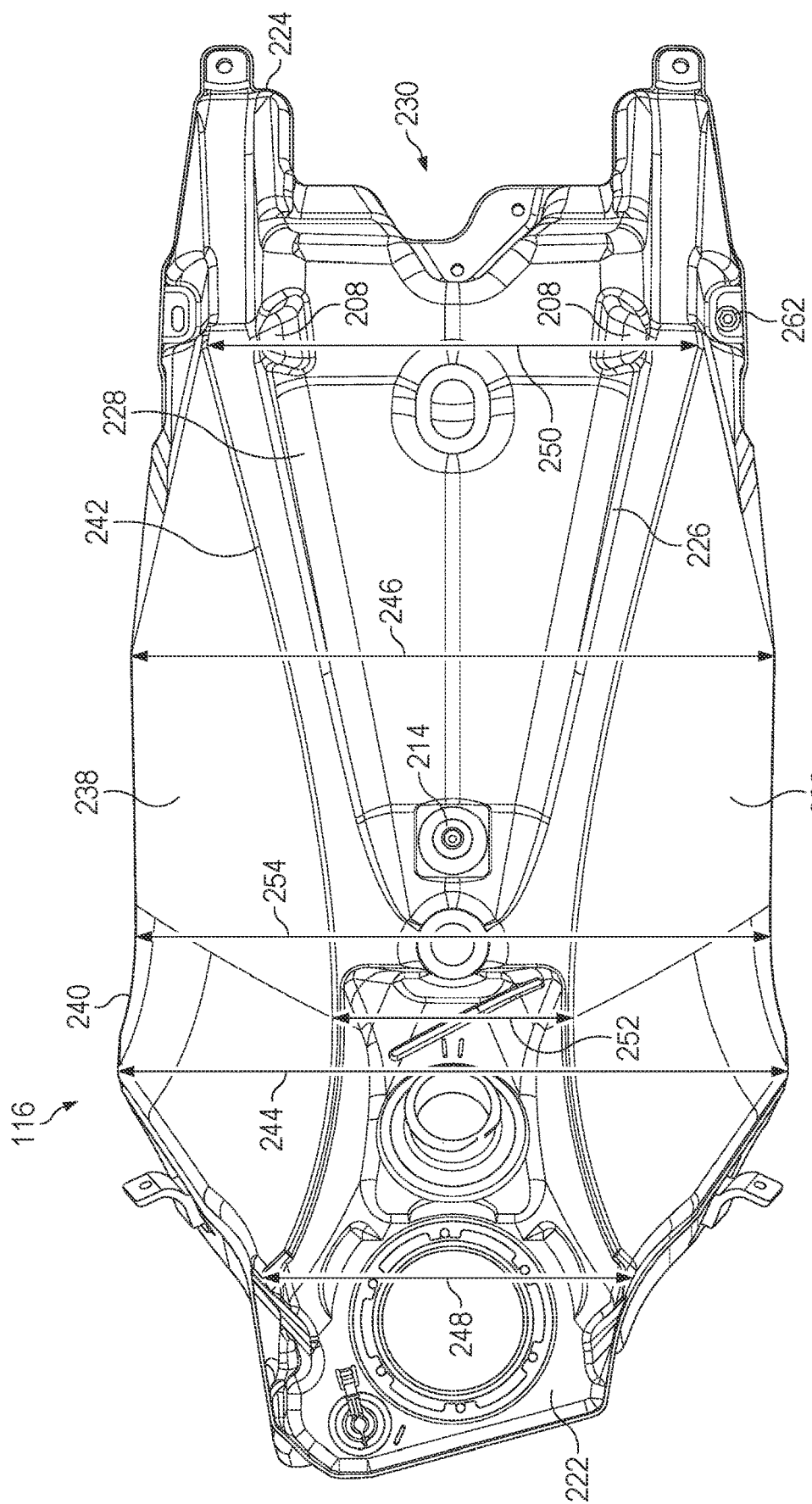
FIG. 16 illustrates a top view of the fuel tank, according to some embodiments.
Figure 17:
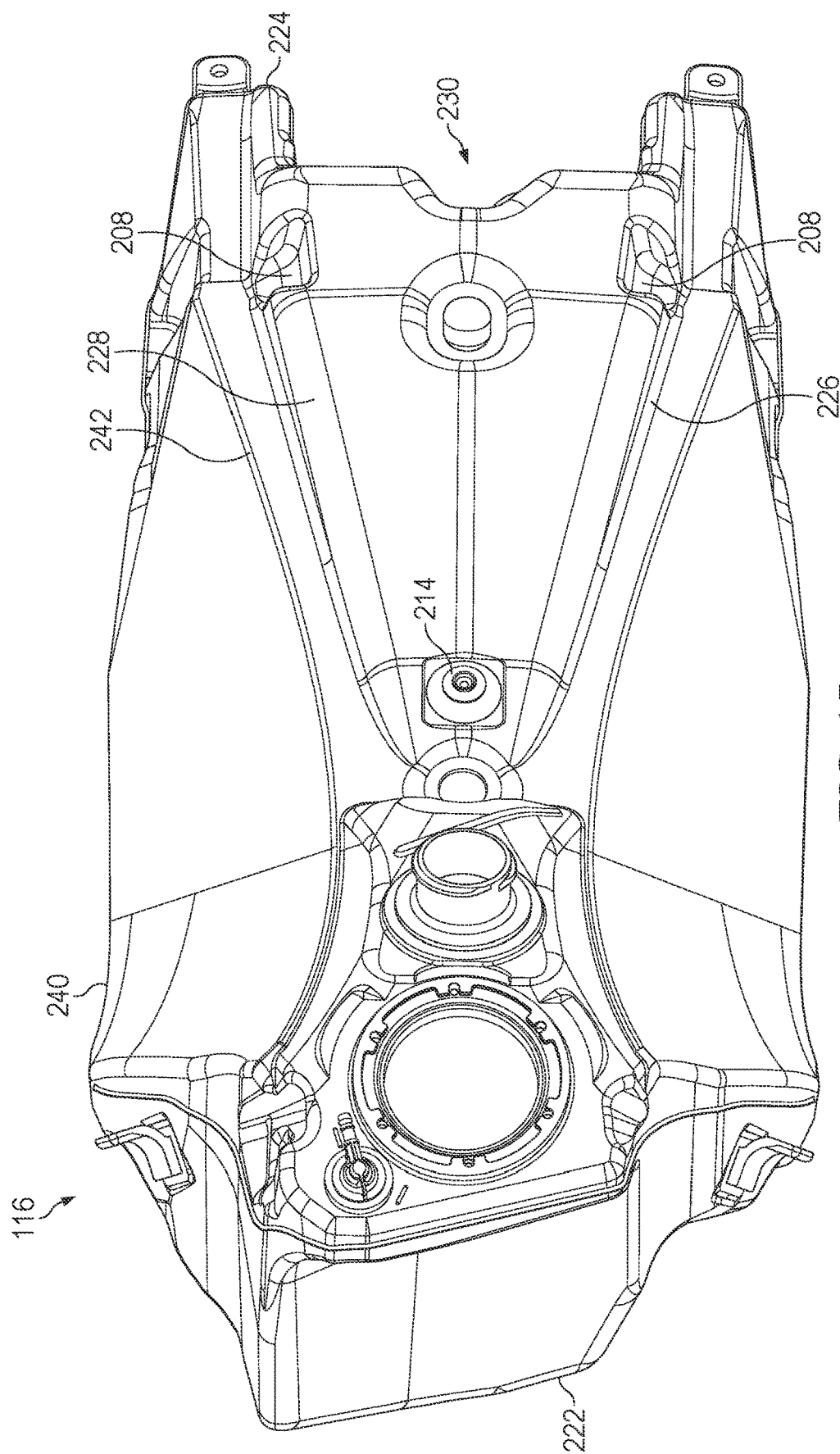
FIG. 17 illustrates a top perspective view of the fuel tank, according to some embodiments.
Figure 18:
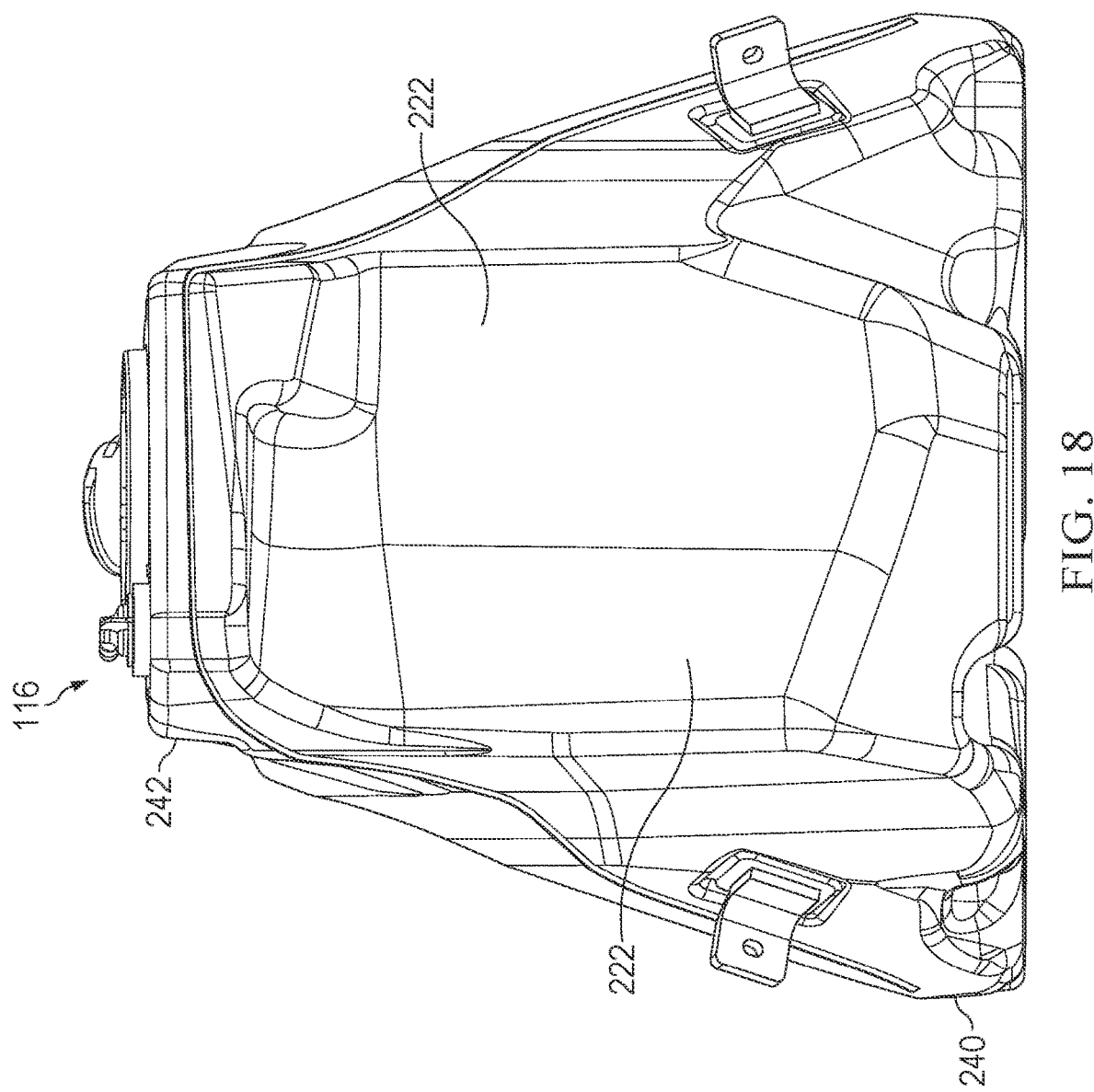
FIG. 18 illustrates a front view of the fuel tank, according to some embodiments.

The sides of the fuel tank 116 have opposed concave curved surfaces 238 shown in FIG. 16 that are configured to accommodate, for example, lower leg portions of a driver standing over the seat 118 when the driver's feet are positioned on the running boards 120. The curved surfaces 238 are configured to allow the driver to stand with each foot on opposite running boards 120 with the legs extending straight from the driver's torso without the lower portion of the driver's legs contacting the curved surfaces 238 of the fuel tank 116. This driving position may be helpful when riding the snowmobile in hilly or mountainous terrain. The fuel tank 116 may include curved surfaces 238 configured to provide narrow lower leg positions of the rider to improve maneuverability and configured to maintain a sufficiently wide base and rear mounting point(s) for seat stability.

The curved surfaces 238 are shaped so that each of the curved surfaces 238 is an unbroken and continuous curve from a base 240 positioned on the tunnel 104 to an upper surface 242 of the fuel tank 116 and from a forward portion 222 to the rearward portion 224 of the fuel tank 116. As shown in FIG. 16, a first width 244 of the fuel tank 116 at the base 240 of the forward portion 222 is greater than a second width 246 between the curved surfaces 238 at the base 240 of the rearward portion 224. A third width 248 between the curved surfaces 238 at the upper surface 242 of the forward portion 222 is less than a fourth width 250 between the curved surfaces 238 at the upper surface 242 of the rearward portion 224. The third width 248 between the curved surfaces 238 at the upper surface 242 of the forward portion 222 is at least partially located longitudinally forward of the seat 118. A point along the upper end of the curved surface 238 at the third width 248 may be at least partially, and optionally entirely, outboard of the projection 208 located on the same side of the fuel tank 116. A first minimum distance 252 between the curved surfaces 238 at the upper end of the curved surface 238 that is adjacent the upper surface 242 is at least partially disposed longitudinally forward of the seat 118. The first minimum distance 252 between the curved surfaces 238 at the upper surface 242 is disposed longitudinally forward of a location on the seat 118 where the driver sits to rest on the seat 118. A point along the upper end of the curved surface 238 at the first minimum distance 252 may be at least partially, and optionally entirely, inboard of the projection 208 located on the same side of the fuel tank 116. At least a portion of the curved surface 238 below the upper end of the curved surface 238 may define an A-surface that extends forward from the first minimum distance 252 and uninterrupted toward the third width 248. At least a portion of the curved surface 238 below the upper end of the curved surface 238 may define an A-surface that extends rearward of the first minimum distance 252 and uninterrupted to the fourth width 250. A second minimum distance 254 between the curved surfaces 238 at the base 240 is also disposed longitudinally forward of the location on the seat 118 where the driver's buttocks are configured to rest on the seat. The second minimum distance 254 between the curved surfaces 238 at the base 240 is disposed longitudinally forward of the first minimum distance 252 between the curved surfaces 238 at the upper surface 242.

As shown in FIGS. 29-47C, a seat adapter 300 can be removably attached (i.e., clipped) onto the seat frame 206 to provide different and/or additional seat support for the rider. Additional seat support can be beneficial for riders in mountainous terrain or high-performance scenarios. The seat adapter 300 allows a common seat frame and/or seat assembly base components to be used to manufacture custom saddle seats for different riding scenarios to provide different seating options for riders. For example, instead of manufacturing multiple different height, width and/or length saddle seats, a seat adapter 300 may be secured to the common seat frame 206 to provide riders with a different type of support or seat cushion as desired. Furthermore, a seat frame 206 with a removably secured seat adapter 300 could allow riders to remove or modify the seat adapter 300 to customize the ride experience.

Figure 29:
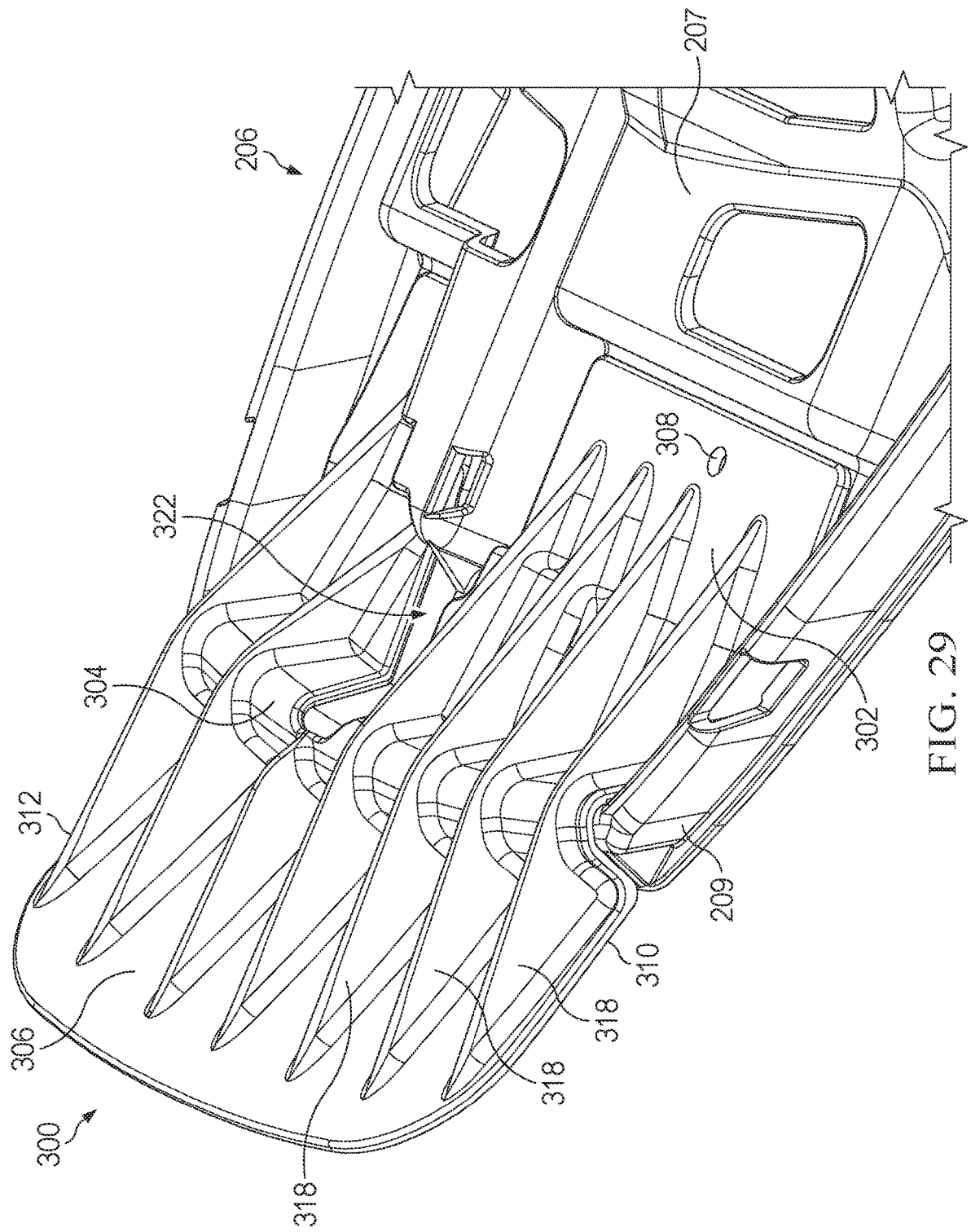
FIG. 29 illustrates a perspective view of a seat adapter attached to the seat frame, according to some embodiments.

One embodiment of the seat adapter 300 is shown in FIG. 29. The seat adapter 300 comprises a base portion 302, one or more frame engagement features such as a recess or channel 304 that may extend horizontally across the seat adapter 300, and a seat cushion support or dovetail portion 306. The channel 304 can create a ridge, for example. The seat adapter 300 may also include a plurality of ribs 318 or a plurality of gussets 320 (see FIGS. 40-41) to provide additional structural support. In some embodiments, the seat adapter 300 includes a recess 322 to allow wiring for a heating element (not shown) to pass through the seat adapter 300 to heat the seat 118.

The base portion 302 can be configured to include a bottom surface 321 (see FIGS. 44A-B) that rests against the upper surface 207 of the rearward portion 225 of the seat frame 206. In some embodiments, the base portion 302 comprises one or more frame engagement features including, but not limited to, fastener openings 308. A fastener (not shown here) such as a screw, bolt, rivet, nail, etc. can be placed through the fastener opening 308 to removably secure the seat adapter 300 to the seat frame 206.

Figure 31:
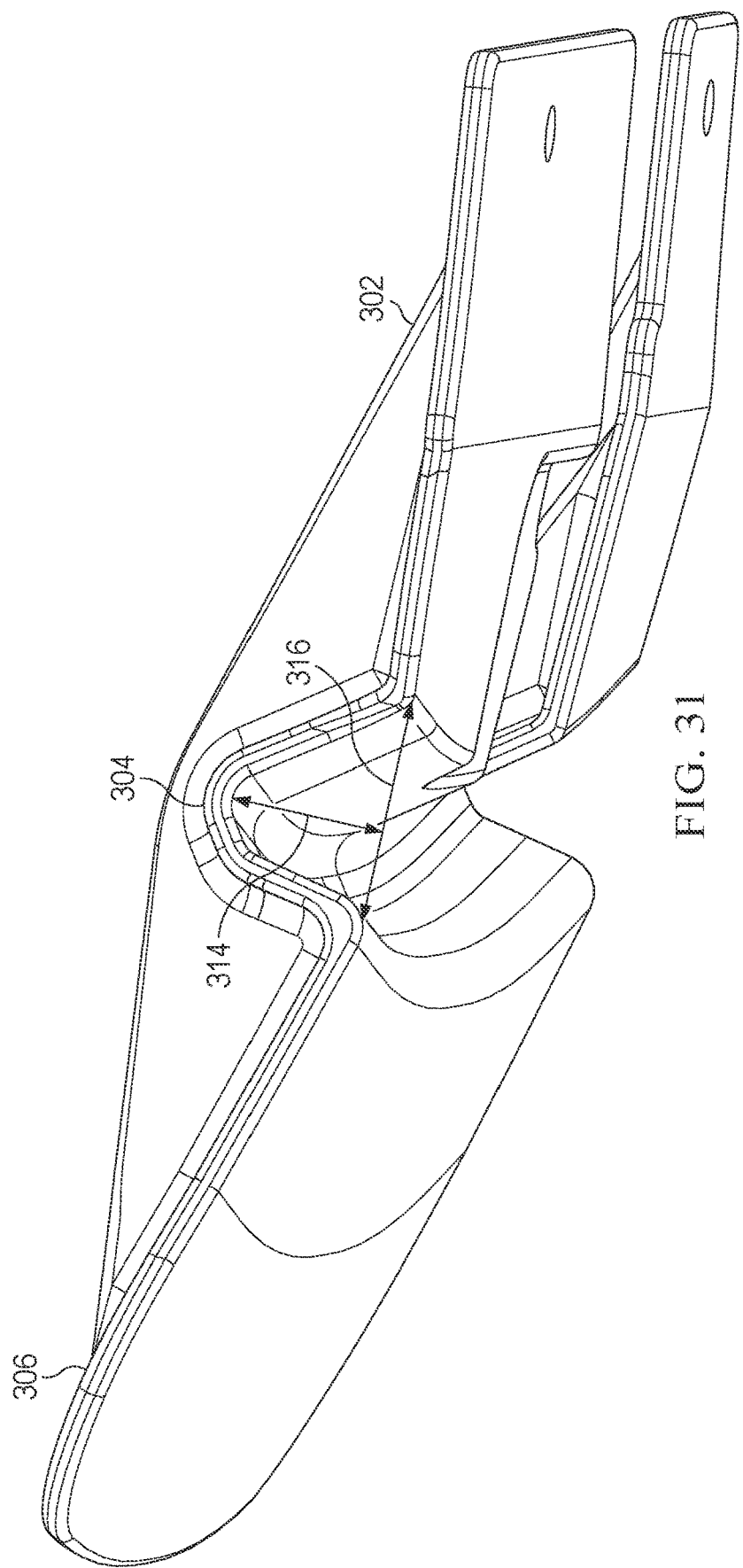
FIG. 31 illustrates a right side view of the seat adapter, according to some embodiments.
Figure 32:
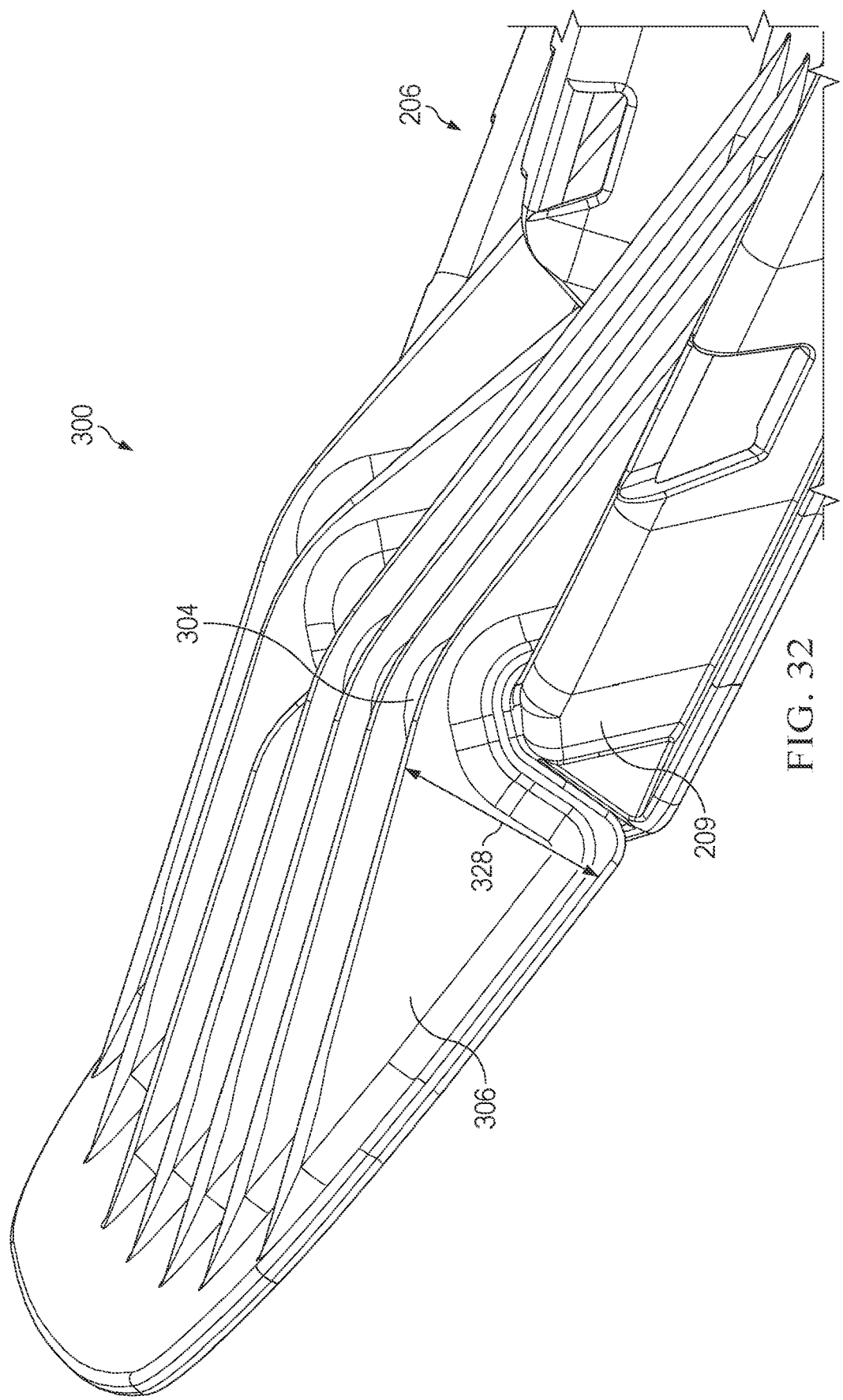
FIG. 32 illustrates a perspective view of the seat adapter attached to the seat frame, according to some embodiments.
Figure 33:
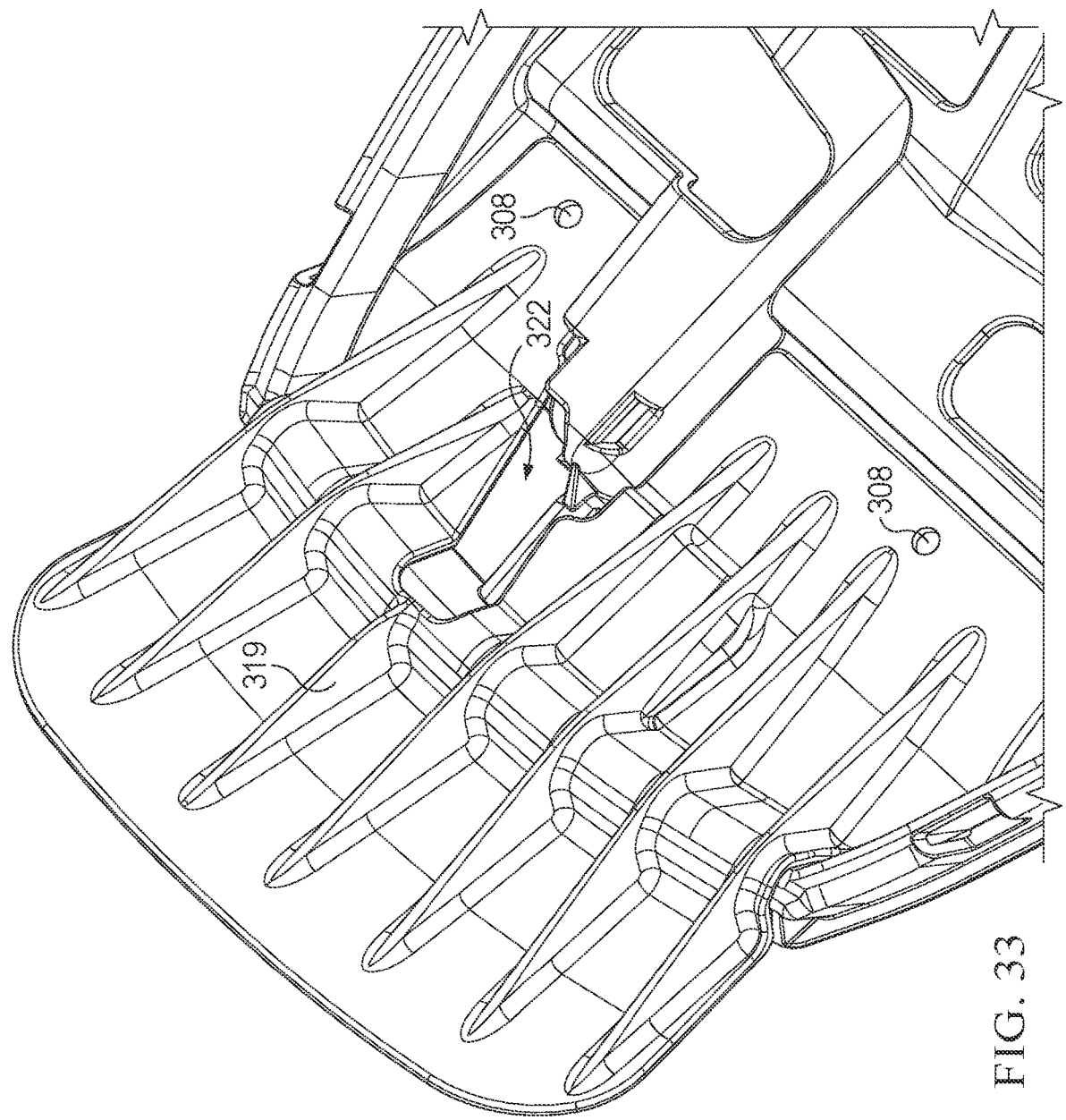
FIG. 33 illustrates a perspective view of the seat adapter attached to the seat frame, according to some embodiments.
Figure 34:
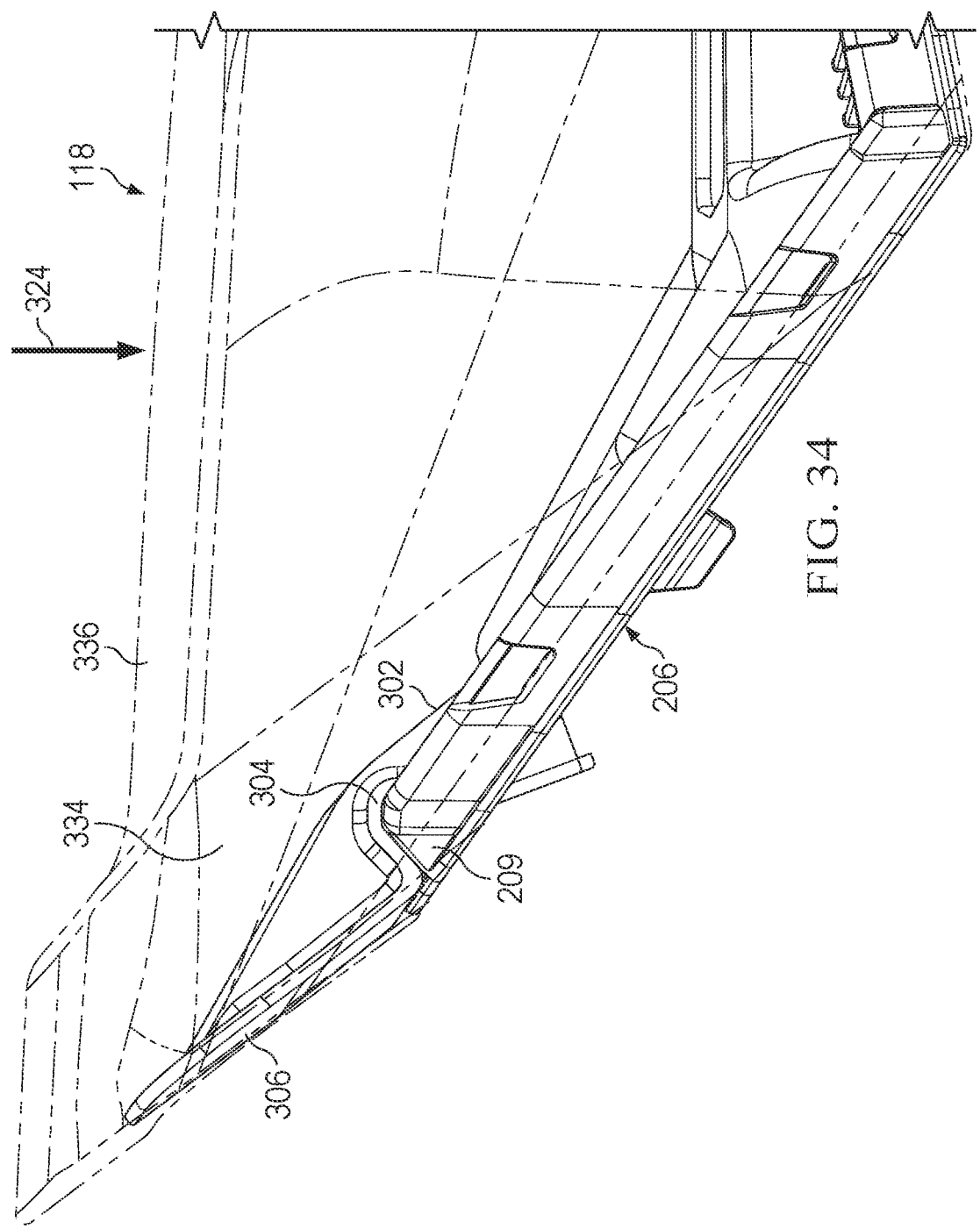
FIG. 34 illustrates a right side view of the seat adapter attached to the seat frame with the seat cover, according to some embodiments.
Figure 35:
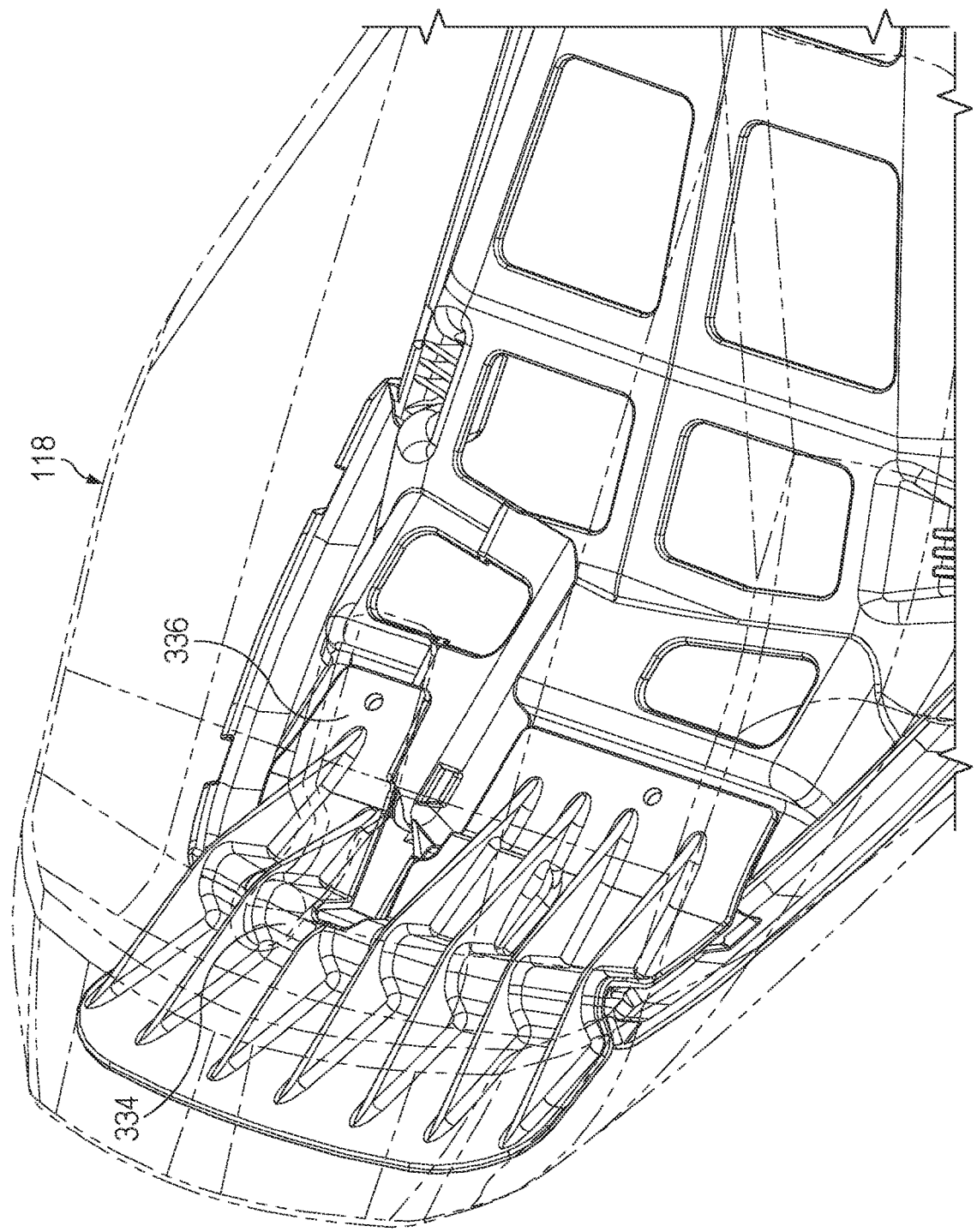
FIG. 35 illustrates a perspective view of the seat adapter attached to the seat frame with the seat cover, according to some embodiments.
Figure 36:
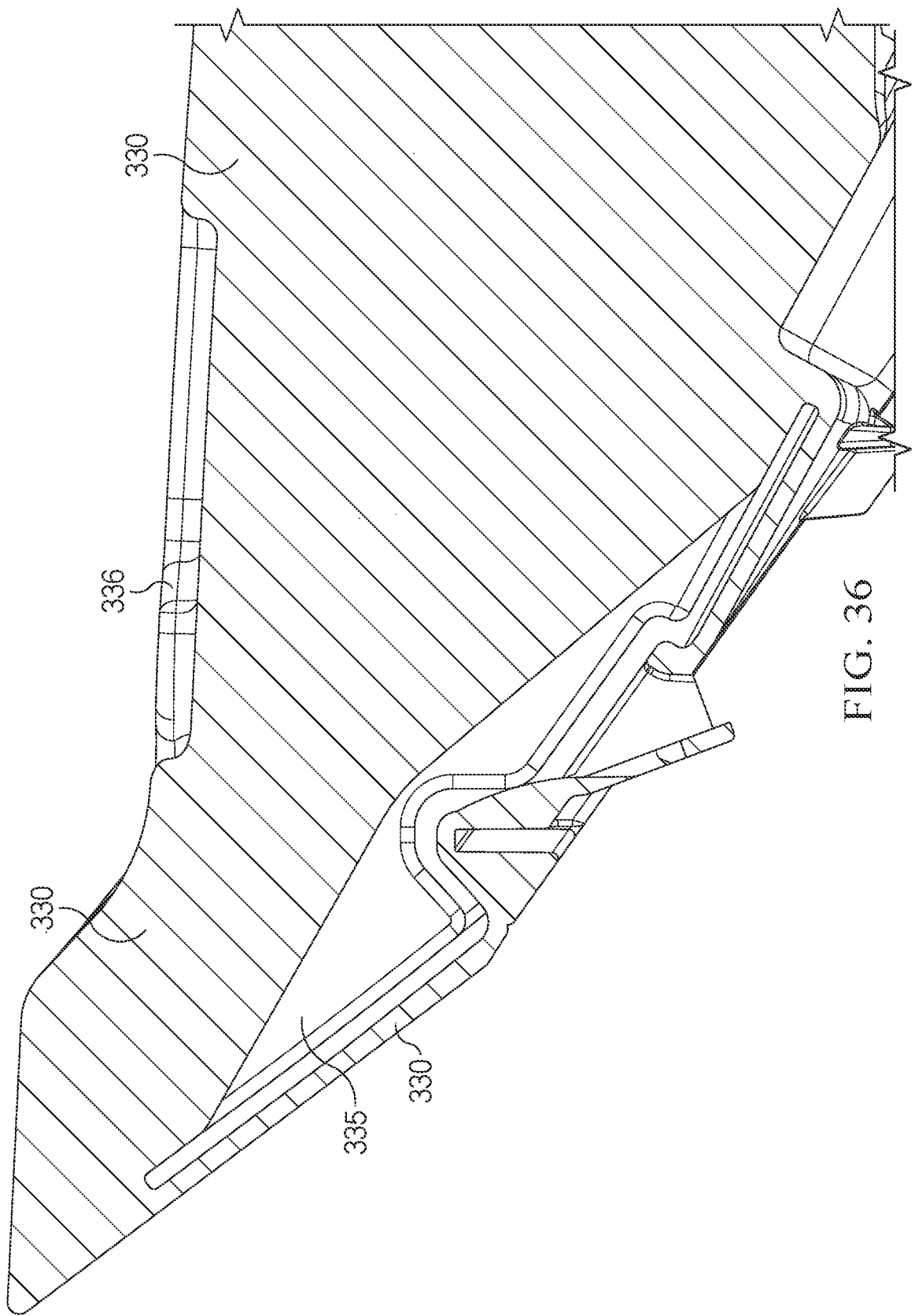
FIG. 36 illustrates a right side view of the seat adapter attached to the seat frame with the seat cushion, according to some embodiments.

The frame engagement feature may include a recess or channel 304 that receives a portion of the seat frame 206 therein. In an illustrative example, the channel 304 extends horizontally across the seat adapter 300 from a first side 310 to a second side 312. As shown in FIG. 31, the channel 304 has a channel or ridge height 314 and a channel or width 316 configured to fit around a rearward or distal end 209 of the seat frame 206. The channel 302 may be positioned about 50% the distance from a proximal end 311 of the seat adapter 300 to a distal end 313 of the seat adapter 300. In another example, the channel 304 can be positioned about 30% the distance from the proximal end 311 to the distal end 313, about 40%, about 55%, about 60%, about 70%, or between about 20% to about 80% the distance, for example. The channel 304 can be designed to clip onto the distal end 209 of the seat frame 206, wherein a force fit and/or pressure fit is used to push the seat adapter 300 onto the seat frame 206. Once the channel 304 of the seat adapter 300 is attached around the distal end 209 of the seat frame 206, the pressure fit and/or force fit provides a clipping force to hold the seat adapter 300 in place. In some embodiments, the clipping force of the channel 304 on the distal end 209 is sufficient to anchor the seat adapter 300 in place and no other fastening components are needed as the seat adapter is sandwiched between the seat frame 206 and the seat cushion 330 when the seat cushion 330 is secured to the seat frame 206. In other embodiments where an additional connection is desired, additional fasteners can be used to secure the seat adapter 300 to the seat frame 206.

Figure 30:
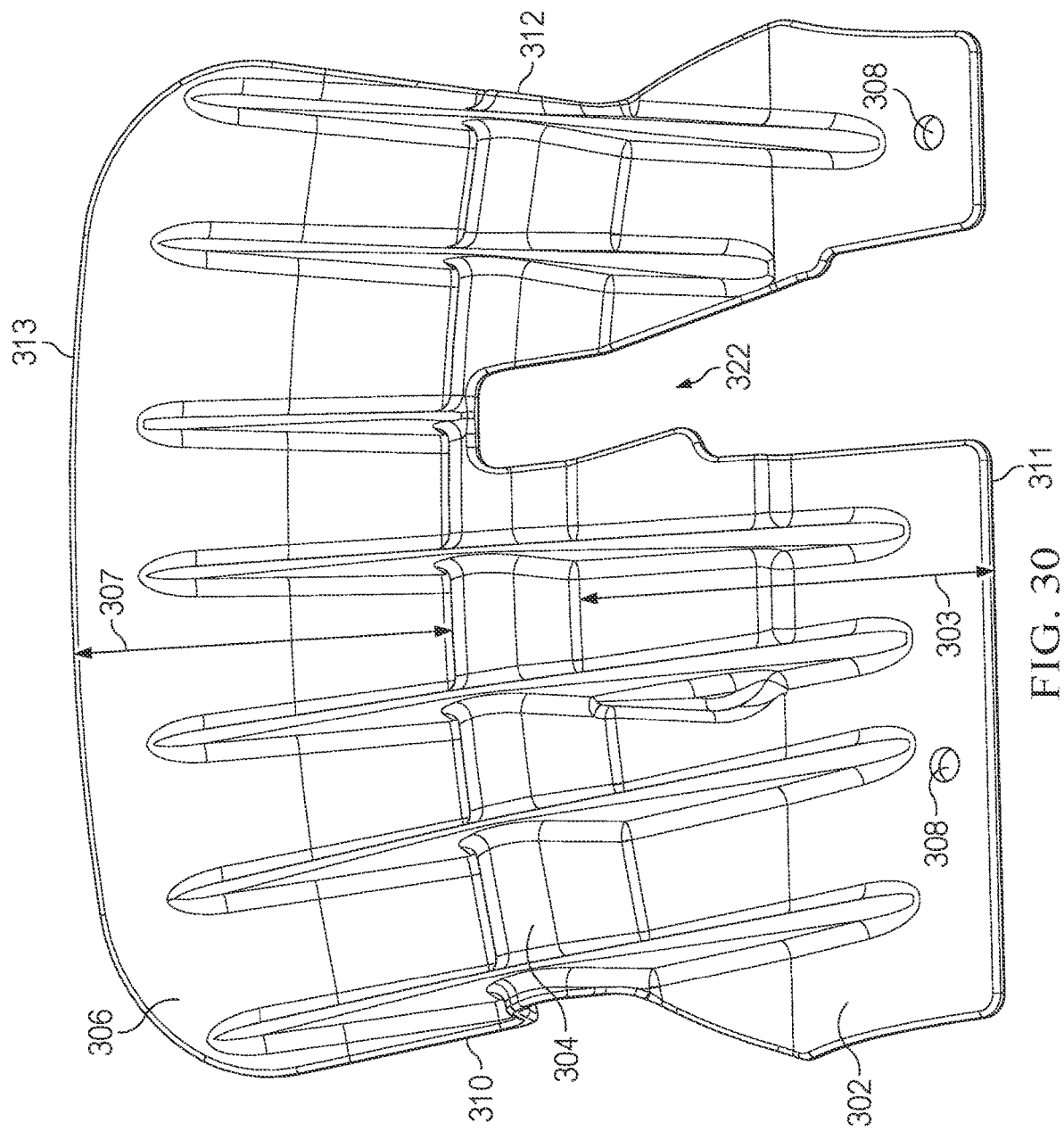
FIG. 30 illustrates a top view of the seat adapter, according to some embodiments.

In an illustrative example, the rider's weight (as indicated by arrow 324 in FIG. 34) on the seat 118 provides a downward force upon the seat adapter 300. This downward force acts on the base portion 302 and the channel 304 to anchor the seat adapter 300 in place and maintain the connection between the seat adapter 300 and the seat frame 206. The seat adapter 300 may act as a cantilever with the weight on the base portion 302 and the channel 304 forcing the dovetail portion 306 upward. In an illustrative example as shown in FIG. 30, the base portion 302 has a base length 303 that may be equal to, or substantially equal to the dovetail length 307. However, in other illustrative examples, the base length 303 to the dovetail length 307 ratio can be modified to maintain an adequate cantilever to secure the seat adapter 300 to the seat frame 206. For example, the length 307 may be greater than the length 303.

The dovetail portion 306 may extend rearward from the distal end 209 of the seat frame 206. In some embodiments, the dovetail portion 306 is configured to extend rearward of the distal end 209 of the seat frame 206 at a steeper angle than the angle of the distal end 209 of the seat frame (see FIG. 34). In other embodiments, the dovetail portion 306 may extend rearward at the same angle of the distal end 209, or the dovetail portion may extend rearward at a lesser angle than the angle of the distal end 209. The dovetail portion 306 increases the total seat length of the seat frame 206, and the angle of the dovetail portion 306 modifies the amount of support provided to the seat cushion 330 by the seat frame 206.

In an illustrative example, the plurality of ribs 318 may extend from the base portion 302, over the ridge 304, to the dovetail portion 306. In some embodiments, each of the ribs 318 has a rib height 328 wherein the rib height 328 is greater than the ridge height 314. The greater rib height 328 to the ridge height 314 may allow the ribs 318 to transfer a greater load. For instance, if the ridge height 314 was greater than the rib height 328, the ridge 304 may impede the load transfer from the dovetail portion 306 to the base portion 302, and vice-versa.

Figure 42:
FIG. 42 illustrates a bottom perspective view of the seat adapter on the seat frame, according to some embodiments.
Figure 43:
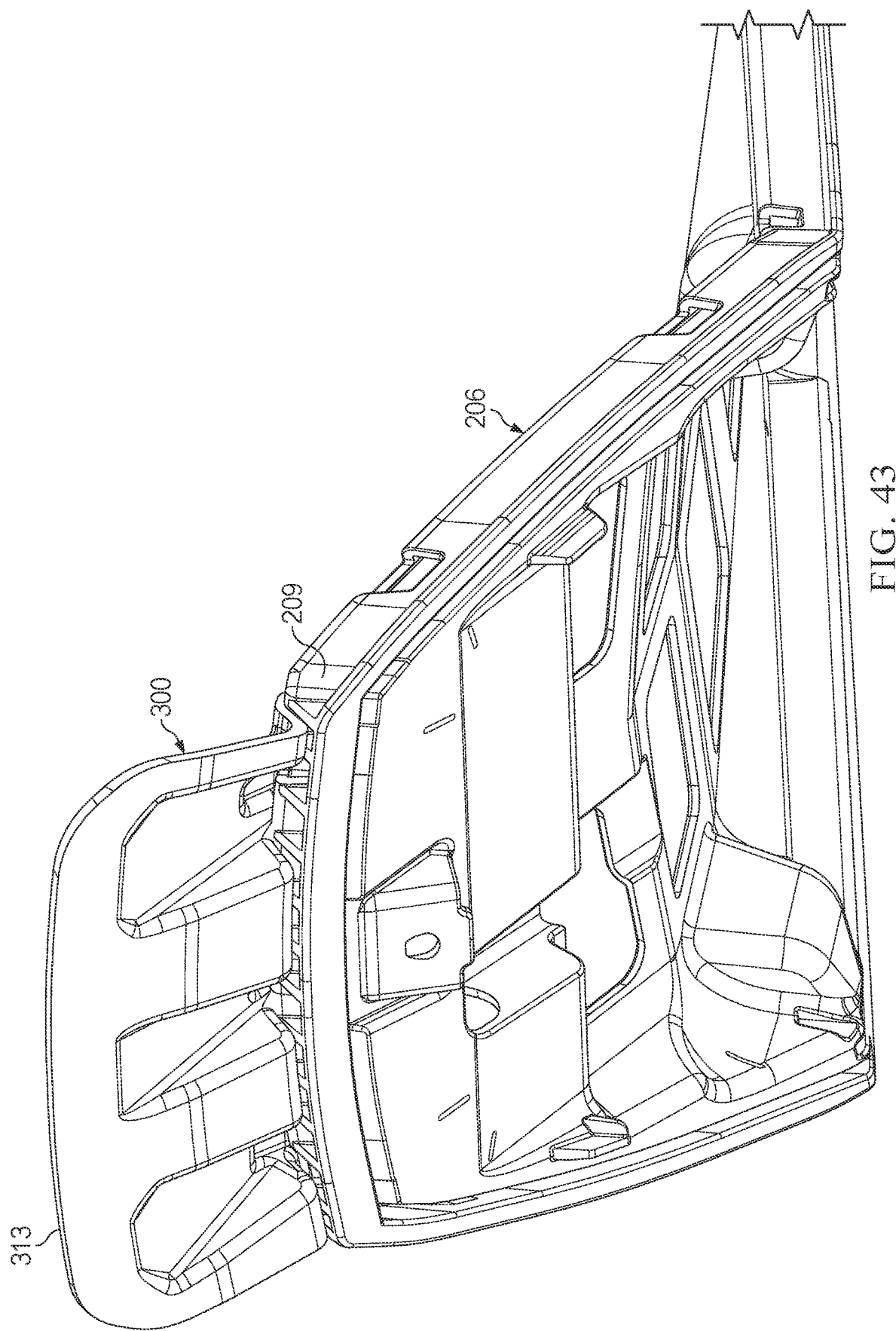
FIG. 43 illustrates a perspective view of the seat adapter on the seat frame, according to some embodiments.
Figure 44A:
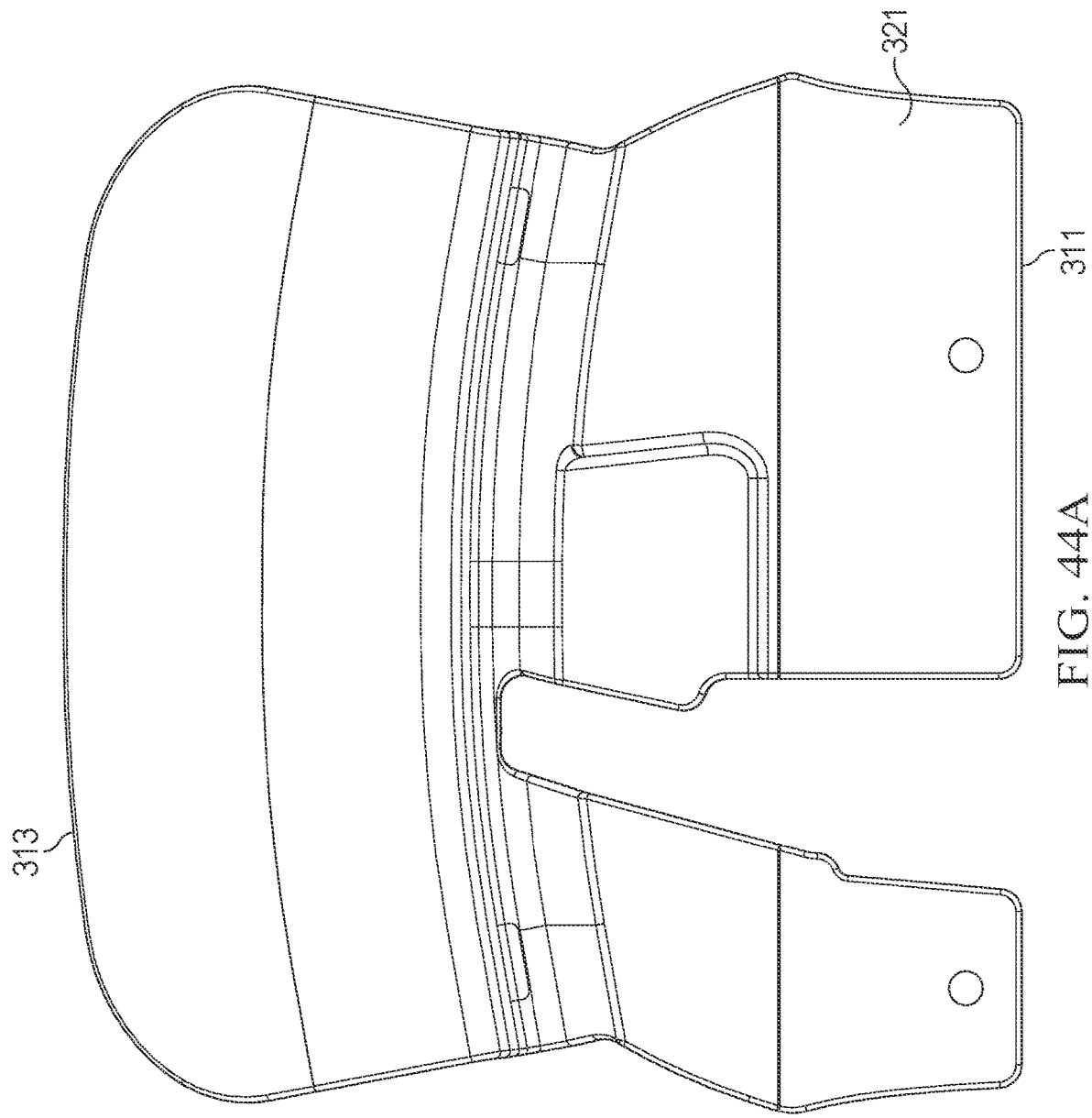
FIG. 44A illustrates a bottom view of the seat adapter, according to some embodiments.
Figure 44B:
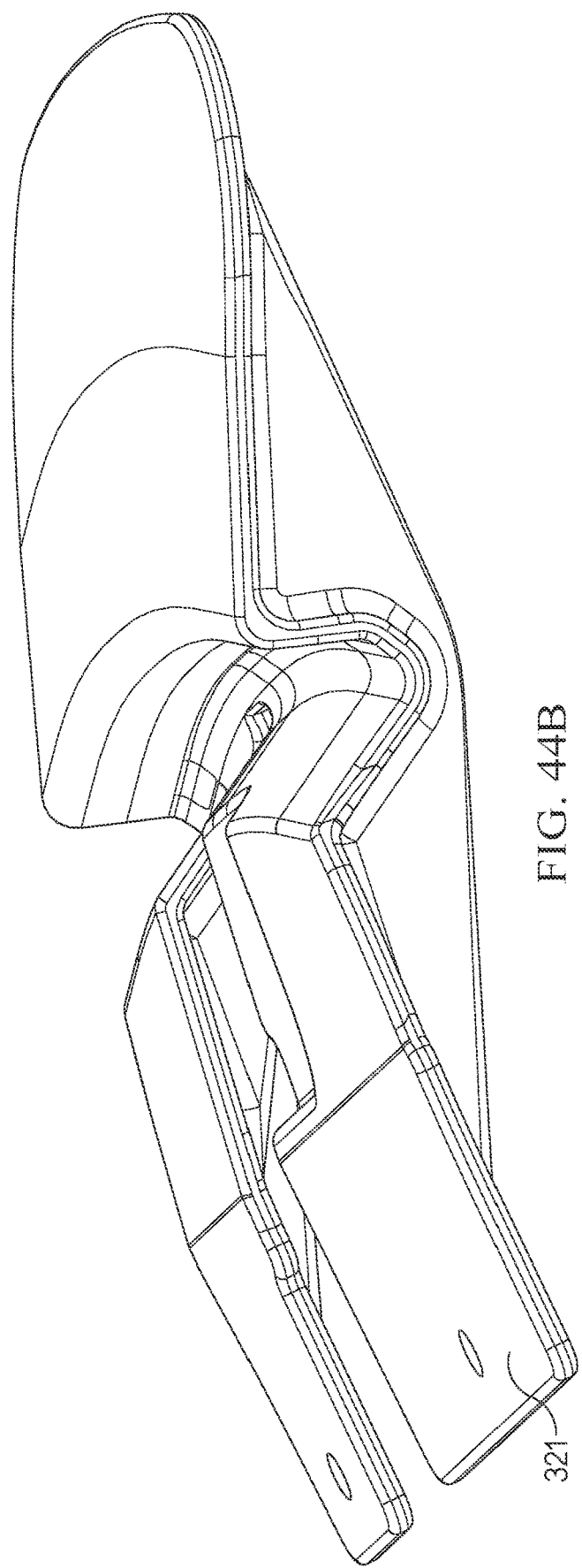
FIG. 44B illustrates a bottom perspective view of the seat adapter, according to some embodiments.

Although shown in a parallel configuration, the plurality of ribs 318 need not be parallel. The ribs 318 may intersect each other or travel horizontally from the first side 310 to the second side 312 of the seat adapter 300. The seat adapter 300 may incorporate one or more partial ribs 319 (see FIG. 33) to provide support. In addition to, or alternatively, one or more gussets 320 may be provided to increase the structural strength of the seat adapter 300 (see FIGS. 40-41). The gussets 320 may extend over the ridge 304 and have a greater height than the ridge height 314. The gussets 320 may include a rearward portion positioned on the dovetail portion 306 with a first width, a middle portion positioned over the ridge 304 with a second width, and a forward portion positioned on the base portion 302 with a third width. The width of the gussets 320 may narrow as they extend from the dovetail portion 306 or the base portion 302 so that the second width is less than each of the first width and the third width. The forward portion of the gussets 320 may extend over the ridge 304 and onto the rearward portion of the gussets 320 in a region adjacent to the ridge 304. As shown in FIGS. 42 and 43, the seat adapter 300 may engage the distal end 209 of the seat frame in a continuous or intermittent manner.

The seat adapter 300 may comprise a metal, a metal alloy, a polymeric material or a composite material. The composite material may include one or more fibers in a polymer matrix. In an illustrative example, the composite material may comprise a glass filled nylon. In certain embodiments, the seat adapter may be formed of about 10%-55% glass fiber reinforced nylon. In other embodiments, different thermoplastic molding techniques or fiber molding techniques may be used to form the seat adapter 300. Different materials may be used to modify the strength and/or flexibility of the seat adapter 300.

The seat frame 206 may comprise a metal, a metal alloy, a polymeric material, or a composite material. In an illustrative example, the seat frame 206 may be formed through an injection molding process using high density polythene (HDPE). HDPE is generally a lower-cost material than glass filled nylon with lower rigidity and strength. However, the seat frame 206 is supported by the upper surface 210 of the fuel tank 116, so high structural strength or rigidity is not required. In contrast, the seat adapter 300 in some configurations may only be supported by the seat frame 206 (and/or the fuel tank 116) on the base portion 302 and the ridge 304. In such a configuration, the dovetail portion 306 is not directly supported by the seat frame 206 or the fuel tank 116, and hence, a stronger material may be required for the seat adapter 300. Therefore, the properties of the seat assembly can be tailored by providing a seat adapter 300 comprising a material that is different than the material of the seat frame 206 to maintain a desired seat support in the rear for a type of seat cushion that might benefit from additional reinforcement.

Figure 37:
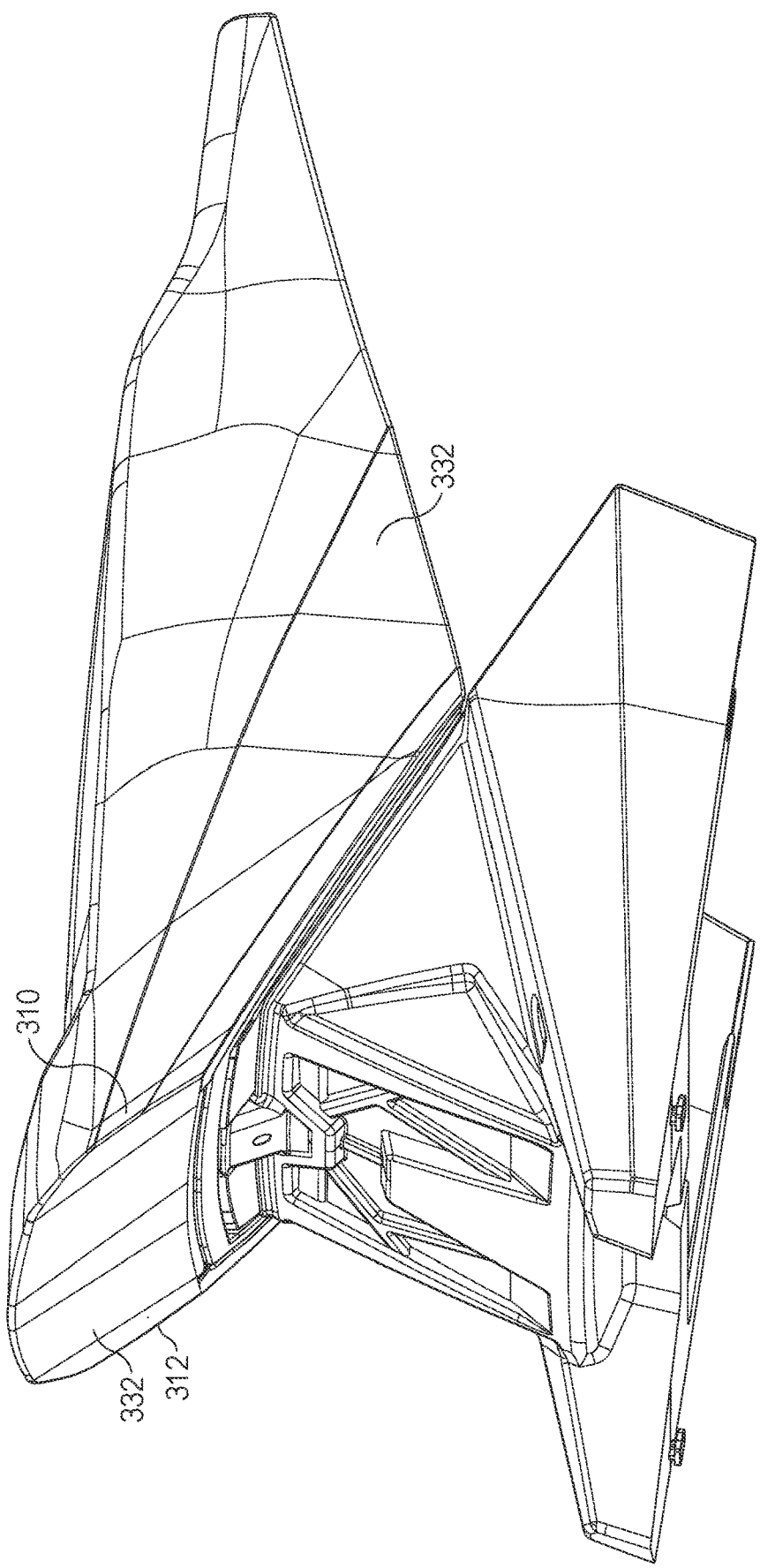
FIG. 37 illustrates a perspective view of the seat with a seat adapter, according to some embodiments.

As shown in FIGS. 34-37, the seat adapter 300 and the seat frame 206 may be internal components of the seat 118. In other words, a seat cover 332 may encapsulate the seat adapter 300 and optionally the seat frame 206. The seat cover 332 may be a thin, water-resistant layer on the exterior surface of a seat cushion 330. In an illustrative example, the seat cushion 330 may comprise a foam. In the embodiment shown in FIG. 36, the seat cushion 330 covers the top surface of the seat adapter 300 and the bottom surface of the seat adapter 300, with the seat cover 332 (not illustrated in FIG. 36) surrounding the seat cushion 330. In other embodiments, the seat cushion 330 may only cover the top surface of the seat adapter 300, and the seat cover 332 covers the bottom surface of the seat adapter 300. As seen in FIG. 37, both the first side 310 and the second side 312 of the seat adapter is covered by the seat cushion 330 and the seat cover 332. The additional seat support provided by the seat adapter 300 may be internal to the seat 118.

Figure 45:
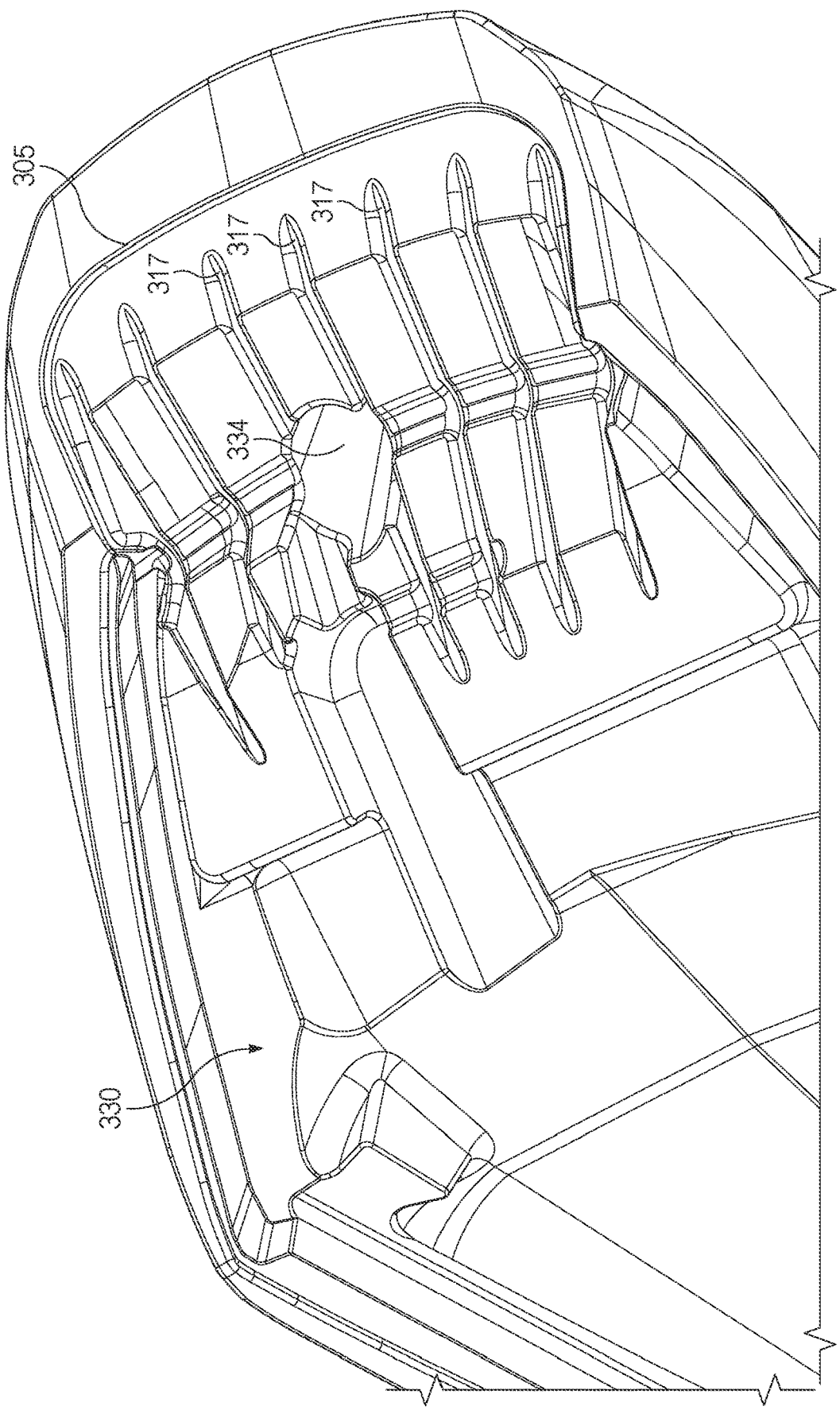
FIG. 45 illustrates a bottom perspective view of the seat cushion, according to some embodiments.

As shown in FIG. 45, the seat cushion 330 may be designed to conform to the seat adapter 300. For instance, the embodiment of FIG. 45 illustrates a bottom view of the seat cushion 330 including rib channels 317 and seat adapter outline 305, wherein each of the rib channels 317 is configured to receive and mate with the rib 318 of seat adapter 300. In other embodiments, the seat cushion 330 may include impressions to receive and mate with the gussets 320 of the seat adapter 300. The seat cushion 330 may be recessed and configured to fit to the seat adapter 300 within the recess to prevent movement and/or sliding of the seat adapter 300. In some embodiments, the seat adapter 300 can be secured to the seat frame 206 before securing the seat adapter 300 to the seat cushion 330, or the seat adapter 300 can be secured to the seat cushion 330 before securing the seat adapter 300 to the seat frame 206. As shown in FIG. 45, the underside of the seat cushion 330 is provided with a projection that is shaped to fit into the recessed side of the upper surface of the seat frame 206 that forms the projection 202 (as shown in FIG. 7).

In some embodiments, the seat cushion 330 and the seat cover 332 may be designed to allow a heating element (not shown) to heat the seat. For instance, in FIG. 34 the seat frame 206 includes an opening that receives wiring from the chamber 230, the wiring passes through an opening, such as the recess 322, in the adapter 300, the wiring then extends through the seat cushion 330 that includes a vertical channel 334 to allow the wiring to pass through, and the seat cover 332 includes a recess 336 to house a heating element near the surface of the seat 118. The heating element can provide heating to the seat 118 to increase the rider's comfort in winter conditions.

Figure 38:
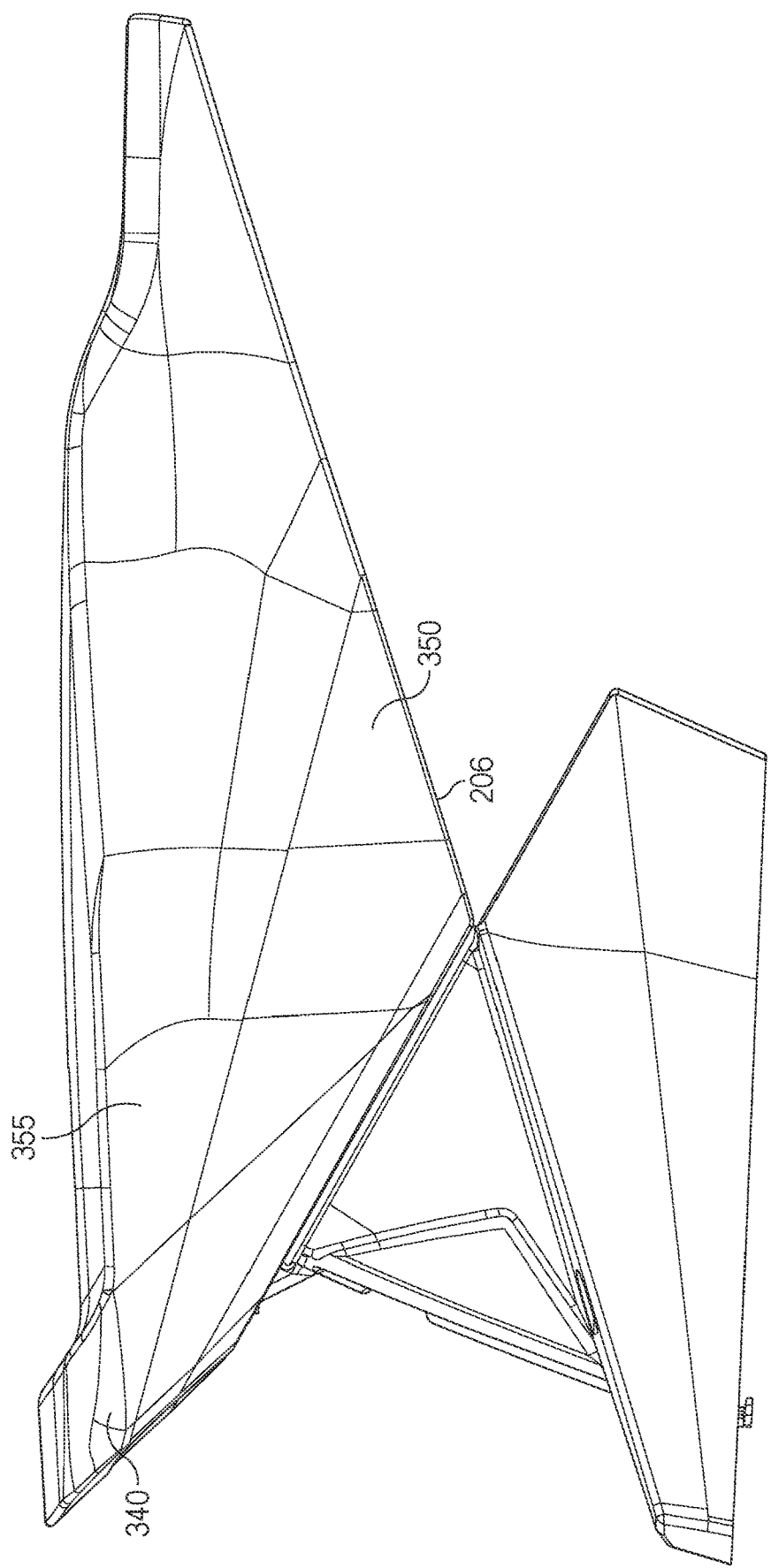
FIG. 38 illustrates a right side view of a first type of seat cushion with the seat adapter, according to some embodiments.
Figure 39:
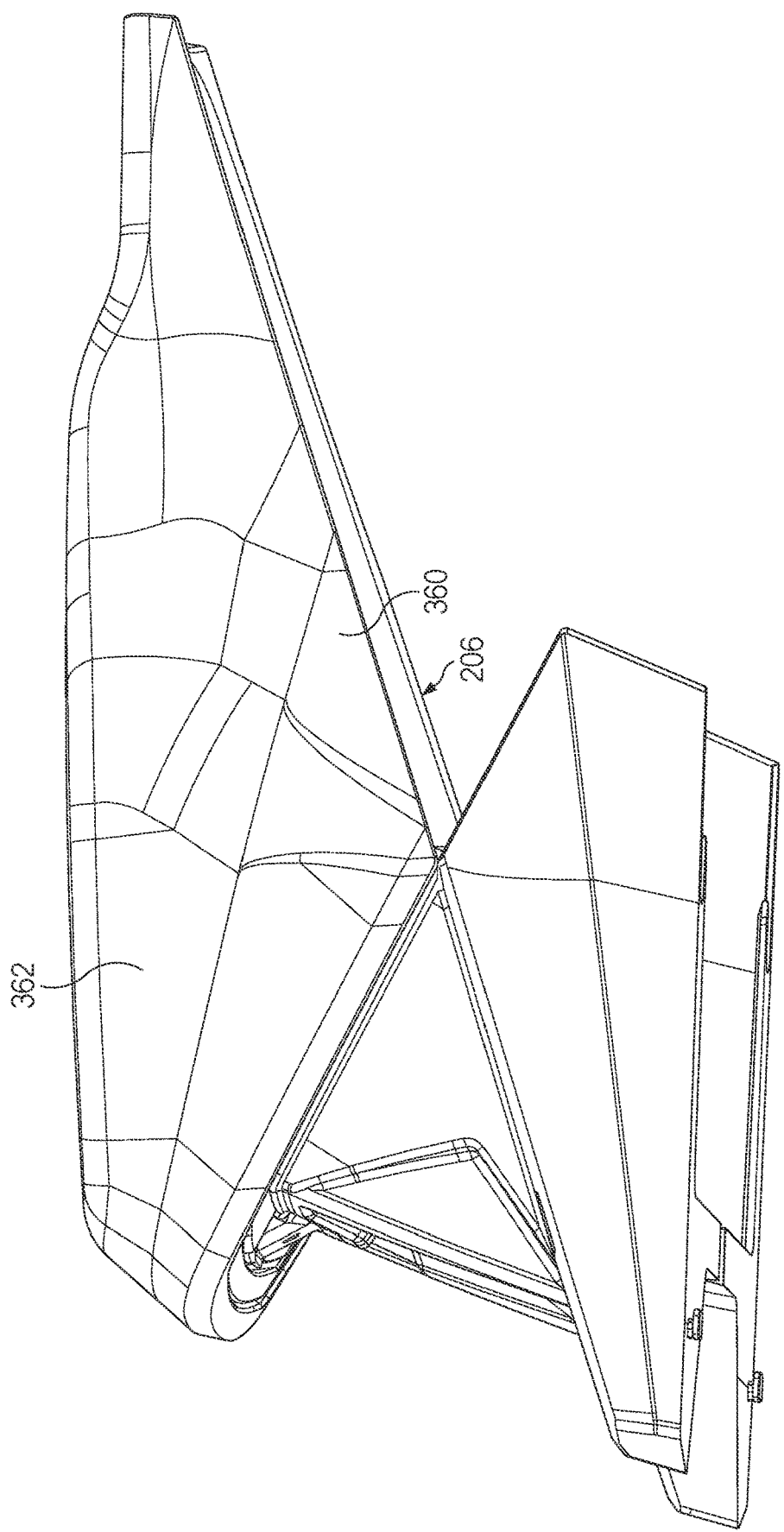
FIG. 39 illustrates a right side view of a second type of seat cushion that is different than the first type and is without the seat adapter, according to some embodiments.
Figure 40:
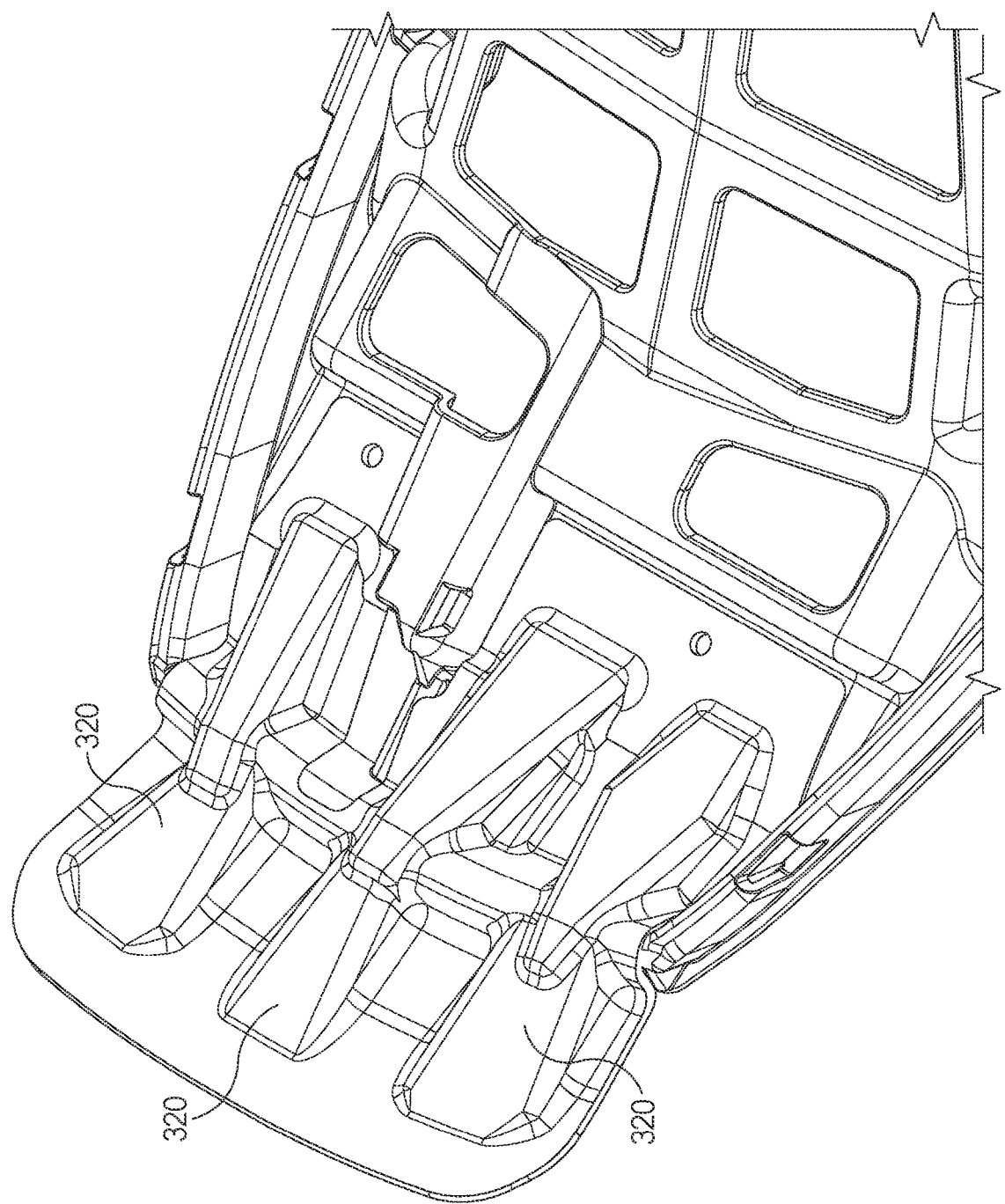
FIG. 40 illustrates a perspective view of the seat adapter attached to the seat frame, according to some embodiments.
Figure 41:
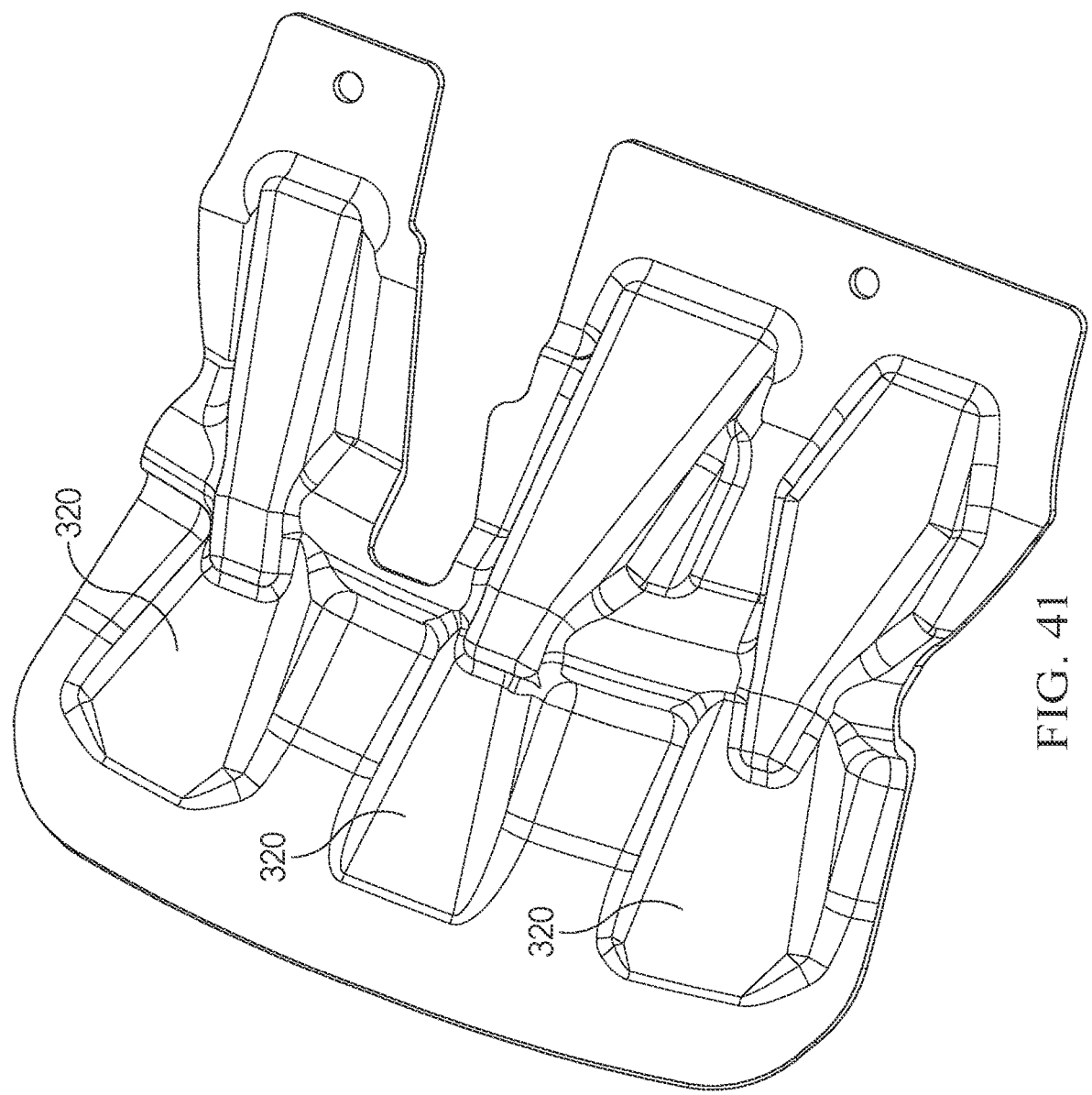
FIG. 41 illustrates a top view of the seat adapter, according to some embodiments.

As shown in FIG. 38, a seat 350 with the seat adapter 300 includes an additional seat support area 340. In contrast, FIG. 39 shows a seat 360 without the seat adapter 300. The seat 350 and the seat 360 both include the seat frame 206 that is positioned on the fuel tank 116 and the rear panel 234, however, the seat 350 further includes the seat adapter 300 which gives it the additional support area 340 for the portion that extends further rearward from the rear panel 234 than the rearmost portion of the seat 360. Therefore, a different seat cushion may be used on the snowmobile, depending on whether the seat adapter 300 is present (FIG. 38) or whether the seat adapter 300 is not present (FIG. 39).

In other words, at least two different snowmobile seats can be assembled on the common seat frame 206, the fuel tank 116, and/or the rear panel 234. The seat frame 206 may be a common seat frame, wherein a first seat cushion 362 or a second seat cushion 355 that is different than the first seat cushion may be secured to the seat frame 206. The seat adapter 300 including a cushion support portion 335 may be secured to the seat frame 206, and the second seat cushion 355 may also be secured to the seat frame 206. The seat adapter 300 is not secured to the seat frame 206 when the first seat cushion 362 is secured to the seat frame 206. The seat frame 206 with either seat cushion 355 or 362 may then be secured to the fuel tank 116, and optionally, the rear panel 234.

An illustrative method of assembling the seat assembly may comprise providing the fuel tank 116, the seat frame 206, and the rear panel 234 to the fuel tank 116. The seat frame 202 is positioned on the fuel tank 116 and the rear panel 234. The seat frame 206 is removably secured to the fuel tank 116 with a first engagement member and a second engagement member. The seat frame 206 may be removably secured to the rear panel 234 with a third engagement member. The method may include the step of securing the seat frame 206 to the rear panel 234. A seat cushion may be secured to the seat frame 206 before or after securing the seat frame 206 to the fuel tank 116.

The seat frame 206 includes an opening 218 and a slot 220, and two outboard protrusions 202 extending from the underside of the seat frame 206. The fuel tank 116 includes a disc 214 extending therefrom and two outboard recesses 208 shaped to receive the protrusions 202. To secure the seat frame 206 to the fuel tank 116, the opening 218 is aligned with the disc 214 and lowered to receive the disc 214 through the opening 218 so that the bottom surface of the seat frame 206 is positioned opposite the upper surface of the fuel tank 116 and the disc 214 is positioned along the upper surface of the seat frame 206. The seat frame 206 may then be slid along the fuel tank 116 to position the disc 214 away from the opening 218 and along the slot 220 until the protrusions 202 are received in the recesses 208 with a rearward portion of the frame 206 supported by the rear panel 234. The rear panel 234 may include an engagement member that is selectively actuated to latch the rearward portion of the seat frame 206 (and the seat cushion connected to the seat frame 206) to the rear panel 234. To remove the seat frame 206 (and the seat cushion connected to the seat frame), the engagement member on the rear panel 234 may be actuated to detach the rearward portion of the seat frame 206 from the rear panel 234. The seat frame 206 may then be lifted to remove the protrusions 202 from the recesses 208. The seat frame 206 may then be slid to move the disc 214 away from the slot 220 and into the opening 218. When the disc 214 is aligned with the opening 218, the seat frame 206 may be lifted so that the disc 214 passes through the seat frame 206 so that the seat frame 206 (and the cushion attached thereto) are entirely disengaged from the fuel tank 116 and the rear panel 234. Accordingly, the seat frame 206 (and the cushion attached thereto) may be secured to and removed from the fuel tank 116 and the rear panel 234 without tools.

While the disclosed snowmobile has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A snow vehicle seat assembly, comprising:
a fuel tank that is positionable on a tunnel of a snow vehicle, the fuel tank including:
an upper surface defining a plurality of seat mounting features, wherein the plurality of seat mounting features are integrally formed with the upper surface of the fuel tank, and
a rearward portion defining at least a portion of a chamber;
a seat frame that is removably secured to the plurality of seat mounting features, the seat frame including a first portion positioned on the fuel tank and a second portion extending rearward therefrom; and
a rear panel that engages the rearward portion of the fuel tank to enclose the chamber therebetween and support the second portion of the seat frame.

2. The snow vehicle seat assembly according to claim 1, wherein the chamber receives a battery therein and wherein the rear panel includes a fuel tank mount to secure the fuel tank to the rear panel.

3. The snow vehicle seat assembly according to claim 2, wherein the second portion of the seat frame is removably secured to the rear panel, wherein the fuel tank includes two outboard legs extending rearward from a rear end of the fuel tank, wherein the rear panel defines two outboard chambers that receive the outboard legs therein, wherein a lower wall of at least one of the outboard chambers is positioned beneath the rearward portion of the fuel tank when the rear panel is secured to the fuel tank, and wherein the rear panel includes a first engagement member securable to an underside of the fuel tank, and a second engagement member positioned rearward of the first engagement member that is securable to the tunnel.

4. The snow vehicle seat assembly according to claim 2, wherein a lower wall of the rear panel is positioned beneath the fuel tank and an upper wall of the rear panel is positioned on the upper surface of the fuel tank, wherein the battery is positioned on the lower wall of the rear panel.

5. The snow vehicle seat assembly according to claim 2, wherein the fuel tank mount receives a threaded fastener to secure the fuel tank to the rear panel.

6. The snow vehicle seat assembly according to claim 1, wherein the rear panel includes a rear wall extending from a base to the second portion of the seat frame, wherein a shelf extends from the base of the rear wall forward into the chamber, wherein the shelf supports a battery positioned in the chamber at least partially between the outboard legs of the fuel tank, and wherein the shelf maintains a gap between the battery and the tunnel when the seat assembly is positioned on the tunnel.

7. The snow vehicle seat assembly according to claim 6, wherein the rearward portion of the fuel tank defines a first channel and an underside of the fuel tank defines a second channel that intersects the first channel, wherein the first channel routes battery cables from the battery to the second channel underneath the fuel tank.

8. The snow vehicle seat assembly according to claim 1, wherein the rear panel includes a latching member that is selectively engageable with the seat frame to maintain the seat frame engagement with the plurality of seat mounting features.

9. The snow vehicle seat assembly according to claim 8, wherein the rear panel defines a trapezoidal shape from which two wings extend and wrap around the rearward portion of the fuel tank.

10. The snow vehicle seat assembly according to claim 1, wherein the plurality of seat mounting features include projections integrally molded with the fuel tank.

11. The snow vehicle seat assembly according to claim 1, wherein the plurality of seat mounting features includes a pair of pockets defined in the upper surface of the fuel tank and a pillar projecting from the upper surface of the fuel tank capped by a disc having a larger diameter than the pillar.

12. The snow vehicle seat assembly according to claim 11, wherein the seat frame includes a plurality of fuel tank mounting features which incorporates a pair of projections extending from a lower surface of the seat frame configured to be received within the pair of pockets and a keyhole-shaped opening in the lower surface of the seat frame configured to receive the pillar and the disc.

13. A snow vehicle seat assembly, comprising:
a fuel tank that is positionable on a tunnel of a snow vehicle, the fuel tank including:
an upper surface defining a plurality of seat mounting features, and
a rearward portion defining a rearward facing chamber, the rearward facing chamber positioned rearward from the plurality of seat mounting features;
a seat frame removably secured to the plurality of seat mounting features; and
a rear panel that engages the rearward portion of the fuel tank to enclose the rearward facing chamber therebetween,
wherein the rear panel and the fuel tank are configured to support a rider load.

14. The snow vehicle seat assembly according to claim 13, wherein the seat frame includes a first portion defining a descending slope relative to the tunnel and a second portion defining an ascending slope relative to the tunnel.

15. The snow vehicle seat assembly according to claim 14, wherein at least a portion of the rear panel is disposed underneath the first portion and the second portion of the seat frame.

16. The snow vehicle seat assembly according to claim 13, wherein the rear panel is removably attached to the seat frame by a toolless latching member.

17. A snow vehicle seat assembly, comprising:
a fuel tank including a front portion, a rear portion, a base that extends from the front portion to the rear portion and is positionable on a track tunnel of a snow vehicle, and an upper surface that extends from the front portion to the rear portion, wherein the upper surface includes a protrusion extending therefrom, a first pocket, and a second pocket, wherein the first pocket and the second pocket are integrally defined by the upper surface, wherein the first pocket and the second pocket are positioned rearward of the protrusion, and wherein the protrusion, the first pocket, and the second pocket are positioned in a triangular configuration; and
a seat frame removably securable to the upper surface of the fuel tank, wherein the seat frame includes an opening, a first protrusion, and a second protrusion, wherein the first seat frame protrusion is receivable in the first pocket and the second seat frame protrusion is receivable in the second pocket when the fuel tank protrusion is received in the seat frame opening.

18. The snow vehicle of claim 17, wherein the upper surface defines a first tier at least partially surrounding a second tier that extends upward from the first tier, wherein the fuel tank protrusion extends from a forward portion of the second tier and is positioned along a centerline of the fuel tank, and the first pocket and the second pocket are positioned along outboard sides a rearward portion of the second tier, and wherein the seat frame includes an outer flange that is positioned on the first tier of the upper surface of the fuel tank, and a concave portion surrounded by the outer flange that receives the second tier and is supported thereon when the first protrusion is positioned in the first pocket and the second protrusion is positioned in the second pocket with the fuel tank protrusion received in the seat frame opening.

19. The snow vehicle of claim 18, wherein the fuel tank includes an outboard side defining a curved surface with an upper end extending along the upper surface of the fuel tank rearward from a first point adjacent the front portion of the fuel tank to a second point positioned adjacent the first pocket, wherein a third point is positioned along the upper end of the curved surface between the first point and the second point, wherein the first point is positioned inboard of the second point, and the third point is positioned inboard of the first point, and the first pocket is positioned at least partially outboard of the third point.

20. The snow vehicle of claim 19, wherein the third point is positioned forward of the second tier and rearward of an opening to the fuel tank, and wherein at least a portion of the curved surface extends uninterrupted from the third point to the second point.

21. The snow vehicle of claim 20, wherein the first point is positioned forward of the opening to the fuel tank, and the first pocket is positioned at least partially inboard of the first point.

22. The snow vehicle of claim 21, wherein the seat frame includes a first portion defining a descending slope extending from the fuel tank protrusion to the first pocket and the second pocket, and a second portion defining an ascending slope extending rearward from the first pocket and the second pocket, wherein the first portion and the second portion of the seat frame intersect adjacent the first pocket and the second pocket of the fuel tank.

23. The snow vehicle of claim 22, further comprising a rear panel that engages the rearward portion of the fuel tank to define a chamber therebetween, wherein a shelf extends from a base of a rear wall of the rear panel into a channel to support a battery that is positionable therein, wherein an upper surface of the rear panel supports the second portion of the seat frame.

24. The snow vehicle of claim 17, further comprising:
seat adapter, comprising:
a base portion;

a channel extending across a width of the seat adapter configured to receive the seat frame; and a dovetail portion extending rearward from a distal end of the seat frame, wherein the dovetail portion is configured to increase a total seat length.

25. A snow vehicle, comprising:

a tunnel covering at least a portion of an endless track;

a fuel tank positioned above the tunnel, the fuel tank including:

an upper surface including one or more seat mounting features, a rearward portion defining at least a portion of a chamber;

a seat frame securable to the one or more seat mounting features; and a rear panel securable to the tunnel to enclose the chamber between the fuel tank and the rear panel, wherein the rear panel is positioned rearward of the seat mounting features.

26. The snow vehicle of claim 25, wherein the rear panel is securable to the fuel tank and wherein the chamber is configured to house a battery therein.

27. The snow vehicle of claim 26, wherein the fuel tank includes a first outboard leg extending rearward and a second outboard leg extending rearward, wherein at least a portion of the chamber is positioned between the first outboard leg and the second outboard leg.

28. The snow vehicle of claim 26, wherein the rear panel includes one or more mounting features to secure the rear panel to the fuel tank, wherein the one or more mounting features are positioned rearward of a terminal of the battery.

* * * * *